United States Patent
Yoshida

(10) Patent No.: US 10,564,336 B2
(45) Date of Patent: Feb. 18, 2020

(54) REFLECTIVE STRUCTURE, DEVICE, AND METHOD FOR PRODUCING REFLECTIVE STRUCTURE

(71) Applicant: OSAKA UNIVERSITY, Osaka (JP)

(72) Inventor: Hiroyuki Yoshida, Suita (JP)

(73) Assignee: OSAKA UNIVERSITY, Osaka (JP)

( * ) Notice: Subject to any disclaimer, the term of this patent is extended or adjusted under 35 U.S.C. 154(b) by 67 days.

(21) Appl. No.: 15/579,158

(22) PCT Filed: Jun. 1, 2016

(86) PCT No.: PCT/JP2016/066219
§ 371 (c)(1),
(2) Date: Dec. 1, 2017

(87) PCT Pub. No.: WO2016/194961
PCT Pub. Date: Dec. 8, 2016

(65) Prior Publication Data
US 2018/0164480 A1 Jun. 14, 2018

(30) Foreign Application Priority Data
Jun. 4, 2015 (JP) ................................. 2015-113793

(51) Int. Cl.
*G02B 5/30* (2006.01)
*G02F 1/137* (2006.01)
(Continued)

(52) U.S. Cl.
CPC ......... *G02B 5/3016* (2013.01); *G02B 5/0252* (2013.01); *G02B 5/08* (2013.01);
(Continued)

(58) Field of Classification Search
CPC .................. G02F 1/137; G02F 1/1396; G02F 2001/133543; G02B 5/008; G02B 5/0252; G02B 5/3016; G02B 6/0055; G02B 5/10
See application file for complete search history.

(56) References Cited

U.S. PATENT DOCUMENTS 6,099,758 A * 8/2000 Verrall .................. C09K 19/38
252/299.01
7,719,643 B2 5/2010 Kashima et al.
(Continued)

FOREIGN PATENT DOCUMENTS

EP 0 727 690 A1 8/1996
JP H05-107660 A 4/1993
(Continued)

OTHER PUBLICATIONS

D. J. Broer et al., "Wide-band reflective polarizers from cholesteric polymer networks with a pitch gradient", Nature • vol. 378 • Nov. 30, 1995.*
(Continued)

*Primary Examiner* — Hoan C Nguyen
(74) *Attorney, Agent, or Firm* — Studebaker & Brackett PC

(57) ABSTRACT

A liquid crystal element (1) includes helical structures (7). The liquid crystal element (1) has a light incidence surface (13) on which light is incident and a reflective surface (17) which reflects the light coming through the light incidence surface (13). Each helical structure (7) includes structure units (9). Each structure unit (9) includes liquid crystal molecules (11) stacked in a twisted manner to form a helix. A second end (E2) of one structure unit (9) of structure units (9) adjacent to one another in a first direction (A1) serves as a first end (E1) of the other structure unit (9). Directions of orientation of the liquid crystal molecules (11) at the first ends (E1) included in the helical structures (7) are identical.
(Continued)

The reflective surface (17) includes at least one of the first ends (E1) included in each helical structure (7). The reflective surface (17) is non-parallel to the light incidence surface (13).

18 Claims, 34 Drawing Sheets

(51) Int. Cl.
| | |
|---|---|
| *G02B 5/08* | (2006.01) |
| *G02B 5/02* | (2006.01) |
| *G02B 5/10* | (2006.01) |
| *F21V 8/00* | (2006.01) |
| *G02F 1/139* | (2006.01) |
| *G02F 1/1335* | (2006.01) |

(52) U.S. Cl.
CPC ............. *G02B 5/10* (2013.01); *G02B 6/0055* (2013.01); *G02F 1/137* (2013.01); *G02F 1/1396* (2013.01); *G02F 2001/133543* (2013.01)

(56) References Cited

U.S. PATENT DOCUMENTS

| | | | |
|---|---|---|---|
| 7,859,622 B2 | 12/2010 | Kashima et al. | |
| 2003/0090618 A1* | 5/2003 | Kashima | G02B 5/3016 349/194 |
| 2006/0152656 A1 | 7/2006 | Kashima et al. | |
| 2007/0195408 A1* | 8/2007 | Divelbiss | G02B 26/008 359/462 |
| 2009/0040885 A1* | 2/2009 | Horimai | G11B 7/0065 369/30.03 |
| 2010/0182545 A1 | 7/2010 | Kashima et al. | |
| 2012/0113083 A1* | 5/2012 | Kim | G09G 3/344 345/212 |
| 2012/0242918 A1 | 9/2012 | Valyukh et al. | |
| 2014/0198384 A1* | 7/2014 | Amimori | B60K 35/00 359/486.01 |
| 2015/0146156 A1* | 5/2015 | Hirai | C09K 19/56 349/183 |
| 2016/0209652 A1 | 7/2016 | Ichihashi | |

FOREIGN PATENT DOCUMENTS

| | | |
|---|---|---|
| JP | H08-220540 A | 8/1996 |
| JP | 2005-099259 A | 4/2005 |
| JP | 2005-107296 A | 4/2005 |
| JP | 2005-292423 A | 10/2005 |
| JP | 2014-071250 A | 4/2014 |
| WO | 2005/008303 A1 | 1/2005 |
| WO | 2014/062615 A2 | 4/2014 |
| WO | 2015/050204 A1 | 4/2015 |

OTHER PUBLICATIONS

The extended European search report issued by the European Patent Office on Jan. 17, 2019, which corresponds to European Patent Application No. 16803395.9 and is related to U.S. Appl. No. 15/579,158.

Yi-Pai Huang et al: "Multidirectional Asymmetrical Microlens-Array Light Control Films for High Performance Reflective Liquid Crystal Displays", 2002 SID International Symposium Digest of Technical Papers, vol. 33, No. 2, May 1, 2002, pp. 870-873.

International Search Report issued in PCT/JP2016/066219; dated Aug. 16, 2016.

Hitesh Khandelwal et al.; "Application of Broadband Infrared Reflector Based on Cholesteric Liquid Crystal Polymer Bilayer Film to Windows and Its Impact on Reducing the Energy Consumption in Buildings"; Journal of Materials Chemistry A; Jul. 16, 2014; pp. 14622-14627; 2.

Tanya Z. Kosc et al.; "Electric-Field-Induced Motion of Polymer Cholesteric Liquid-Crystal Flakes in a Moderately Conductive Fluid"; Applied Optics; Sep. 1, 2002; pp. 5362-5366; vol. 41, No. 25.

Keiko Ikuno et al.; "Optical Performance Simulation of See-through Displays with Holographic Optical Element"; Konica Minolta Technology Report; 2011; pp. 101-104; vol. 8.

* cited by examiner

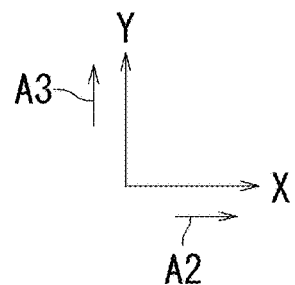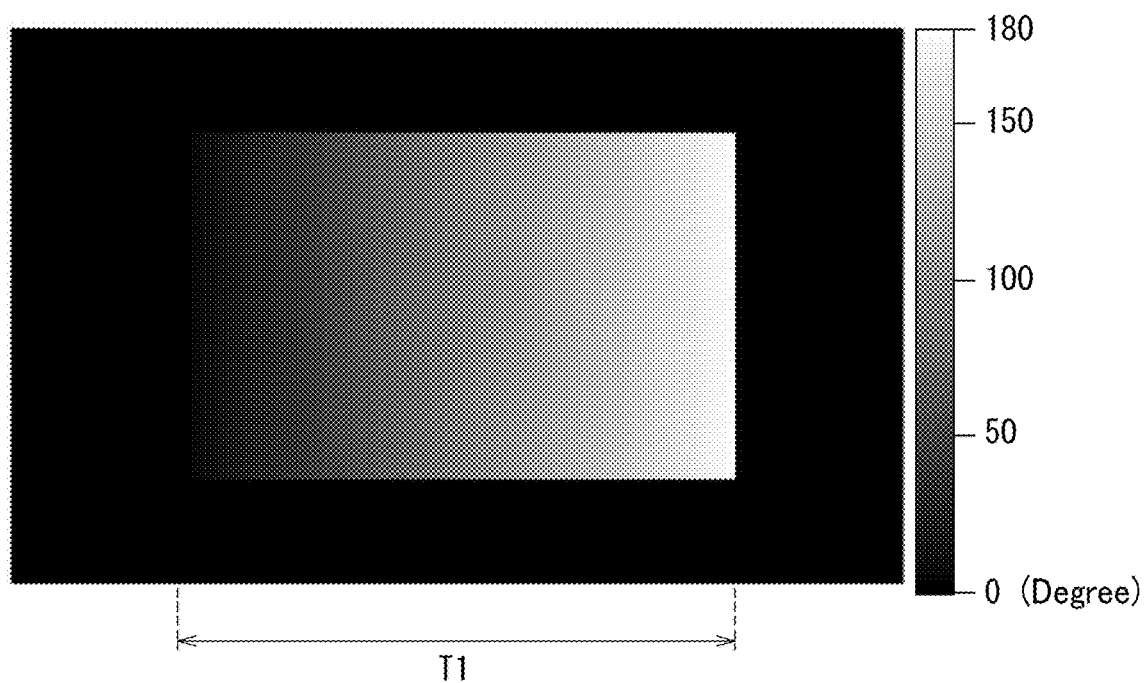
FIG. 3

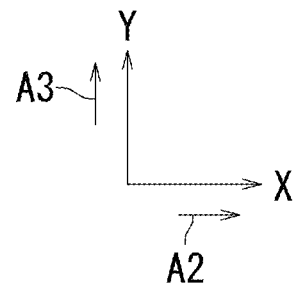
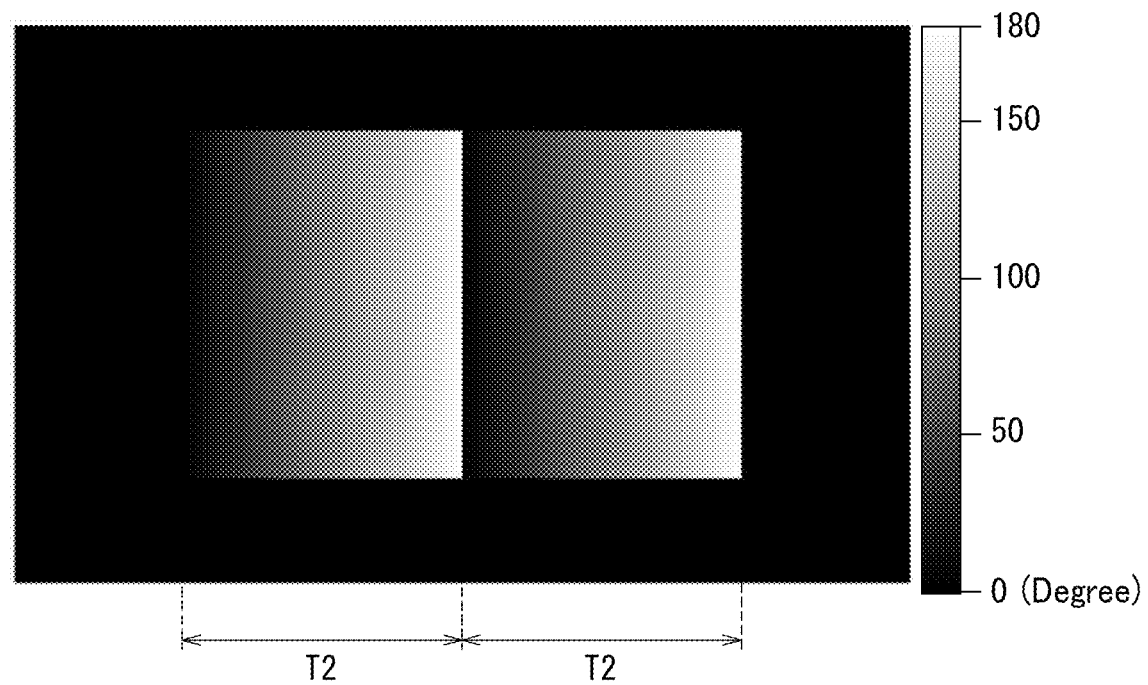
FIG. 6

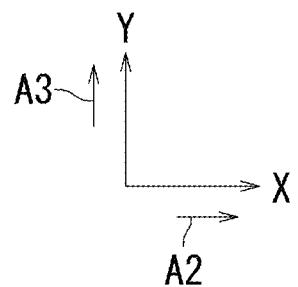
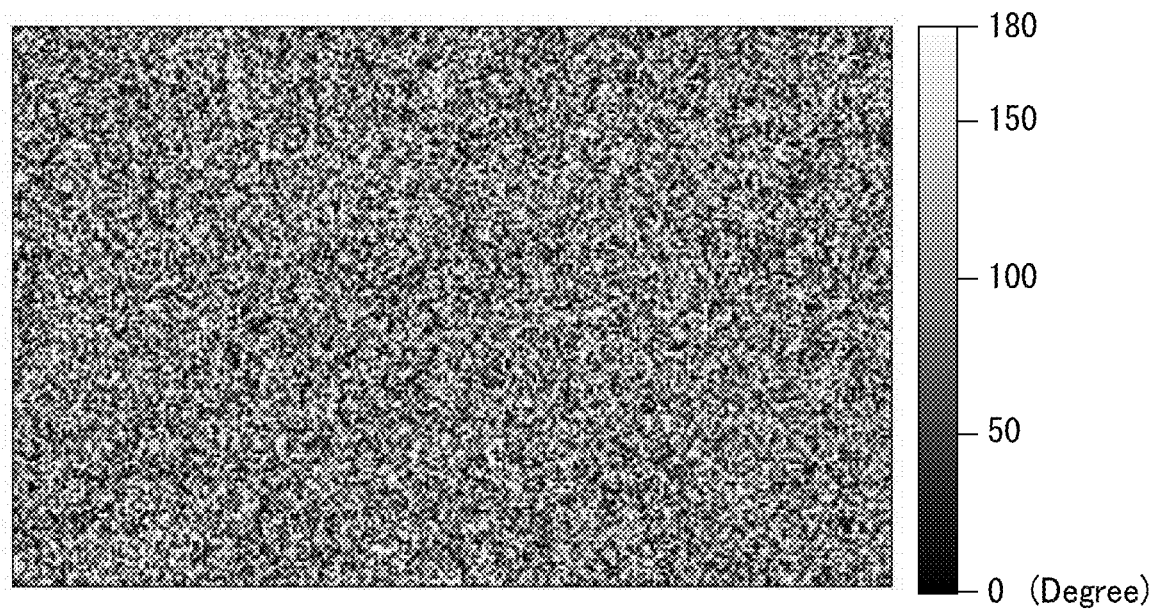
FIG. 12

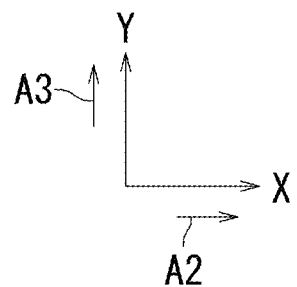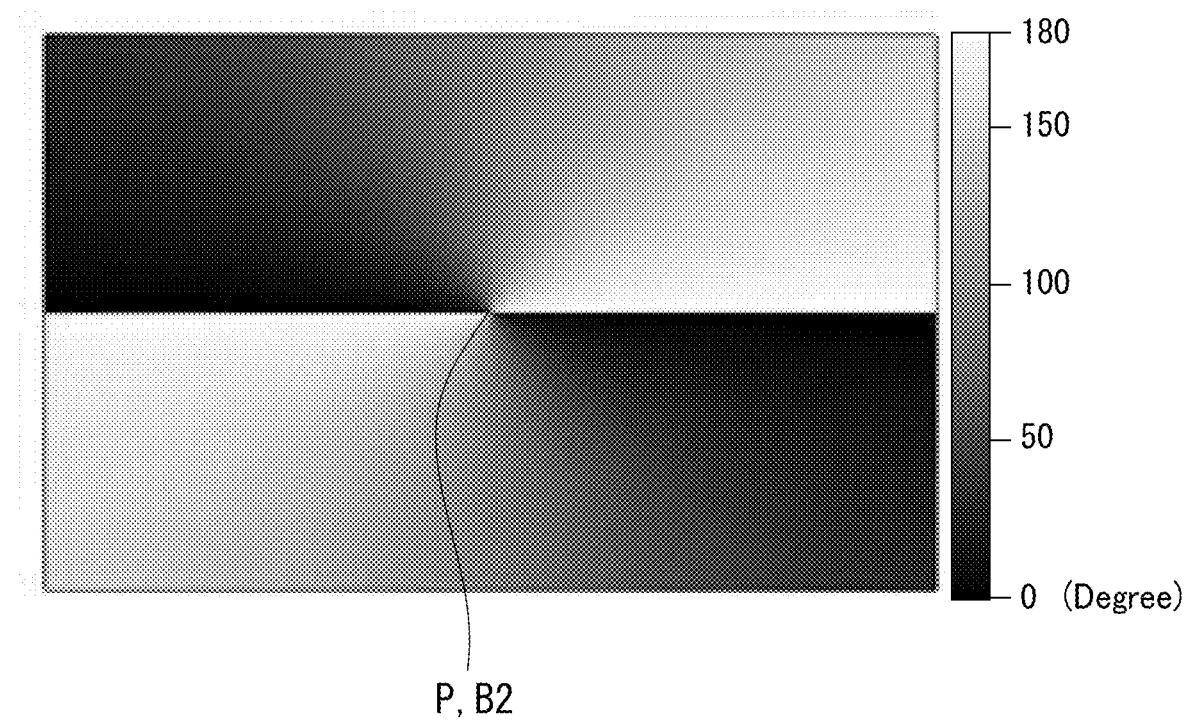
FIG. 16

REFLECTIVE STRUCTURE, DEVICE, AND METHOD FOR PRODUCING REFLECTIVE STRUCTURE

TECHNICAL FIELD

The present invention relates to reflective structures, devices, and methods for producing reflective structures.

BACKGROUND ART

A screen described in Patent Literature 1 contains a cholesteric liquid crystal (reflective structure). For example, a cholesteric liquid crystal with right-handed helical structure reflects light having right circular polarization and transmits light having left circular polarization.

CITATION LIST

Patent Literature

[Patent Literature 1]
Japanese Patent Application Laid-Open Publication No. H05-107660

SUMMARY OF INVENTION

Technical Problem

However, the cholesteric liquid crystal in the screen described in Patent Literature 1 has a reflective surface parallel to a light incidence surface, and thus light is specularly reflected. For example, light that is normally incident on the cholesteric liquid crystal is reflected normally with respect to the cholesteric liquid crystal. Cholesteric liquid crystals are therefore limited in their application range.

The present invention was achieved in consideration of the above problem and an object thereof is to provide a reflective structure, a device, and a method for producing a reflective structure that each have an extended application range.

Solution to Problem

According to a first aspect of the present invention, a reflective structure includes a plurality of helical structures each extending in a specific direction. The reflective structure has a first light incidence surface on which light is incident and which intersects with the specific direction, and a reflective surface which reflects the light coming through the first light incidence surface and which intersects with the specific direction. The first light incidence surface includes one end of two ends of each of the helical structures. Each of the helical structures includes a plurality of structure units successive in the specific direction. Each of the structure units includes a plurality of elements stacked in a twisted manner to form a helix. Each of the structure units has a first end and a second end. The second end of one structure unit of structure units, among the plurality of structure units, adjacent to one another in the specific direction serves as the first end of the other structure unit. Directions of orientation of the elements at the first ends included in the helical structures are identical. The reflective surface includes at least one of the first ends included in each of the helical structures. The reflective surface is non-parallel to the first light incidence surface.

Preferably, in the reflective structure according to the present invention, the reflective surface is inclined with respect to the first light incidence surface and has a linear gradient.

Preferably, in the reflective structure according to the present invention, the reflective surface includes a curved surface.

Preferably, in the reflective structure according to the present invention, the reflective surface is symmetrical with respect to a symmetry axis.

Preferably, in the reflective structure according to the present invention, the reflective surface includes irregularities.

Preferably, in the reflective structure according to the present invention, the reflective surface includes a helical surface.

Preferably, in each of the helical structures in the reflective structure according to the present invention, a helical half pitch varies or a helical pitch varies. Preferably, the helical half pitch is a distance from the first end to the second end of the structure unit, and the helical pitch is a distance from the first end of the one structure unit of the structure units adjacent to one another to the second end of the other structure unit.

Preferably, in the reflective structure according to the present invention, the helical structures form a cholesteric phase, a cholesteric blue phase, a chiral smectic C phase, a twist grain boundary phase, a helicoidal cholesteric phase, a chiral liquid crystal phase, a helical inorganic material, a helical metal, a helical crystal, or a chiral structure.

Preferably, the reflective structure according to the present invention includes a plurality of the reflective surfaces and a second light incidence surface on which light is incident and which intersects with the specific direction. Preferably, the second light incidence surface includes an opposite end of the two ends of each of the helical structures. Preferably, among the reflective surfaces, a reflective surface toward the first light incidence surface has a different structure from a reflective surface toward the second light incidence surface. Preferably, the reflective surface toward the first light incidence surface reflects the light coming through the first light incidence surface, and the reflective surface toward the second light incidence surface reflects the light coming through the second light incidence surface.

Preferably, among the helical structures in the reflective structure according to the present invention, adjacent helical structures are bonded to each other.

Preferably, in the reflective structure according to the present invention, the reflective surface reflects the light coming through the first light incidence surface to form an image of an object corresponding to the light.

Preferably, in the reflective structure according to the present invention, one, or two or more of the helical structures form a helical structure unit. Preferably, the reflective structure further includes a plurality of support members and a plurality of rotary members. Preferably, the support members are disposed one-to-one correspondence with a plurality of the helical structure units. Preferably, the rotary members are disposed one-to-one correspondence with the support members. Preferably, each of the support members supports the corresponding helical structure unit. Preferably, each of the rotary members rotates the corresponding support member.

According to a second aspect of the present invention, a device includes the reflective structure according to the first aspect of the present invention and a stimulation section which gives a stimulus to the reflective structure. The stimulus is an electrical stimulus, a light stimulus, a mechanical stimulus, or a chemical stimulus. The reflective structure responds to the stimulus.

According to a third aspect of the present invention, a reflective structure production method produces the reflective structure according the first aspect. The production method includes calculating a direction of orientation of an element at the one end of the two ends of each of the helical structures to create first orientation data and creating second orientation data based on the first orientation data. The first orientation data indicates directions of orientation of the elements at the respective one ends. The second orientation data specifies either or both of a surface structure and a surface property of an alignment layer configured to be in contact with the elements and orient the elements. The creating the first orientation data includes creating the first orientation data such that some of the elements at the respective one ends each have a different direction of orientation.

Preferably, the reflective structure production method according to the present invention further includes creating object data representing an object. Preferably, the creating the first orientation data includes calculating a direction of orientation of the element at the one end of the two ends of each of the helical structures based on the object data.

Advantageous Effects of Invention

According to the present invention, the application range of the reflective structure can be extended.

BRIEF DESCRIPTION OF DRAWINGS

FIG. 3 is a plan view showing phase distribution of a plurality of helical structures of the liquid crystal element according to Embodiment 1 of the present invention.

FIG. 6 is a plan view showing phase distribution of a plurality of helical structures of the liquid crystal element according to the variation of Embodiment 1 of the present invention.

FIG. 12 is a plan view showing phase distribution of a plurality of helical structures of the liquid crystal element according to Embodiment 3 of the present invention.

FIG. 16 is a plan view showing phase distribution of a plurality of helical structures of the liquid crystal element according to Embodiment 4 of the present invention.

DESCRIPTION OF EMBODIMENTS

Figure 1:
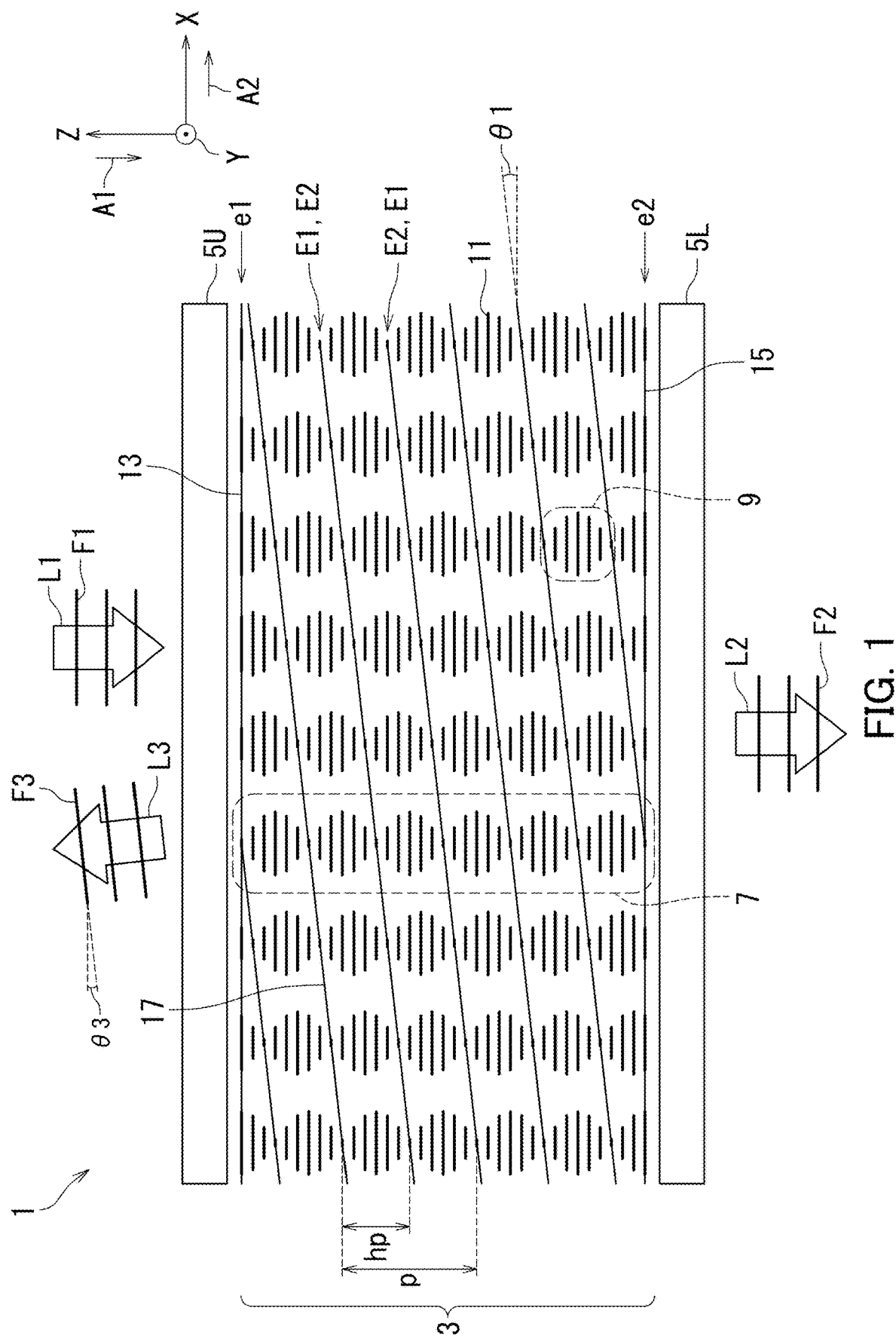
FIG. 1 is a cross-sectional view illustrating a liquid crystal element according to Embodiment 1 of the present invention.

The following describes embodiments of the present invention with reference to the drawings. The description with reference to the drawings may use a three-dimensional Cartesian coordinate system including an X axis, a Y axis, and a Z axis orthogonal to one another. Elements that are the same or equivalent are indicated by the same reference signs in the drawings and description thereof is not repeated. Furthermore, in order to simplify the drawings, hatched lines indicating cross-sections are omitted as appropriate.

Embodiment 1

Figure 2:
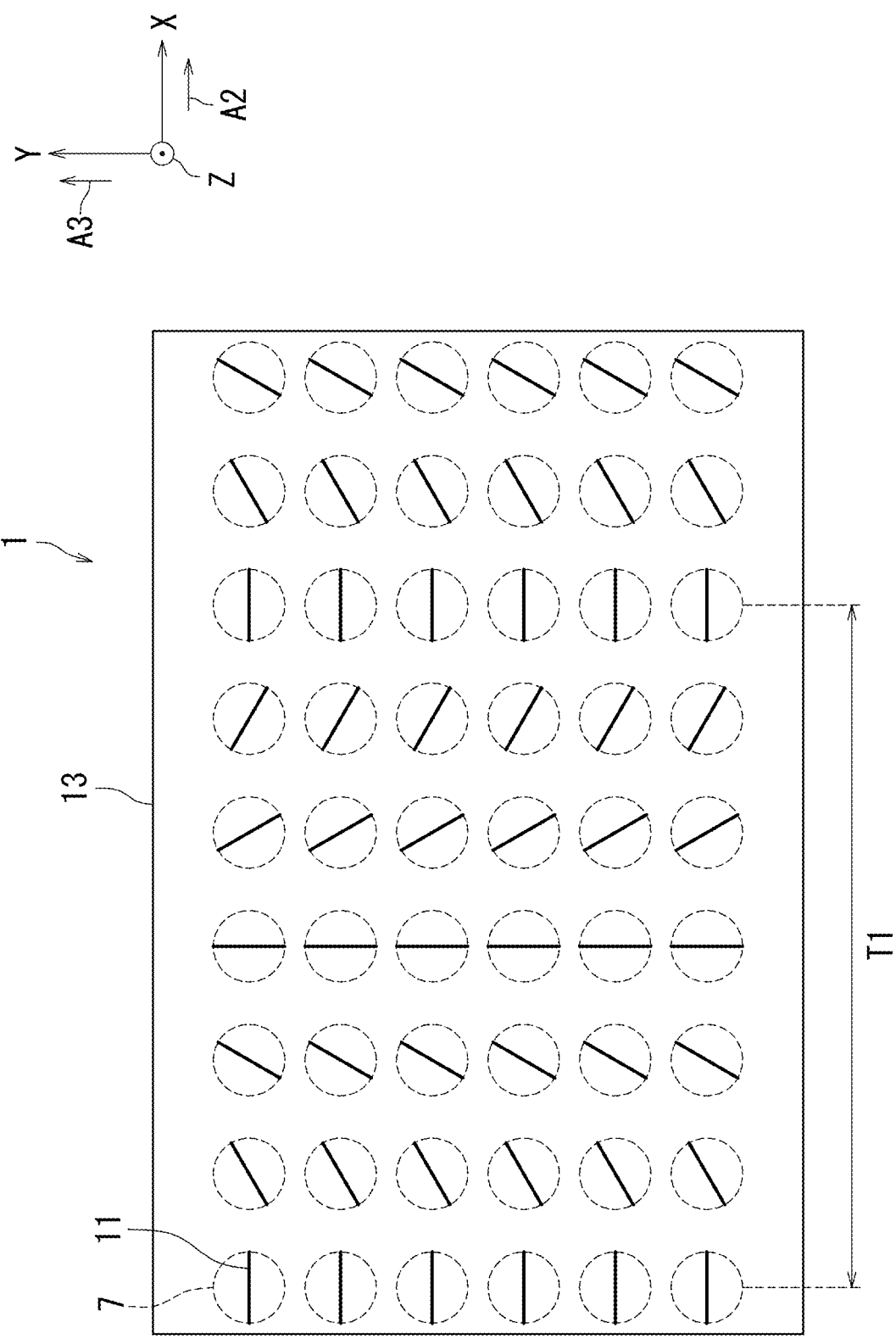
FIG. 2 is a plan view illustrating the liquid crystal element according to Embodiment 1 of the present invention.

FIG. 1 is a cross-sectional view illustrating a liquid crystal element 1 according to Embodiment 1 of the present invention. FIG. 2 is a plan view illustrating the liquid crystal element 1. As illustrated in FIG. 1, the liquid crystal element 1, which is a reflective structure, includes a liquid crystal layer 3, a substrate 5U, and a substrate 5L. The liquid crystal layer 3 has a light incidence surface 13 (first light incidence surface), a light exit surface 15, and a plurality of reflective surfaces 17.

The liquid crystal layer 3 contains a cholesteric liquid crystal. The cholesteric liquid crystal is equivalent to a cholesteric phase. The cholesteric phase is an example of a chiral liquid crystal phase. The cholesteric liquid crystal has a structure in which elongated liquid crystal molecules are arranged with long axes thereof parallel to one another within a plane, and the direction of orientation thereof twists gradually from upstream to downstream in a direction perpendicular to the plane to form a helix. The cholesteric liquid crystal has the property of reflecting light that is of a band of wavelengths corresponding to a pitch of the helix and refractive indices of the cholesteric liquid crystal and that has circular polarization in the same twist direction as the twist direction of the helix. Specifically, the cholesteric liquid crystal has the property of reflecting light that is of a band of wavelengths represented by $no \times p$-$ne \times p$ and that has circular polarization in the same twist direction as the twist direction of the helix, where p is the pitch of the helix of the cholesteric liquid crystal, ne is the refractive index of the liquid crystal molecules for extraordinary light, and no is the refractive index of the liquid crystal molecules for ordinary light.

The liquid crystal layer 3 is disposed between the substrate 5U and the substrate 5L. Each of the substrates 5U and 5L is for example a glass substrate. The substrate 5U and the substrate 5L are arranged substantially in parallel to one another.

The liquid crystal layer 3 includes a plurality of helical structures 7. The helical structures 7 form the cholesteric liquid crystal. Each of the helical structures 7 extends in a first direction A1 (specific direction). The first direction A1 is substantially parallel to a Z axis and extends in a negative direction of the Z axis. The first direction A1 is substantially perpendicular to the light incidence surface 13.

Each of the helical structures 7 includes a plurality of structure units 9 successive in the first direction A1. Each of the structure units 9 successive in the first direction A1 includes a plurality of liquid crystal molecules 11 (a plurality of elements) stacked in the first direction A1 in a twisted manner to form a helix. That is, each of the helical structures 7 includes a number of liquid crystal molecules 11 stacked in the first direction A1 in a twisted manner to form a helix. The liquid crystal molecules 11 are for example rod-like molecules. The first direction A1 indicates a direction of helix axes of the helical structures 7.

Specifically, in the drawings of the present application, one liquid crystal molecule 11, from among a plurality of liquid crystal molecules located on one plane perpendicular to the first direction A1, represents liquid crystal molecules that are oriented toward a director in order to simplify the drawings. That is, in each of the helical structures 7, a plurality of liquid crystal molecules including the liquid crystal molecule 11 (referred to below as a "liquid crystal molecule group") are located on one plane perpendicular to the first direction A1. In each of the helical structures 7, a plurality of the liquid crystal molecule groups are arranged in the first direction A1 with the direction of orientation thereof twisting gradually to form a helix. In other words, in each of the helical structures 7, the director helically rotates along the corresponding helix axis. The director is a unit vector that represents the direction of average orientation of the liquid crystal molecules.

Each of the structure units 9 has a first end E1 and a second end E2. Each of the structure units 9 is a repeating unit, and therefore the second end E2 of one structure unit 9 of structure units 9 adjacent to one another in the first direction A1 serves as the first end E1 of the other structure unit 9.

The direction of orientation of the liquid crystal molecules 11 in a range from the first end E1 to the second end E2 in each of the structure units 9 twists gradually from upstream to downstream in the first direction A1 to form a helix. A rotation angle of the liquid crystal molecules 11 in the range from the first end E1 to the second end E2 is approximately 180 degrees.

Accordingly, in each of the structure units 9, the direction of orientation of the liquid crystal molecules 11 at the first end E1 is identical to the direction of orientation of the liquid crystal molecules 11 at the second end E2. In the present description, the directions of orientation of liquid crystal molecules 11 being identical mean that the directions of orientation of the liquid crystal molecules 11 are substantially parallel to one another. Therefore, the directions of orientation of liquid crystal molecules 11 being identical indicate both a case where the directions of orientation of the liquid crystal molecules 11 are substantially the same and a case where the directions of orientation of the liquid crystal molecules 11 differ by approximately 180 degrees.

Since the second end E2 of one structure unit 9 serves as the first end E1 of an adjacent structure unit 9, the directions of orientation of the liquid crystal molecules 11 at the first ends E1 in each of the helical structures 7 are identical. Furthermore, the directions of orientation of the liquid crystal molecules 11 at the first ends E1 included in the helical structures 7 are identical.

Specifically, the direction of orientation of the liquid crystal molecule groups in a range from the first end E1 to the second end E2 in each of the structure units 9 twists gradually from upstream to downstream in the first direction A1 to form a helix. The rotation angle of the liquid crystal molecule groups in the range from the first end E1 to the second end E2 is approximately 180 degrees.

In each of the structure units 9, therefore, the direction of orientation of the liquid crystal molecule group at the first end E1 is identical to the direction of orientation of the liquid crystal molecule group at the second end E2. In the present description, the directions of orientation of liquid crystal molecule groups being identical mean that the directions of orientation of the liquid crystal molecule groups are substantially parallel to one another. Therefore, the directions of orientation of liquid crystal molecule groups being identical indicate both a case where the directions of orientation of the liquid crystal molecule groups are substantially the same and a case where the directions of orientation of the liquid crystal molecule groups differ by approximately 180 degrees.

In other words, in each of the structure units 9, the direction of the director at the first end E1 is identical to the direction of the director at the second end E2. In the present description, the directions of directors being identical mean the directions of the directors are substantially parallel to one another. Therefore, the directions of the directors being identical indicate both a case where the directions of the directors are substantially the same and a case where the directions of the directors differ by approximately 180 degrees.

Since the second end E2 of one structure unit 9 serves as the first end E1 of an adjacent structure unit 9, the directions of orientation of the liquid crystal molecule groups at the first ends E1 in each of the helical structures 7 are identical. In other words, in each of the helical structures 7, the directions of the directors at the first ends E1 are identical. Furthermore, the directions of orientation of the liquid crystal molecule groups at the first ends E1 included in the helical structures 7 are identical. In other words, the directions of the directors at the first ends E1 included in the helical structures 7 are identical.

In the present description and claims, each liquid crystal molecule 11 may be considered to be one element, or each liquid crystal molecule group may be considered to be one element.

Hereinafter, in the present description, a distance between the first end E1 and the second end E2 in each of the structure units 9 (i.e., half period of the helix) is referred to as a helical half pitch hp. A distance between the first end E1 of one structure unit 9 of structure units 9 adjacent to one another in the first direction A1 and the second end E2 of the other structure unit 9 (i.e., one period of the helix) is referred to as a helical pitch p. In Embodiment 1, both the helical half pitch hp and the helical pitch p are constant, and p=2×hp.

The following describes the light incidence surface 13, the light exit surface 15, and the reflective surfaces 17 with reference to FIG. 1.

The light incidence surface 13 and the light exit surface 15 intersect with the first direction A1. In Embodiment 1, the light incidence surface 13 and the light exit surface 15 are substantially perpendicular to the first direction A1. The light incidence surface 13 includes one end e1 (more specifically, the liquid crystal molecules 11 at the one end e1) of two ends of each of the helical structures 7. The light exit surface 15 includes an opposite end e2 (more specifically, the liquid crystal molecules 11 at the opposite end e2) of the two ends of each of the helical structures 7.

Light L1 having linear polarization is incident on the light incidence surface 13 in the first direction A1. A wavefront F1 of the light L1 is substantially parallel to the light incidence surface 13. In a situation in which the helical structures formed by the liquid crystal molecules 11 are right-handed, light L2 having left circular polarization out of the light L1 exits through the light exit surface 15. In a situation in which the helical structures formed by the liquid crystal molecules 11 are left-handed, light L2 having right circular polarization out of the light L1 exits through the light exit surface 15. A wavefront F2 of the light L2 is substantially parallel to the light exit surface 15.

In the present description, light having circular polarization may be light having precisely circular polarization or may be light having circular polarization similar to elliptical polarization.

The right-handed helical structures formed by the liquid crystal molecules 11 are each a helical structure in which the direction of orientation of the liquid crystal molecules 11 twists clockwise gradually from upstream to downstream in the first direction A1 when the liquid crystal molecules 11 are viewed in the first direction A1. The left-handed helical structures formed by the liquid crystal molecules 11 are each a helical structure in which the direction of orientation of the liquid crystal molecules 11 twists counterclockwise gradually from upstream to downstream in the first direction A1 when the liquid crystal molecules 11 are viewed in the first direction A1. Light having right circular polarization is circularly polarized light (i.e., electromagnetic wave) whose electric field vector passing a fixed point (i.e., a specific location) rotates clockwise with time when the light at the fixed point is viewed against the propagation direction of the light. Light having left circular polarization is circularly polarized light whose electric field vector passing a fixed point rotates counterclockwise with time when the light at the fixed point is viewed against the propagation direction of the light.

Each of the reflective surfaces 17 includes one of the first ends E1 included in each of the helical structures 7. Accordingly, the directions of orientation of the liquid crystal molecules 11 on each of the reflective surfaces 17 are identical among the plurality of helical structures 7. In other words, the directions of the directors on each of the reflective surfaces 17 are identical among the plurality of helical structures 7. In the present description, one director is specified for each first end E1. Furthermore, the directions of orientation of the liquid crystal molecules 11 are identical among the plurality of reflective surfaces 17. In other words, the directions of the directors are identical among the plurality of reflective surfaces 17. The reflective surfaces 17 are substantially parallel to one another and are arranged at equal intervals each corresponding to the helical half pitch hp. The reflective surfaces 17 are non-parallel to the light incidence surface 13. In Embodiment 1, the reflective surfaces 17 are planes that are inclined with respect to the light incidence surface 13 and that have linear gradients.

Each of the reflective surfaces 17 intersects with the first direction A1 and selectively reflects light L3 out of the light L1 coming through the light incidence surface 13 according to Bragg's law. Specifically, the reflective surfaces 17 reflect right circularly polarized light L3 having a wavelength corresponding to the helical pitch p out of the light L1 in a situation in which the helical structures formed by the liquid crystal molecules 11 are right-handed. On the other hand, the reflective surfaces 17 reflect left circularly polarized light L3 having a wavelength corresponding to the helical pitch p out of the light L1 in a situation in which the helical structures formed by the liquid crystal molecules 11 are left-handed. A wavefront F3 of the light L3 is substantially parallel to the reflective surfaces 17.

A center wavelength λ of the light L3 selectively reflected for example depends on various parameters such as the refractive index ne of the liquid crystal molecules 11 for extraordinary light, the refractive index no of the liquid crystal molecules 11 for ordinary light, and the helical pitch p. Note that these parameters are merely examples, and the various parameters may for example include additional parameters.

A wavelength width Δλ of the light L3 selectively reflected for example depends on various parameters such as the center wavelength λ, the refractive index ne, and the refractive index no. Note that these parameters are merely examples, and the various parameters may for example include additional parameters.

The reflective surfaces 17 reflect the light L3 such that the wavefront F3 of the light L3 is substantially parallel to the reflective surfaces 17. That is, the reflective surfaces 17 reflect the light L3 depending on an inclination angle θ1 of the reflective surfaces 17 with respect to the light incidence surface 13. In Embodiment 1, an inclination angle θ3 of the wavefront F3 of the light L3 with respect to the light incidence surface 13 is substantially equal to the inclination angle θ1 of the reflective surfaces 17.

The following describes the liquid crystal element 1 viewed in the first direction A1 with reference to FIG. 2. FIG. 2 is a plan view illustrating the liquid crystal element 1. FIG. 2 does not show the substrates 5U and 5L and shows the light incidence surface 13 in order to simplify the drawings. As illustrated in FIG. 2, the helical structures 7 are arranged in rows in a second direction A2 and in a third direction A3.

Specifically, the direction of orientation of the liquid crystal molecules (including the liquid crystal molecules 11) in the liquid crystal molecule groups located on the light incidence surface 13 continuously varies in the second direction A2. Or, the direction of orientation of the liquid crystal molecules (including the liquid crystal molecules 11) in the liquid crystal molecule groups located on the light incidence surface 13 discretely varies in the second direction A2 at finite distances. In terms of the third direction A3, however, the direction of orientation of the liquid crystal molecules (including the liquid crystal molecules 11) in the liquid crystal molecule groups located on the light incidence surface 13 is identical.

The second direction A2 is substantially parallel to an X axis and extends in a positive direction of the X axis. The third direction A3 is substantially parallel to a Y axis and extends in a positive direction of the Y axis. The first direction A1, the second direction A2, and the third direction A3 intersect with one another. In the present description, the first direction A1, the second direction A2, and the third direction A3 are substantially perpendicular to one another.

The following describes the liquid crystal element 1 in terms of spatial phase with reference to FIGS. 1 to 3. In the present description, a spatial phase (referred to below as a "phase" in the present description) of each helical structure 7 refers to the direction of orientation of the liquid crystal molecule 11 at the end e1 of the helical structure 7. In other words, the phase of the helical structure 7 refers to the direction of orientation of the liquid crystal molecule 11 in the helical structure 7 on the light incidence surface 13. Specifically, the phase of the helical structure 7 refers to the direction of orientation of the liquid crystal molecule group (i.e., the liquid crystal molecules including the liquid crystal molecule 11) at the end e1 of the helical structure 7. In other words, the phase of the helical structure 7 refers to the direction of the director at the ends e1 of the helical structure 7. In other words, the phase of the helical structure 7 refers to the direction of orientation of the liquid crystal molecule group in the helical structure 7 on the light incidence surface 13. In other words, the phase of the helical structure 7 refers to the direction of the director of the helical structure 7 at the light incidence surface 13.

As illustrated in FIG. 1, the phases of the helical structures 7 arranged in each row in the second direction A2 differ. In Embodiment 1, the first ends E1 in the helical structures 7 arranged in each row in the second direction A2 are arranged in linear lines inclined with respect to the light incidence surface 13. Thus, the reflective surfaces 17 are inclined with respect to the light incidence surface 13. In other words, the phase of the helical structures 7 arranged in each row in the second direction A2 varies such that the reflective surfaces 17 are inclined with respect to the light incidence surface 13.

As illustrated in FIG. 2, the directions of orientation of the liquid crystal molecules 11 located on the light incidence surface 13 in the helical structures 7 arranged in each row in the second direction A2 differ. Accordingly, the phases of the helical structures 7 arranged in each row in the second direction A2 differ in terms of the second direction A2. The phase of each helical structure 7 may be defined as the rotation angle of the corresponding liquid crystal molecule 11. For example, the phases of the helical structures 7 that each include the liquid crystal molecule 11 whose direction of orientation is parallel to the second direction A2 on the light incidence surface 13 (the leftmost liquid crystal molecule 11 in FIG. 2) are 0 degrees. The phases of the helical structures 7 that each include the liquid crystal molecule 11 whose direction of orientation is perpendicular to the second direction A2 on the light incidence surface 13 (the fourth liquid crystal molecule 11 from the left in FIG. 2) are 90 degrees. The phases of the helical structures 7 that each include the liquid crystal molecule 11 whose direction of orientation is parallel to the second direction A2 on the light incidence surface 13 (the seventh liquid crystal molecule 11 from the left in FIG. 2) are 180 degrees.

In the present description, a distance between two helical structures 7 whose phases differ by 180 degrees in a direction is defined as a period of the helical structures 7. Accordingly, the phase at the end of one period is 180 degrees, and the phase at the beginning of the next period is 0 degrees. However, since the end of one period is the beginning of the next period, the direction of orientation of the liquid crystal molecule 11 at the end of the one period and the direction of orientation of the liquid crystal molecule 11 at the beginning of the next period are the same. In Embodiment 1, the distance between two helical structures 7 whose phases differ by 180 degrees in the second direction A2 is a period T1 of the helical structures 7.

In the helical structures 7 arranged in each row in the third direction A3, the directions of orientation of the liquid crystal molecules 11 located on the light incidence surface 13 are identical. Accordingly, the phases of the helical structures 7 arranged in each row in the third direction A3 are identical (i.e., substantially the same) in the third direction A3. For example, the phases of the helical structures 7 that each include the liquid crystal molecule 11 whose direction of orientation is parallel to the second direction A2 on the light incidence surface 13 (the leftmost liquid crystal molecule 11 in FIG. 2) are 0 degrees.

The inclination angle θ of the wavefront F3 of the light L3 with respect to the light incidence surface 13 is represented by formula (1) using the wavelength λ of the light L3 and the period T of the helical structures 7. Accordingly, the inclination angle θ3 is arc tan(λ/T1).

$$\theta = \text{arc tan}(\lambda/T) \tag{1}$$

FIG. 3 is a plan view illustrating phase distribution of the helical structures 7. FIG. 3 shows the phase distribution represented by the rotation angles of the liquid crystal molecules 11 when the liquid crystal layer 3 is viewed in the first direction A1. Furthermore, FIG. 3 shows the phase distribution in a range of the period T1, showing a phase of 0 degrees in a black color and a phase of 180 degrees in a white color. Gray colors having different densities are used to show values between 0 degrees and 180 degrees. A gray color having a higher density represents a value closer to 0 degrees, and a gray color having a lower density represents a value closer to 180 degrees.

As shown in FIG. 3, the phase of the helical structures 7 gradually increases from 0 degrees to 180 degrees from upstream to downstream in the second direction A2. In terms of the third direction A3, however, the helical structures 7 have a non-varying, identical (i.e., substantially the same) phase.

According to Embodiment 1, as described above with reference to FIGS. 1 to 3, the reflective surfaces 17 are non-parallel to the light incidence surface 13. It is therefore possible to reflect the light L3 in a direction different from a reflection direction in the case of specular reflection. As a result, the application range of the liquid crystal element 1 can be extended compared to a liquid crystal element adopting specular reflection.

In particular, in Embodiment 1, the reflective surfaces 17 are inclined with respect to the light incidence surface 13 and have linear gradients. It is therefore possible to polarize and reflect the light L3 such that the wavefront F3 has the inclination angle θ3 conforming to the inclination angle θ1 of the reflective surfaces 17. Since it is possible to polarize the light L3, the liquid crystal element 1 or a film produced through polymerization of the liquid crystal layer 3 is applicable to circularly polarized beam splitters or optical isolators.

Furthermore, according to Embodiment 1, the reflective surfaces 17, which are non-parallel to the light incidence surface 13, can be readily formed by controlling the directions of orientation of the liquid crystal molecules 11 using alignment technology common to liquid crystals (for example, photo-alignment technology), and further controlling the phases of the helical structures 7. Thus, the liquid crystal element 1 can be readily produced.

Furthermore, according to Embodiment 1, generation of defects or discontinuity in the helical structures 7 can be inhibited, because the reflective surfaces 17 are formed by controlling the phases of the helical structures 7. Consequently, abnormalities in the light L3 due to such defects or discontinuity can be reduced.

Furthermore, according to Embodiment 1, the liquid crystal element 1 can be produced more readily by using alignment technology common to liquid crystals than by using technology involving shape forming of a surface of the liquid crystal layer, because the reflective surfaces 17 are formed by controlling the phases of the helical structures 7.

Furthermore, according to Embodiment 1, the helical pitch p and the helical half pitch hp can be easily changed by changing liquid crystal materials, that is, by changing the type of the liquid crystal molecules 11. For example, the helical pitch p or the helical half pitch hp can be changed within a range of from several hundred nanometers to several hundred micrometers. The wavelength λ and the wavelength width Δλ of the light L3 that is reflected can be readily changed by changing the helical pitch p or the helical half pitch hp.

Furthermore, according to Embodiment 1, the light L1 having circular polarization in the same twist direction as the twist direction of the helix of the helical structures 7 (liquid crystal molecules 11) is used as incident light whereby the polarized light L3 can be extracted very efficiently.

Variation

Figure 4:
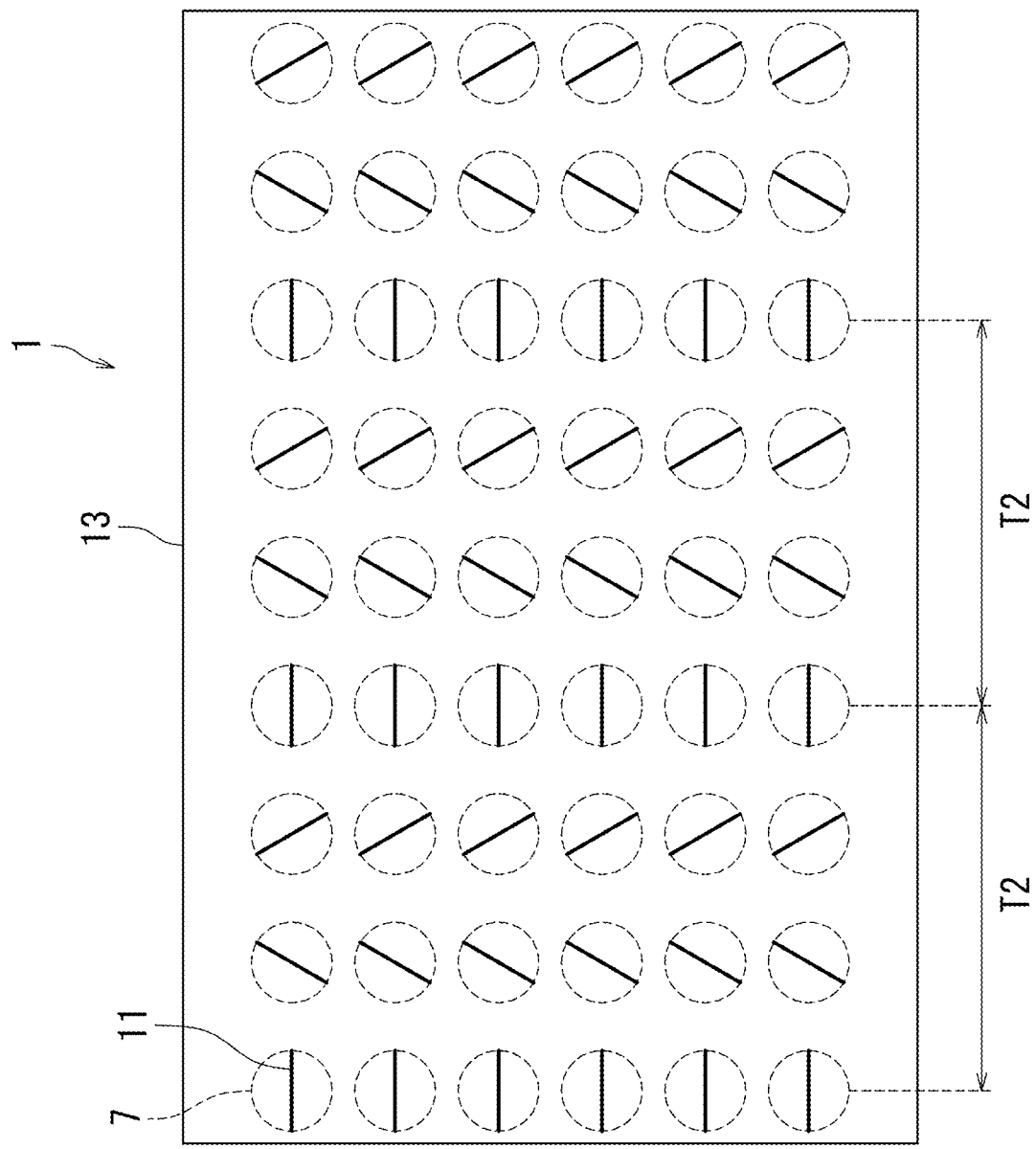
FIG. 4 is a plan view illustrating a liquid crystal element according to a variation of Embodiment 1 of the present invention.
Figure 5:
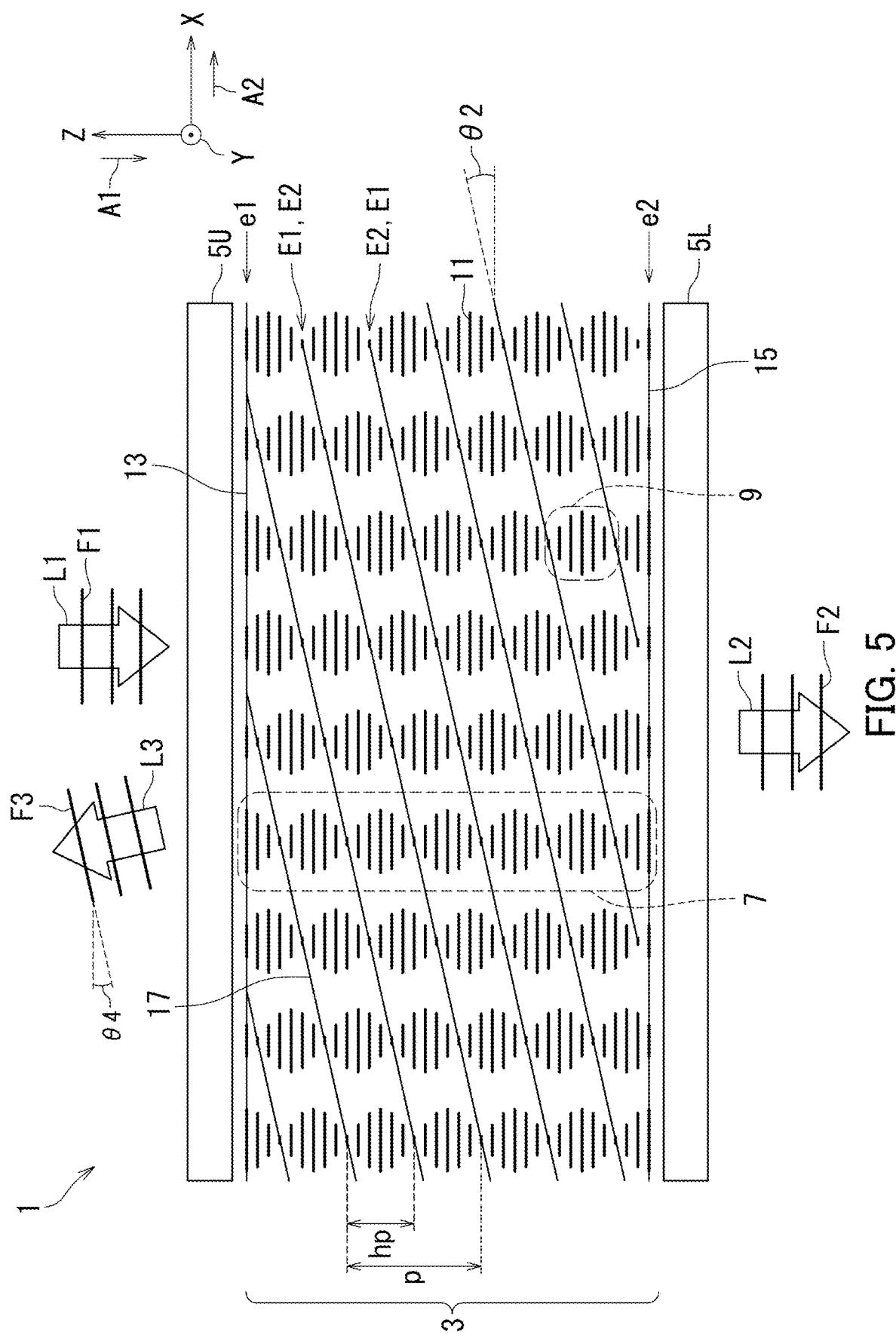
FIG. 5 is a cross-sectional view illustrating the liquid crystal element according to the variation of Embodiment 1 of the present invention.

The following describes the liquid crystal element 1 according to a variation of Embodiment 1 of the present invention with reference to FIGS. 4 to 6. The liquid crystal element 1 according to the variation is different from the liquid crystal element 1 according to Embodiment 1 described with reference to FIGS. 1 to 3 in that the reflective surfaces 17 of the liquid crystal element 1 according to the variation has a larger inclination angle. The following mainly describes differences between the variation and Embodiment 1.

FIG. 4 is a plan view illustrating the liquid crystal element 1 according to the variation. FIG. 5 is a cross-sectional view illustrating the liquid crystal element 1 according to the variation. As illustrated in FIG. 4, a period T2 of the helical structures 7 in the liquid crystal element 1, which is a reflective structure, is approximately half the period T1 described with reference to FIG. 2. Accordingly, as illustrated in FIG. 5, an inclination angle θ2 of the reflective surfaces 17 with respect to the light incidence surface 13 is approximately twice the inclination angle θ1 described with reference to FIG. 1. The reflective surfaces 17 reflect the light L3 depending on the inclination angle θ2. In the variation, an inclination angle θ4 of the wavefront F3 of the light L3 with respect to the light incidence surface 13 is substantially the same as the inclination angle θ2 of the reflective surfaces 17. Accordingly, the inclination angle θ4 of the wavefront F3 of the light L3 according to the variation is approximately twice the inclination angle θ3 of the wavefront F3 of the light L3 according to the embodiment.

FIG. 6 is a plan view illustrating phase distribution of the helical structures 7 of the liquid crystal element 1 according to the variation. FIG. 6 shows the phase distribution represented by the rotation angles of the liquid crystal molecules 11 when the liquid crystal layer 3 is viewed in the first direction A1. Furthermore, FIG. 6 shows the phase distribution in a range twice that of the period T2, showing phases in the same manner as in FIG. 3.

As illustrated in FIG. 6, the phase of the helical structures 7 gradually increases from 0 degrees to 180 degrees from upstream to downstream in the second direction A2 in a range of one period T2 (a range of the left-hand period T2 in FIG. 6). Likewise, the phase of the helical structures 7 gradually increases from 0 degrees to 180 degrees from upstream to downstream in the second direction A2 in a range of the other period T2 (a range of the right-hand period T2 in FIG. 6). In terms of the third direction A3, however, the helical structures 7 have a non-varying, identical (i.e., substantially the same) phase.

According to Embodiment 1 and the variation thereof, as described above with reference to FIGS. 1 to 6, the inclination angle θ of the wavefront F3 of the light L3 can be readily adjusted by adjusting the period T of the helical structures 7 (formula (1)). That is, the polarization direction of the light L3 can be readily adjusted. The length of the period T of the helical structures 7 can be determined as desired by using alignment technology common to liquid crystals (for example, photo-alignment technology). The larger the period T is, the smaller the inclination angle θ is. The smaller the period T is, the larger the inclination angle θ is.

Embodiment 2

Figure 7:
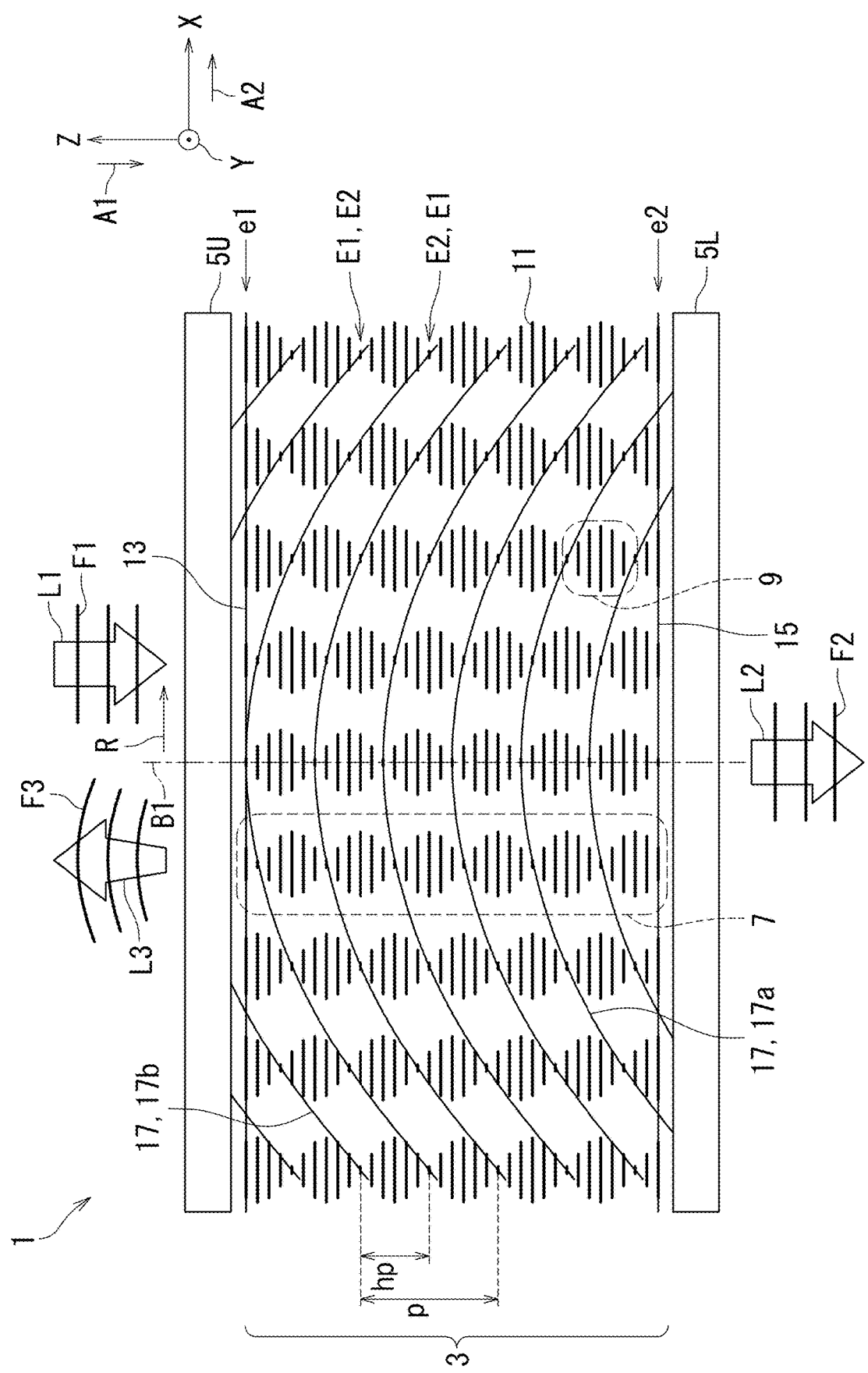
FIG. 7 is a cross-sectional view illustrating a liquid crystal element according to Embodiment 2 of the present invention.
Figure 8:
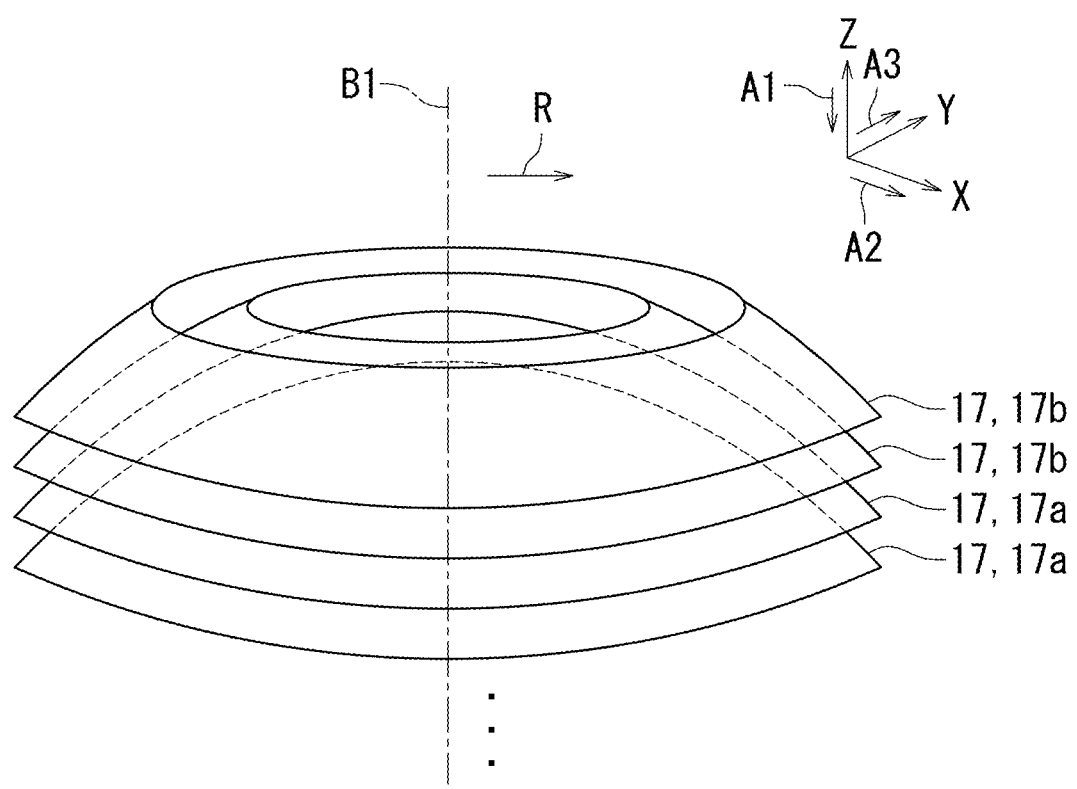
FIG. 8 is a perspective view illustrating a plurality of reflective surfaces of the liquid crystal element according to Embodiment 2 of the present invention.

The following describes the liquid crystal element 1 according to Embodiment 2 of the present invention with reference to FIGS. 7 to 9. Embodiment 2 is different from Embodiment 1 in that the reflective surfaces 17 according to Embodiment 2 are curved surfaces. The following mainly describes differences between Embodiment 2 and Embodiment 1.

FIG. 7 is a cross-sectional view illustrating the liquid crystal element 1 according to Embodiment 2. As illustrated in FIG. 7, the liquid crystal element 1, which is a reflective structure, has the reflective surfaces 17. Each of the reflective surfaces 17 includes one of the first ends E1 included in each of the helical structures 7. The reflective surfaces 17 are substantially parallel to one another and are arranged at equal intervals each corresponding to the helical half pitch hp.

The reflective surfaces 17 are non-parallel to the light incidence surface 13. In Embodiment 2, the reflective surfaces 17 are inclined with respect to the light incidence surface 13 and are curved surfaces projecting toward the light incidence surface 13. The reflective surfaces 17 reflect the light L3 such that the wavefront F3 of the light L3 is a curved surface conforming to the reflective surfaces 17. That is, the reflective surfaces 17 reflect the light L3 such that the light L3 is diffused.

The following describes the reflective surfaces 17 in detail with reference to FIG. 8. FIG. 8 is a perspective view illustrating the reflective surfaces 17. As illustrated in FIG. 8, the reflective surfaces 17 are stacked along a symmetry axis B1 at equal intervals each corresponding to the helical half pitch hp. In Embodiment 2, the symmetry axis B1 is substantially parallel to the first direction A1. Each of the reflective surface 17 is symmetrical with respect to the symmetry axis B1. The reflective surfaces 17 include dome-like reflective surfaces 17a and truncated dome-like reflective surfaces 17b.

The following describes the liquid crystal element 1 in terms of spatial phase with reference to FIGS. 7 and 9. As illustrated in FIG. 7, the helical structures 7 are arranged symmetrically with respect to the symmetry axis B1 and radially about the symmetry axis B1. The phases of the helical structures 7 arranged in a radial direction R differ. The radial direction R is a direction that is substantially perpendicular to the symmetry axis B1 and that extends away from the symmetry axis B1. The radial direction R may be any direction from among 360 degrees so long as the direction is substantially perpendicular to the symmetry axis B1 and extends away from the symmetry axis B1.

The first ends E1 in the helical structures 7 arranged in the radial direction R are arranged in curved lines (for example, in parabolas). Thus, the reflective surfaces 17 form curved surfaces. In other words, the phase of the helical structures 7 varies such that the reflective surfaces 17 form curved surfaces.

Figure 9A:
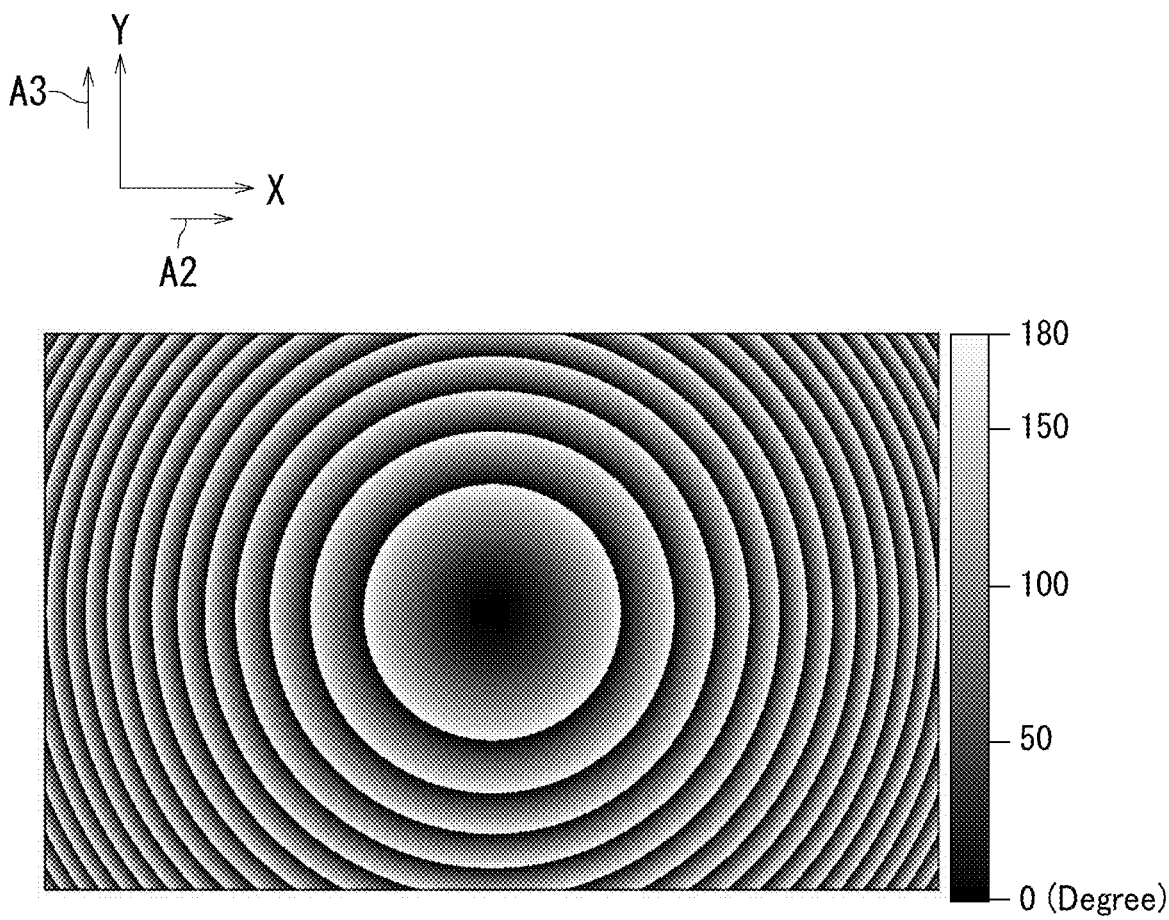
FIG. 9A is a plan view showing phase distribution of a plurality of helical structures of the liquid crystal element according to Embodiment 2 of the present invention.
Figure 9B:
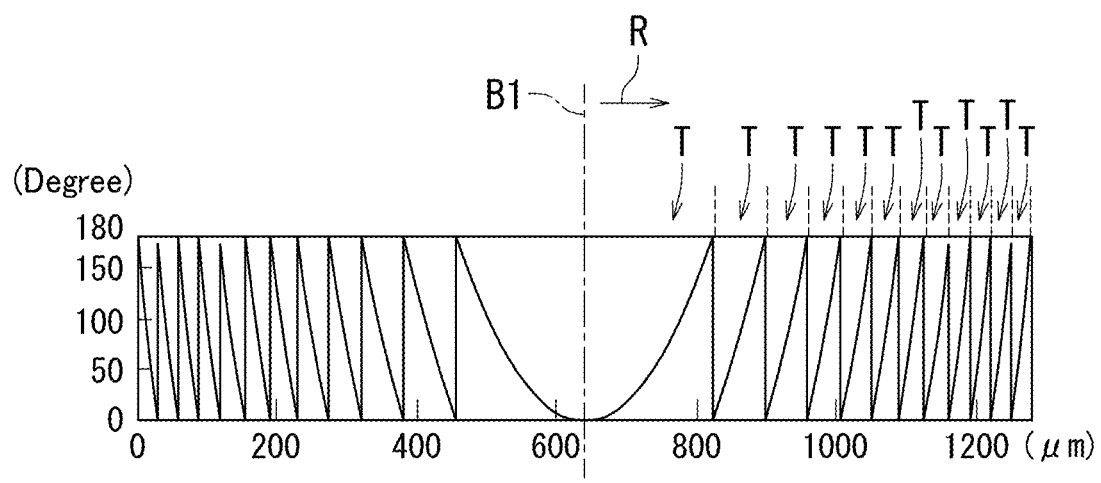
FIG. 9B is a graph showing phase distribution of the helical structures of the liquid crystal element according to Embodiment 2 of the present invention.

FIG. 9A is a plan view illustrating phase distribution of the helical structures 7. FIG. 9A shows the phase distribution represented by the rotation angles of the liquid crystal molecules 11 when the liquid crystal layer 3 is viewed in the first direction A1. Furthermore, FIG. 9A shows phases in the same manner as in FIG. 3. FIG. 9B is a graph showing the phase distribution of the helical structures 7. The vertical axis represents phase represented by rotation angle of the liquid crystal molecules 11, and the horizontal axis represents location on the liquid crystal layer 3 in the radial direction R.

As shown in FIGS. 9A and 9B, the phase distribution of the helical structures 7 is symmetrical with respect to the symmetry axis B1 and concentric. The phase of the helical structures 7 varies in a sawtooth manner in the radial direction R. In each of the periods T of the helical structures 7, the phase of the helical structures 7 varies curvedly from 0 degrees to 180 degrees from upstream to downstream in the radial direction R, starting from the symmetry axis B1. For example, the phase varies parabolically (i.e., quadratically).

In Embodiment 2, a distance between two helical structures 7 whose phases differ by 180 degrees in the radial direction R is the period T of the helical structures 7. Accordingly, the phase at the end of one period T is 180 degrees, and the period at the beginning of the next period T is 0 degrees. However, since the end of one period T is the beginning of the next period, the direction of orientation of the liquid crystal molecule 11 at the end of the one period T and the direction of orientation of the liquid crystal molecule 11 at the beginning of the next period T1 are the same. The period T decreases gradually from upstream to downstream in the radial direction R, starting from the symmetry axis B1. The larger the period T is, the smaller the phase gradient is, and the smaller the period T is, the larger the phase gradient is.

According to Embodiment 2, as described above with reference to FIGS. 7 to 9, the reflective surfaces 17 are non-parallel to the light incidence surface 13. As in the case of Embodiment 1, therefore, the application range of the liquid crystal element 1 can be extended compared to a liquid crystal element adopting specular reflection. In addition to the above, Embodiment 2 also achieves the same effects as Embodiment 1.

In particular, the reflective surfaces 17 according to Embodiment 2 include curved surfaces. It is therefore possible to diffusely reflect the light L3 such that the wavefront F3 thereof conforms to the curved surfaces. Since it is possible to diffuse the light L3, the liquid crystal element 1 or a film produced through polymerization of the liquid crystal layer 3 is for example applicable to holographic elements. Furthermore, each of the reflective surfaces 17 is symmetrical with respect to the symmetry axis B1. It is therefore possible to diffuse the light L3 evenly about the symmetry axis B1.

Furthermore, according to Embodiment 2, the diffusion range of the light L3 (i.e., the extent that the light L3 spreads) can be readily adjusted by adjusting the period T of the helical structures 7. The length of the period T of the helical structures 7 can be determined as desired by using alignment technology common to liquid crystals (for example, photo-alignment technology). Increasing the period T increases the curvature radius of the reflective surfaces 17, and thus reduces the diffusion range of the light L3. Reducing the period T reduces the curvature radius of the reflective surfaces 17, and thus extends the diffusion range of the light L3. Since it is possible to readily adjust viewing angle characteristics as the diffusion range of the light L3, for example, the liquid crystal element 1 or a film produced through polymerization of the liquid crystal layer 3 is suitably applicable to displays.

Furthermore, according to Embodiment 2, the phase distribution of the helical structures 7 is in a sawtooth shape that is symmetrical with respect to the symmetry axis B1. The dome-like reflective surfaces 17a and the truncated dome-like reflective surfaces 17b are stacked corresponding to the phase distribution in the sawtooth shape. It is therefore possible to diffusely reflect the light L3 more effectively.

Furthermore, according to Embodiment 2, the light L3 is diffused using the reflective surfaces 17 formed by controlling the phases of the helical structures 7. Therefore, generation of defects or discontinuity in the helical structures 7 can be inhibited compared to the case where light is diffused using helical structures arranged with the direction of the helix axes thereof varied. Consequently, abnormalities in the light L3 due to such defects or discontinuity can be reduced.

Furthermore, according to Embodiment 2, the light L3 is diffused using the reflective surfaces 17 formed by controlling the phases of the helical structures 7. Therefore, the liquid crystal element 1 can be produced more readily by using alignment technology common to liquid crystals than the case where light is diffused by using technology involving shape forming of the surface of the liquid crystal layer.

Furthermore, according to Embodiment 2, the light L1 having circular polarization in the same twist direction as the twist direction of the helix of the helical structures 7 (liquid crystal molecules 11) is used as incident light whereby the diffused light L3 can be extracted very efficiently.

Embodiment 3

Figure 10:
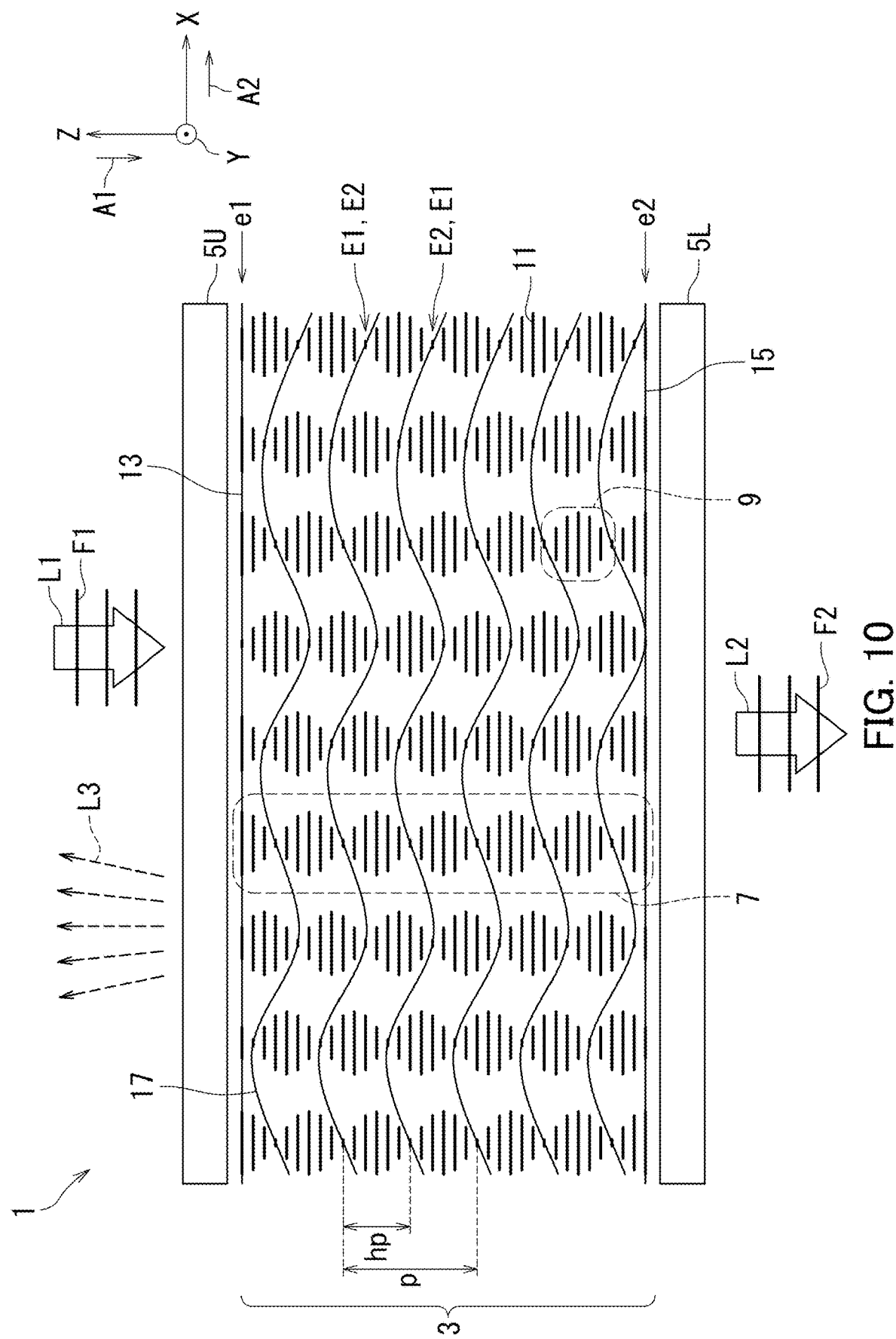
FIG. 10 is a cross-sectional view illustrating a liquid crystal element according to Embodiment 3 of the present invention.
Figure 11:
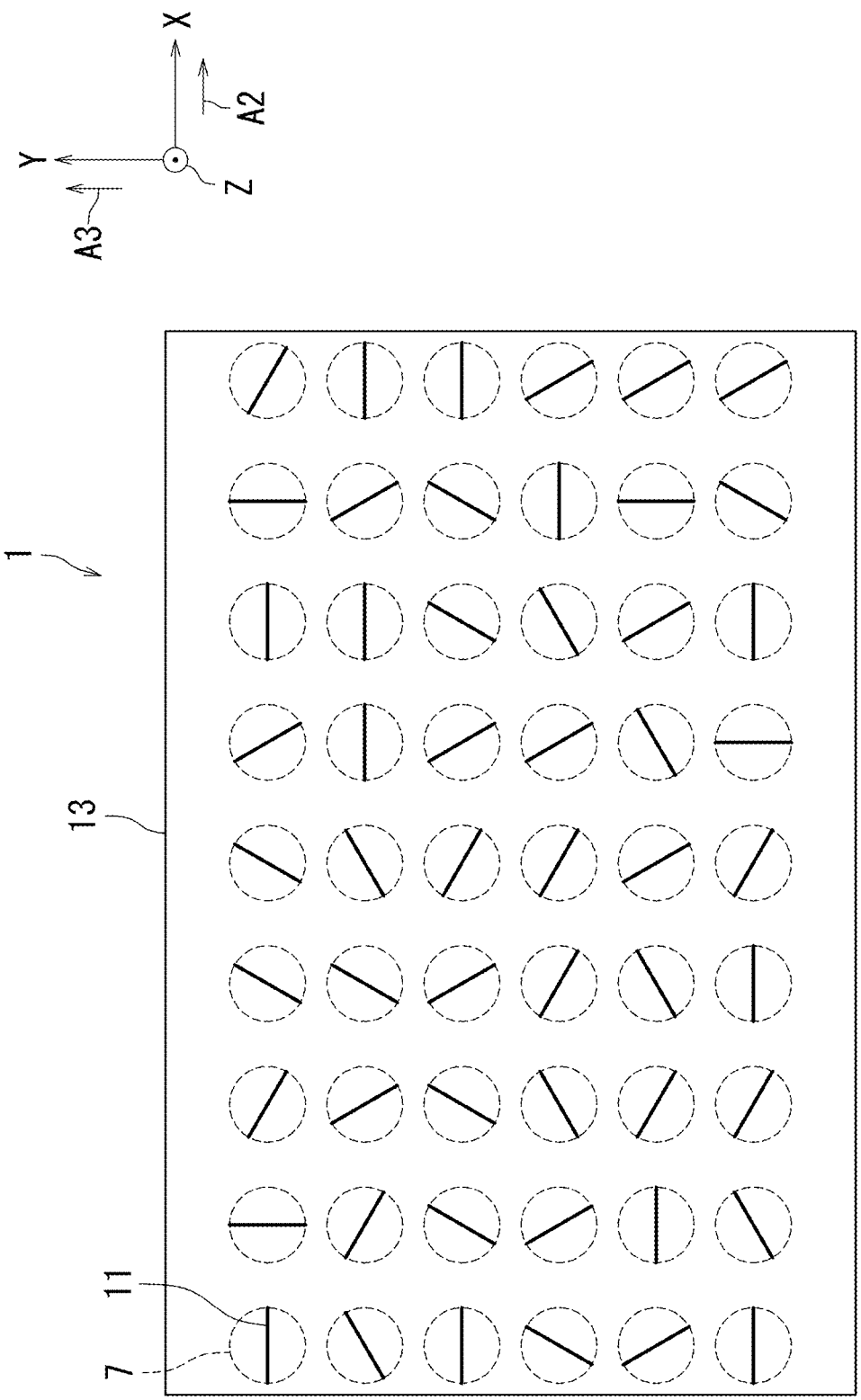
FIG. 11 is a plan view illustrating the liquid crystal element according to Embodiment 3 of the present invention.

The following describes the liquid crystal element 1 according to Embodiment 3 of the present invention with reference to FIGS. 10 to 12. Embodiment 3 is different from Embodiment 1 in that the reflective surfaces 17 according to Embodiment 3 include irregularities. The following mainly describes differences between Embodiment 3 and Embodiment 1.

FIG. 10 is a cross-sectional view illustrating the liquid crystal element 1 according to Embodiment 3. As illustrated in FIG. 10, the liquid crystal element 1, which is a reflective structure, has the reflective surfaces 17. Each of the reflective surfaces 17 includes one of the first ends E1 included in each of the helical structures 7. The reflective surfaces 17 are substantially parallel to one another and are arranged at equal intervals each corresponding to the helical half pitch hp. The reflective surfaces 17 are non-parallel to the light incidence surface 13. In Embodiment 3, the reflective surfaces 17 include irregularities and diffuse the light L3.

The following describes the liquid crystal element 1 viewed in the first direction A1 with reference to FIG. 11. FIG. 11 is a plan view illustrating the liquid crystal element 1. FIG. 11 does not show the substrates 5U and 5L and shows the light incidence surface 13 in order to simplify the drawings. As illustrated in FIG. 11, the helical structures 7 are arranged in rows in the second direction A2 and in the third direction A3.

The following describes the liquid crystal element 1 in terms of spatial phase with reference to FIGS. 10 to 12. As illustrated in FIGS. 10 and 11, the phases of the helical structures 7 arranged in each row in the second direction A2 differ in the second direction A2, and the phases of the helical structures 7 arranged in each row in the third direction A3 differ in the third direction A3. According to Embodiment 3, the phase of the helical structures 7 arranged in each row in the second direction A2 irregularly varies in the second direction A2, and the phase of the helical structures 7 arranged in each row in the third direction A3 irregularly varies in the third direction A3. Accordingly, the first ends E1 in the helical structures 7 arranged in each row in the second direction A2 are irregularly arranged, and the first ends E1 in the helical structures 7 arranged in each row in the third direction A3 are irregularly arranged. As a result, the reflective surfaces 17 include irregularities and are non-parallel to the light incidence surface 13. In other words, the phase of the helical structures 7 arranged in each row in the second direction A2 and the phase of the helical structures 7 arranged in each row in the third direction A3 vary such that the reflective surfaces 17 include irregularities.

FIG. 12 is a plan view illustrating phase distribution of the helical structures 7. FIG. 12 shows the phase distribution represented by the rotation angles of the liquid crystal molecules 11 when the liquid crystal layer 3 is viewed in the first direction A1. Furthermore, FIG. 12 shows phases in the same manner as in FIG. 3. As illustrated in FIG. 12, the phases of the helical structures 7 are irregularly distributed. For example, the phases of the helical structures 7 are randomly distributed.

According to Embodiment 3, as described above with reference to FIGS. 10 to 12, the reflective surfaces 17 are non-parallel to the light incidence surface 13. As in the case of Embodiment 1, therefore, the application range of the liquid crystal element 1 can be extended compared to a liquid crystal element adopting specular reflection. In addition to the above, Embodiment 3 also achieves the same effects as Embodiment 1.

In particular, the reflective surfaces 17 according to Embodiment 3 include irregularities. It is therefore possible to diffuse the light L3 according to the irregularities without depending on the incidence angle of the light L1. That is, it is possible to diffuse the light L3 without depending on the incidence angle of the light L1 by varying the phase of the helical structures 7 in fine periods. The liquid crystal element 1 or a film produced through polymerization of the liquid crystal layer 3 is for example applicable to light reflective films or screens having no viewing angle characteristics or to authenticity checking.

Furthermore, the liquid crystal layer 3 is formed such that the wavelength band of the reflected light L3 is a near-infrared wavelength band. That is, the helical pitch p, the refractive index ne, and the refractive index no are determined such that the wavelength band of the reflected light L3 is a near-infrared wavelength band. In such a situation, the liquid crystal layer 3 can for example reflect heat rays (for example, sunlight) effectively. Accordingly, a film produced through polymerization of the liquid crystal layer 3 can for example be used effectively as a heat-ray reflective film to be attached to a window. The near-infrared wavelength band is for example in a range of from 0.75 μm to 1.4 μm.

Furthermore, according to Embodiment 3, the phase of the helical structures 7 is varied in fine periods to form the reflective surfaces 17 including irregularities, and thus a principle of light reflection by Morpho butterfly wing scales can be duplicated.

Furthermore, according to Embodiment 3, the reflective surfaces 17 including irregularities can be readily formed by controlling the directions of orientation of the liquid crystal molecules 11 using alignment technology common to liquid crystals (for example, photo-alignment technology), and further controlling the phases of the helical structures 7. Thus, the liquid crystal element 1 that is capable of diffusing the light L3 can be readily produced.

Furthermore, according to Embodiment 3, the light L1 having circular polarization in the same twist direction as the twist direction of the helix of the helical structures 7 (liquid crystal molecules 11) is used as incident light whereby the diffused light L3 can be extracted very efficiently.

Embodiment 4

The following describes the liquid crystal element 1 according to Embodiment 4 of the present invention with reference to FIGS. 13 to 17. Embodiment 4 is different from Embodiment 1 in that Embodiment 4 has a helical reflective surface 17. The following mainly describes differences between Embodiment 4 and Embodiment 1.

Figure 13:
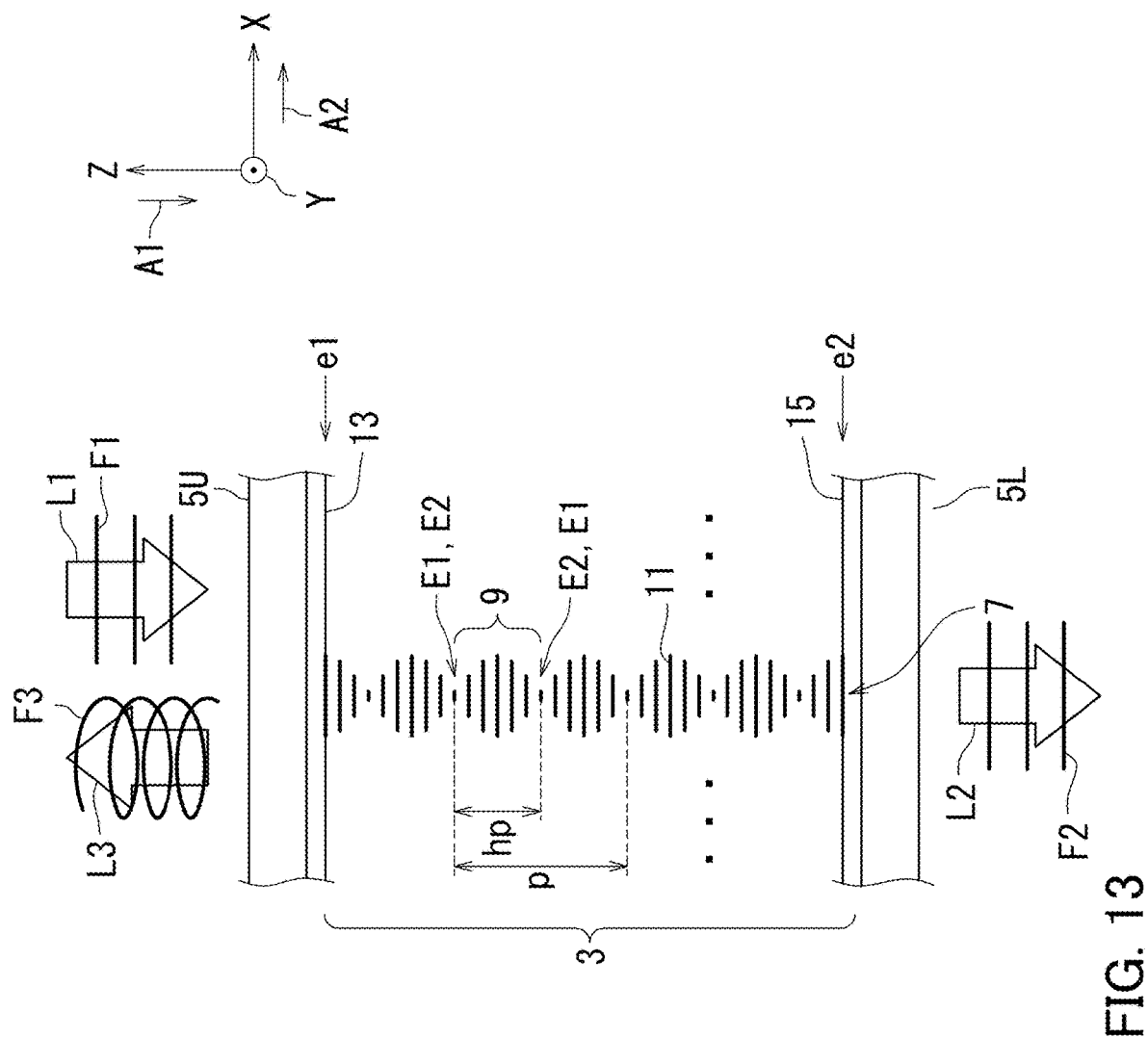
FIG. 13 is a cross-sectional view illustrating a liquid crystal element according to Embodiment 4 of the present invention.
Figure 14:
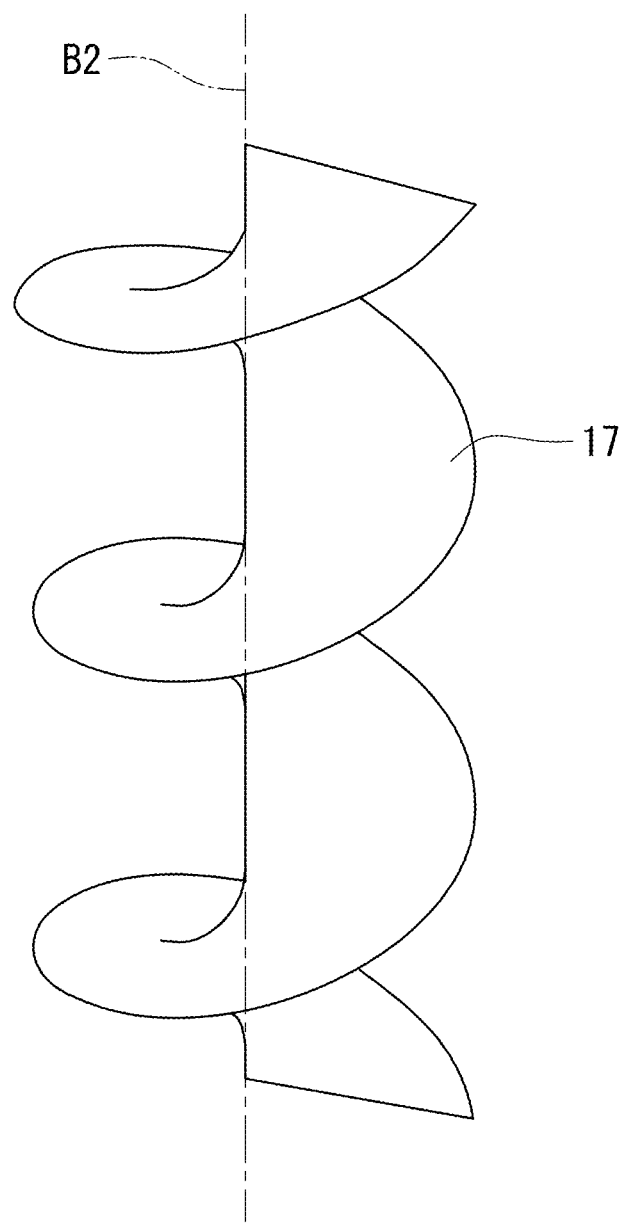
FIG. 14 is a perspective view illustrating a reflective surface of the liquid crystal element according to Embodiment 4 of the present invention.

FIG. 13 is a cross-sectional view illustrating the liquid crystal element 1 according to Embodiment 4. FIG. 14 is a perspective view illustrating the reflective surface 17 of the liquid crystal element 1. As illustrated in FIGS. 13 and 14, the liquid crystal element 1, which is a reflective structure, has the reflective surface 17. The reflective surface 17 is a helical surface that is formed around a helix axis B2, and includes one or more of the first ends E1 included in each of the helical structures 7. The helix axis B2 is substantially parallel to the first direction A1. Alternatively, the helix axis B2 may be inclined with respect to the first direction A1.

The reflective surface 17 reflects the light L3 such that the wavefront F3 of the light L3 is a helical surface conforming to the reflective surface 17. That is, the light L3 is reflected as an optical vortex by the reflective surface 17. The optical vortex is light having a singularity and an equiphase surface that forms a helical surface. The light intensity is 0 at the singularity. In Embodiment 4, the singularity is located on the helix axis B2.

Figure 15:
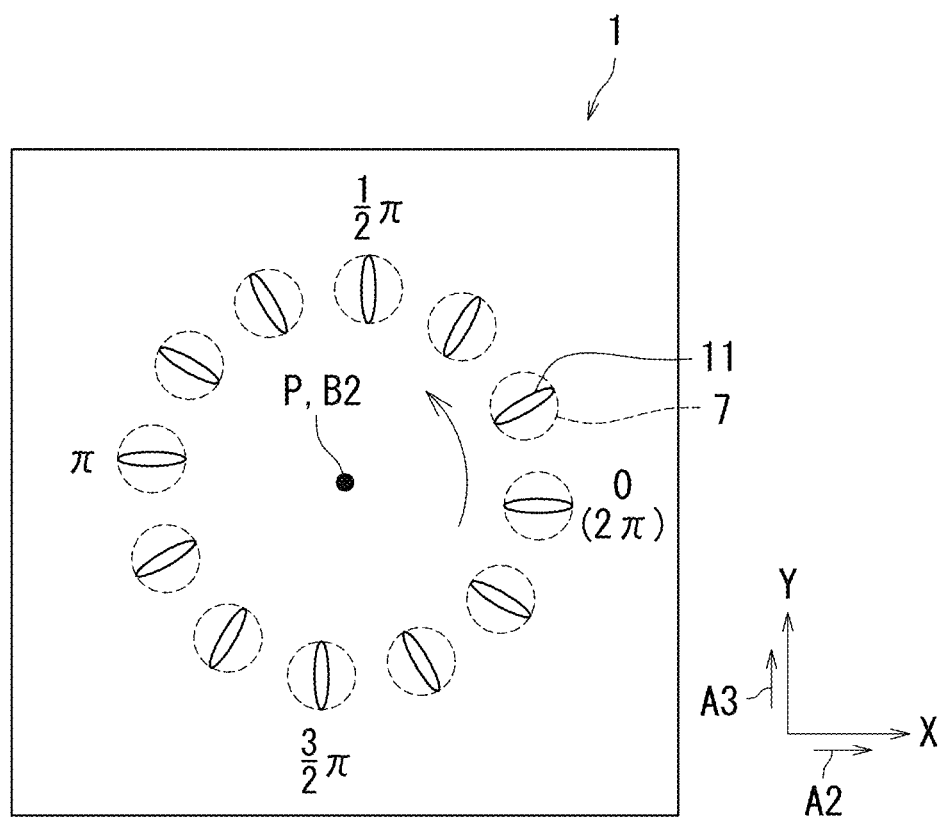
FIG. 15 is a plan view illustrating direction of orientation of liquid crystal molecules of the liquid crystal element according to Embodiment 4 of the present invention.

The following describes the liquid crystal element 1 in terms of spatial phase with reference to FIGS. 15 to 17. FIG. 15 is a plan view illustrating the directions of orientation of the liquid crystal molecules 11. FIG. 15 shows the liquid crystal molecules 11 on the reflective surface 17. As illustrated in FIG. 15, the liquid crystal molecules 11 rotate by $2\pi$ (radians) around a singularity P. Accordingly, the phase of the helical structures 7 varies by $2\pi$ around the singularity P. As a result, the phase of the light L3 varies by $4\pi$.

FIG. 16 is a plan view illustrating phase distribution of the helical structures 7. FIG. 16 shows the phase distribution represented by the rotation angles of the liquid crystal molecules 11 when the liquid crystal layer 3 is viewed in the first direction A1. Furthermore, FIG. 16 shows phases in the same manner as in FIG. 3. As illustrated in FIG. 16, the phase of the helical structure 7 varies by $2\pi$ around the singularity P.

However, the phase of the helical structures 7 may vary by $n\pi$ (radians) around the singularity P. n represents an integer of at least 1. That is, the liquid crystal molecules 11 may rotate by $n\pi$ around the singularity P. In such a situation, the phase of the light L3 varies by $2n\pi$. The following describes an example in which the liquid crystal molecules 11 rotate by $7\pi$ around the singularity P and an example in which the liquid crystal molecules 11 rotate by $3\pi$ around the singularity P.

Figure 17A:
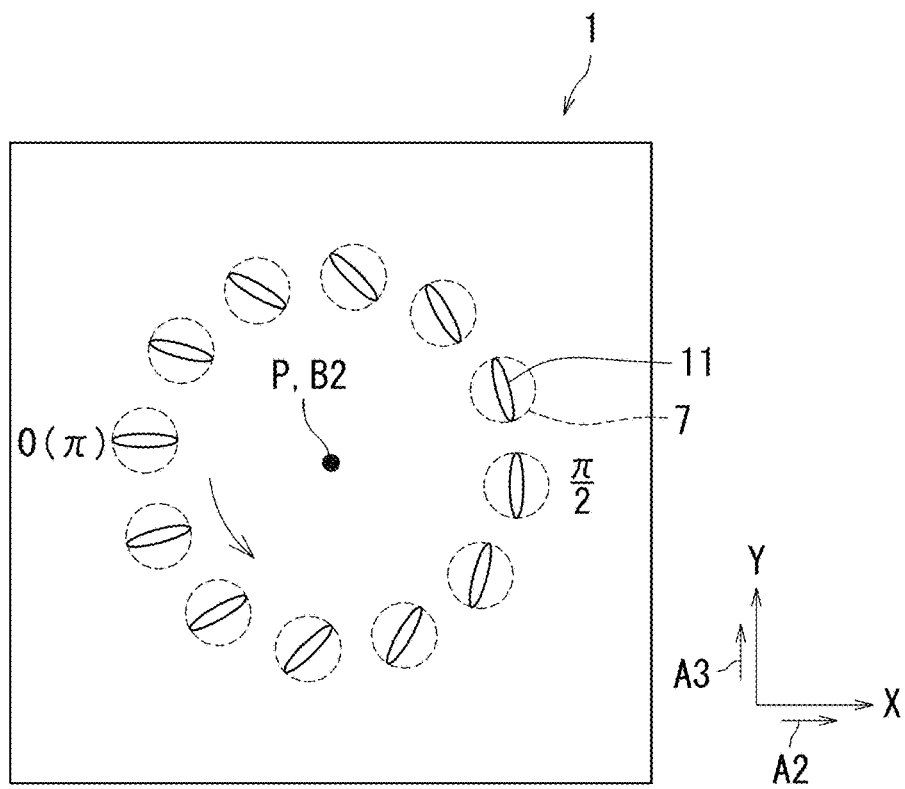
FIGS. 17A and 17B are plan views each illustrating direction of orientation of the liquid crystal molecules of the liquid crystal element according to Embodiment 4 of the present invention.

FIG. 17A is a plan view illustrating the direction of orientation of the liquid crystal molecules 11. In FIG. 17A, the liquid crystal molecules 11 rotate by $7\pi$ around the singularity P. Accordingly, the phase of the helical structures 7 varies by $7\pi$ around the singularity P. As a result, the phase of the light L3 varies by $2\pi$.

Figure 17B:
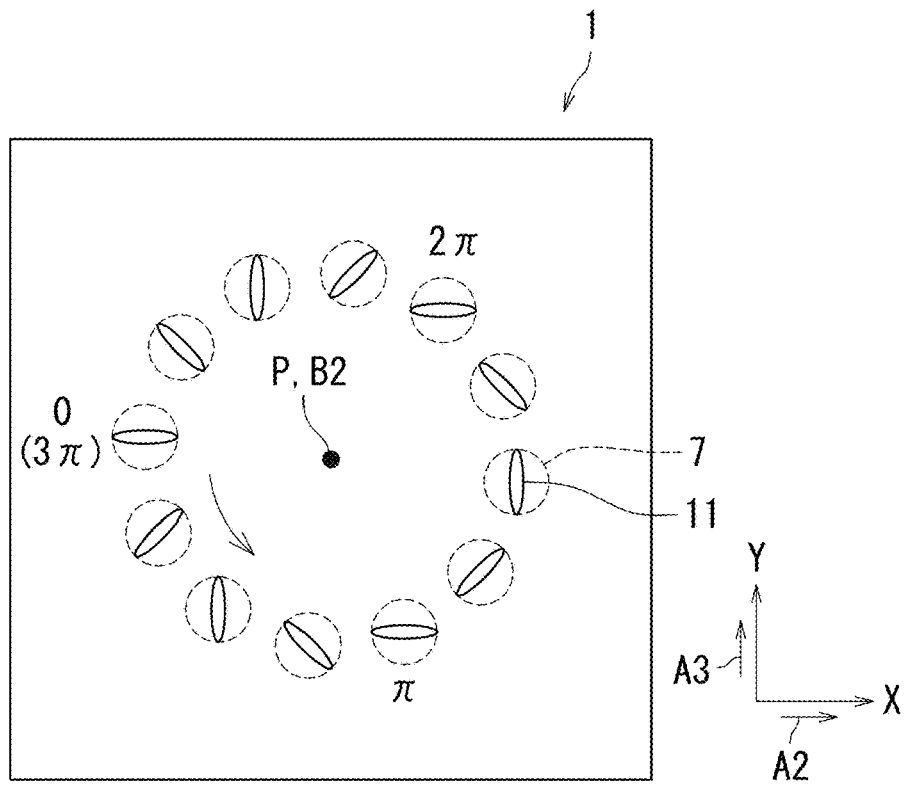

FIG. 17B is a plan view illustrating the direction of orientation of the liquid crystal molecules 11. In FIG. 17B, the liquid crystal molecules 11 rotate by $3\pi$ around the singularity P. Accordingly, the phase of the helical structures 7 varies by $3\pi$ around the singularity P. As a result, the phase of the light L3 varies by $6\pi$.

According to Embodiment 4, as described above with reference to FIGS. 13 to 17, the reflective surface 17 is non-parallel to the light incidence surface 13. As in the case of Embodiment 1, therefore, the application range of the liquid crystal element 1 can be extended compared to a liquid crystal element adopting specular reflection. In addition to the above, Embodiment 4 also achieves the same effects as Embodiment 1.

In particular, the reflective surface 17 according to Embodiment 4 includes a helical surface. The light L3 can therefore be reflected as an optical vortex. The use of the liquid crystal element 1 enables generation of optical vortices through an optical system having a simple configuration. The light L1 having a wavelength corresponding to the helical pitch p is used as incident light whereby the light L3 being an optical vortex can be generated. Thus, the light L3 of a broad wavelength band corresponding to helical pitches p that the helix can take is available. The liquid crystal element 1 can therefore readily generate optical vortices without significant constraints from the optical system compared to an element that generates an optical vortex using a single wavelength. Furthermore, the light L1 within the wavelength width $\Delta\lambda$ can be used as well as the light L1 having the center wavelength $\lambda$. It is therefore possible to generate optical vortices more readily. Optical vortices are for example used for laser processing or microscopic manipulation of cells. Therefore, the liquid crystal element 1 or a film produced through polymerization of the liquid crystal layer 3 is suitably applicable to such fields.

Furthermore, according to Embodiment 4, the helical reflective surface 17 can be readily formed by controlling the directions of orientation of the liquid crystal molecules 11 using alignment technology common to liquid crystals (for example, photo-alignment technology), and further controlling the phases of the helical structures 7. Thus, the liquid crystal element 1 for generating optical vortices can be readily produced.

Furthermore, according to Embodiment 4, the light L1 having circular polarization in the same twist direction as the twist direction of the helix of the helical structures 7 (liquid crystal molecules 11) is used as incident light whereby the light L3 being an optical vortex can be extracted very efficiently.

Embodiment 5

Figure 18:
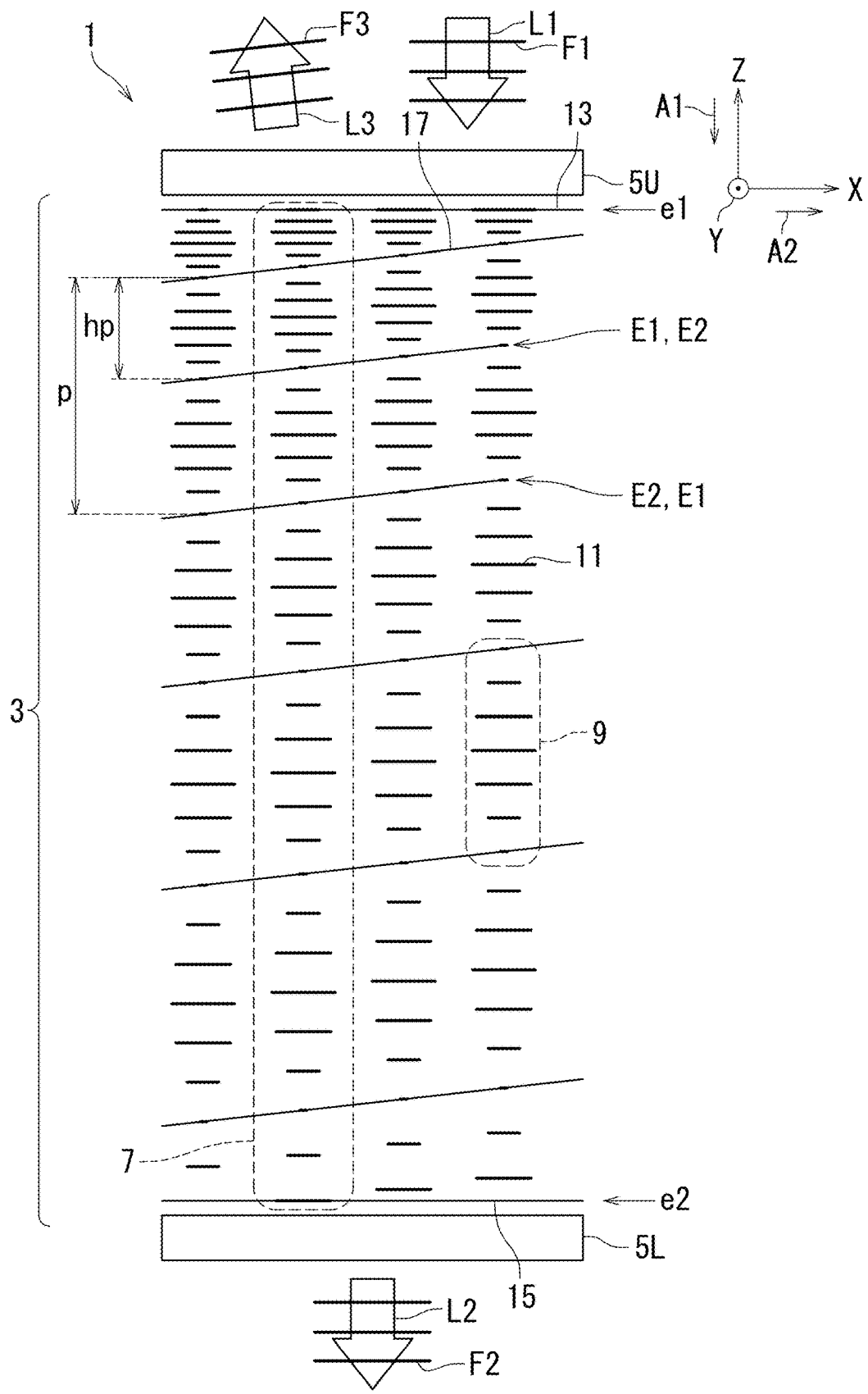
FIG. 18 is a cross-sectional view illustrating a liquid crystal element according to Embodiment 5 of the present invention.

The following describes the liquid crystal element 1 according to Embodiment 5 of the present invention with reference to FIG. 18. Embodiment 5 is different from Embodiment 1 in that the helical pitch p varies in each of the helical structures 7 in Embodiment 5. The following mainly describes differences between Embodiment 5 and Embodiment 1.

FIG. 18 is a cross-sectional view illustrating the liquid crystal element 1 according to Embodiment 5 of the present invention. As illustrated in FIG. 18, the liquid crystal element 1, which is a reflective structure, includes the liquid crystal layer 3. The liquid crystal layer 3 includes the helical structures 7. Each of the helical structures 7 includes the structure units 9. The liquid crystal element 1 has the reflective surfaces 17.

In each of the helical structures 7, the helical half pitch hp varies. Specifically, in each of the helical structures 7, the helical half pitch hp increases with increasing distance from the light incidence surface 13. Likewise, in each of the helical structures 7, the helical pitch p varies. Specifically, in each of the helical structures 7, the helical pitch p increases with increasing distance from the light incidence surface 13.

The reflective surfaces 17 are substantially parallel to one another and are arranged at intervals corresponding to the helical half pitch hp. Since the helical half pitch hp increases with increasing distance from the light incidence surface 13, the distance between adjacent reflective surfaces 17 increases with increasing distance from the light incidence surface 13.

Each of the reflective surfaces 17 includes one of the first ends E1 included in each of the helical structures 7. Each of the reflective surfaces 17 intersects with the first direction A1 and selectively reflects the light L3 out of the light L1 coming through the light incidence surface 13 according to Bragg's law. In such a situation, the wavelength width Δλ of reflected light varies depending on the helical pitch p, because the helical pitch p varies in each of the helical structures 7. The wavelength width of the reflected light L3 is therefore wide as being a sum of values of the wavelength width Δλ corresponding to respective values of the helical pitch p. That is, the reflective surfaces 17 reflect broadband light L3. For example, the reflective surfaces 17 reflect the light L3 being white light.

According to Embodiment 5, as described above with reference to FIG. 18, the reflective surfaces 17 are non-parallel to the light incidence surface 13. As in the case of Embodiment 1, therefore, the application range of the liquid crystal element 1 can be extended compared to a liquid crystal element adopting specular reflection. In addition to the above, Embodiment 5 also achieves the same effects as Embodiment 1.

In particular, in each of the helical structures 7 according to Embodiment 5, the helical half pitch hp varies and/or the helical pitch p varies. As a result, it is possible to readily generate the broadband light L3 (for example, white light).

Furthermore, according to Embodiment 5, the light L1 having circular polarization in the same twist direction as the twist direction of the helix of the helical structures 7 (liquid crystal molecules 11) is used as incident light whereby the broadband light L3 (for example, white light) can be extracted very efficiently.

Embodiment 6

Figure 19:
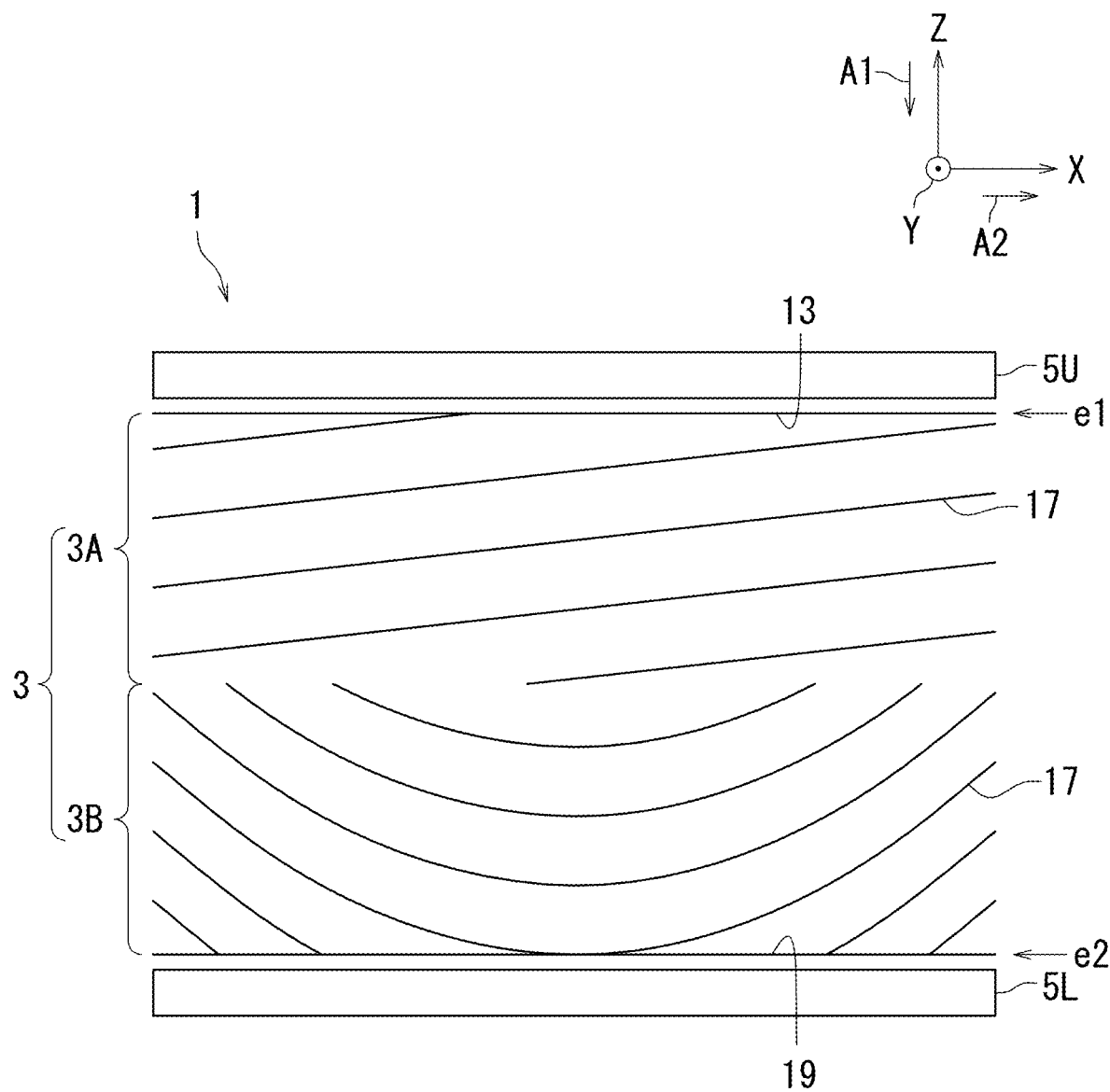
FIG. 19 is a cross-sectional view illustrating a liquid crystal element according to Embodiment 6 of the present invention.

The following describes the liquid crystal element 1 according to Embodiment 6 of the present invention with reference to FIG. 19. The liquid crystal element 1 according to Embodiment 6 is different from the liquid crystal element 1 according to Embodiment 1 in that the liquid crystal layer 3 of the liquid crystal element 1 according to Embodiment 6 has two regions (a first region 3A and a second region 3B).

The following mainly describes differences between Embodiment 6 and Embodiment 1.

FIG. 19 is a cross-sectional view illustrating the liquid crystal element 1 according to Embodiment 6. FIG. 19 does not show the helical structures 7 in order to simplify the drawings. As illustrated in FIG. 19, the liquid crystal element 1, which is a reflective structure, includes the liquid crystal layer 3, the substrate 5U, and the substrate 5L. The liquid crystal layer 3 includes the first region 3A and the second region 3B. The first region 3A and the second region 3B are arranged in the first direction A1 and located between the substrate 5U and the substrate 5L. The liquid crystal element 1 has the light incidence surface 13 (first light incidence surface) and a light incidence surface 19 (second light incidence surface). The light incidence surface 13 includes the one end e1 (more specifically, the liquid crystal molecules 11 at the one end e1) of the two ends of each of the helical structures 7. The light incidence surface 13 intersects with the first direction A1 and receives light incident thereon. The light incidence surface 19 includes the opposite end e2 (more specifically, the liquid crystal molecules 11 at the opposite end e2) of the two ends of each of the helical structures 7. The light incidence surface 19 intersects with the first direction A1 and receives light incident thereon.

The reflective surfaces 17 in the first region 3A (i.e., the reflective surfaces 17 toward the light incidence surface 13) have a different structure from the reflective surfaces 17 in the second region 3B (i.e., the reflective surfaces 17 toward the light incidence surface 19). For example, the reflective surfaces 17 in the first region 3A are non-parallel to the reflective surfaces 17 in the second region 3B. In Embodiment 6, the reflective surfaces 17 in the first region 3A are similar to the reflective surfaces 17 according to Embodiment 1. The reflective surfaces 17 in the second region 3B are similar to the reflective surfaces 17 according to Embodiment 2. However, the direction of curvature of the reflective surfaces 17 in the second region 3B is opposite to the direction of curvature of the reflective surfaces 17 according to Embodiment 2. The reflective surfaces 17 toward the light incidence surface 13 reflect light coming through the light incidence surface 13, and the reflective surfaces 17 toward the light incidence surface 19 reflect light coming through the light incidence surface 19.

More specifically, the helical structures 7 in the first region 3A have a different structure from the helical structures 7 in the second region 3B. For example, an orientation process of the liquid crystal molecules 11 based on the substrate 5U varies from an orientation process of the liquid crystal molecules 11 based on the substrate 5L, so that the structure of the helical structures 7 in the first region 3A varies from the structure of the helical structures 7 in the second region 3B. That is, patterning with respect to the substrate 5U varies from patterning with respect to the substrate 5L, so that the structure of the helical structures 7 in the first region 3A varies from the structure of the helical structures 7 in the second region 3B. To give description in terms of spatial phase, a phase pattern of the helical structures 7 in the first region 3A varies from a phase pattern of the helical structures 7 in the second region 3B.

The twist direction of the helix of the helical structures 7 (liquid crystal molecules 11) in the first region 3A is the same as the twist direction of the helix of the helical structures 7 (liquid crystal molecules 11) in the second region 3B. Light having circular polarization in the same twist direction as the twist direction of the helix in the first region 3A is incident on the substrate 5U and the light incidence surface 13, and light having circular polarization in the same twist direction as the twist direction of the helix in the second region 3B is incident on the substrate 5L and the light incidence surface 19. As a result, both reflected light conforming to properties of the reflective surfaces 17 in the first region 3A and reflected light conforming to properties of the reflective surfaces 17 in the second region 3B can be extracted from the single liquid crystal element 1.

Note that the reflective surfaces 17 in the first region 3A may be the reflective surfaces 17 according to any of Embodiments 1 to 5 (including the variation of Embodiment 1), and the reflective surfaces 17 in the second region 3B may be the reflective surfaces 17 according to any of Embodiments 1 to 5 (including the variation of Embodiment 1) so long as the structure of the reflective surfaces 17 in the first region 3A varies from the structure of the reflective surfaces 17 in the second region 3B.

According to Embodiment 6, as described above with reference to FIG. 19, the liquid crystal element 1 includes the first region 3A and the second region 3B. Thus, it is possible to provide the liquid crystal element 1 having both the properties of the reflective surfaces 17 in the first region 3A and the properties of the reflective surfaces 17 in the second region 3B.

Embodiment 7

Figure 20:
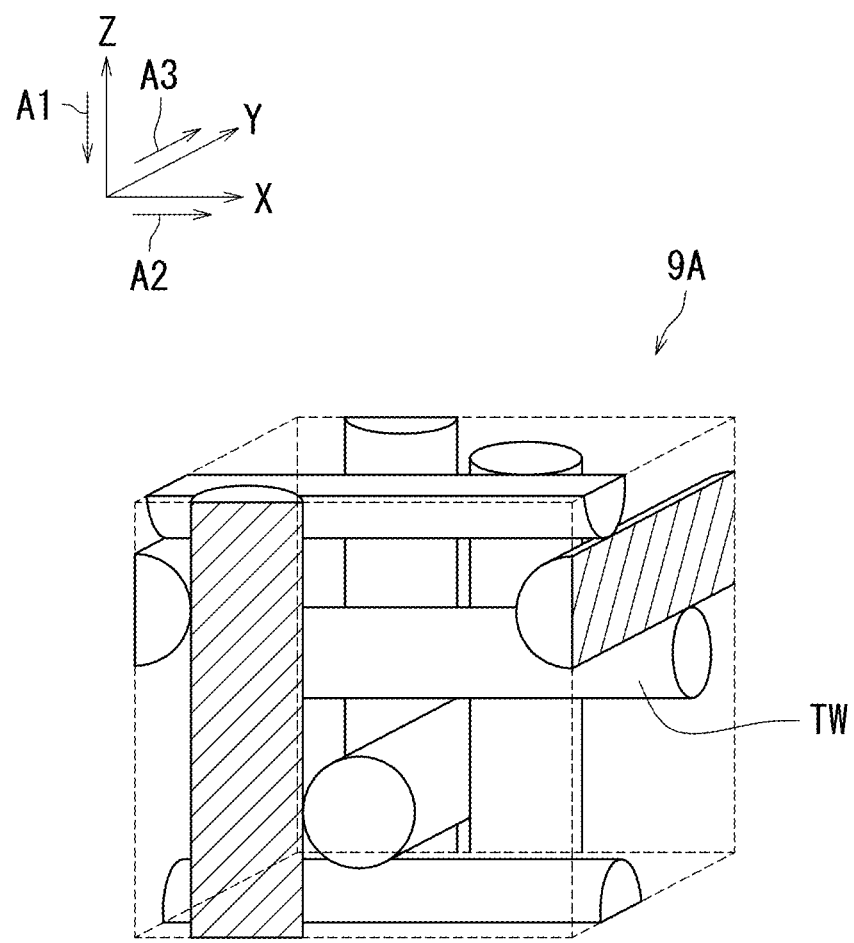
FIG. 20 is a perspective view illustrating a structure unit of a liquid crystal element according to Embodiment 7 of the present invention.

The following describes the liquid crystal element 1 according to Embodiment 7 of the present invention with reference to FIGS. 1 and 20. The liquid crystal element 1 according to Embodiment 7 is different from the liquid crystal element 1 according to Embodiment 1 in that the liquid crystal layer 3 of the liquid crystal element 1 according to Embodiment 7 is formed of a cholesteric blue phase. That is, in Embodiment 7, the helical structures 7 form a cholesteric blue phase. The following mainly describes differences between Embodiment 7 and Embodiment 1.

FIG. 20 is a perspective view illustrating a structure unit 9A of the liquid crystal element 1 according to Embodiment 7. As illustrated in FIGS. 1 and 20, each of the helical structures 7 in the liquid crystal element 1, which is a reflective structure, includes a plurality of the structure units 9A instead of the structure units 9 according to Embodiment 1. Each of the structure units 9A is formed of a cholesteric blue phase.

Each of the structure units 9A has cubic symmetry and includes double twisted cylinders TW extending in the first direction A1, double twisted cylinders TW extending in the second direction A2, and double twisted cylinders TW extending in the third direction A3. Each of the double twisted cylinders TW extending in the first direction A1 includes a plurality of liquid crystal molecules (a plurality of elements) stacked in the first direction A1 in a twisted manner to form a helix. Each of the double twisted cylinders TW extending in the second direction A2 includes a plurality of liquid crystal molecules (a plurality of elements) stacked in the second direction A2 in a twisted manner to form a helix. Each of the double twisted cylinders TW extending in the third direction A3 includes a plurality of liquid crystal molecules (a plurality of elements) stacked in the third direction A3 in a twisted manner to form a helix.

As in the case of Embodiment 1, the reflective surfaces 17 according to Embodiment 7 are non-parallel to the light incidence surface 13 as described above with reference to FIGS. 1 and 20. As in the case of Embodiment 1, therefore, the application range of the liquid crystal element 1 can be extended compared to a liquid crystal element adopting specular reflection. In addition to the above, Embodiment 7 also achieves the same effects as Embodiment 1.

The liquid crystal elements 1 according to Embodiments 2 to 6 may each include the structure units 9A instead of the structure units 9. The liquid crystal elements 1 including the structure units 9A achieve the same effects as the respective liquid crystal elements 1 according to Embodiments 2 to 6.

Embodiment 8

The following describes a film according to Embodiment 8 of the present invention (referred to below as the "present film") with reference to FIG. 1. The present film is formed based on the liquid crystal layer 3 of the liquid crystal element 1 according to Embodiment 1 (including the variation thereof).

As illustrated in FIG. 1, the present film, which is a reflective structure, is for example formed through polymerization of the helical structures 7 of the liquid crystal layer 3. Specifically, the present film is formed through polymerization of the liquid crystal molecules 11 forming the liquid crystal layer 3. The liquid crystal molecules 11 are for example polymerized by irradiating the liquid crystal layer 3 with light.

Alternatively, the present film, which is a reflective structure, is for example formed by controlling orientation of a polymeric liquid crystal material that exhibits a liquid crystalline state at a specific temperature or a specific concentration such that the polymeric liquid crystal material in the liquid crystalline state forms the helical structures 7 according to Embodiment 1 (including the variation thereof), and subsequently causing transition thereof to solid while maintaining the orientation.

Through the polymerization or the transition to solid, adjacent helical structures 7 in the present film are bonded to each other while maintaining the orientation thereof, that is, while maintaining the phases of the helical structures 7. As a result, the directions of orientation of the liquid crystal molecules 11 are fixed in the present film. The present film does not include the substrates 5U and 5L.

Films that serve as reflective structures according to Embodiments 2 to 7 of the present invention can be formed based on the liquid crystal layers 3 of the liquid crystal elements 1 according to the respective Embodiments in the same manner as in formation of the present film.

According to Embodiment 8, the present film and these films achieve the same effects as the respective liquid crystal elements 1 according to Embodiments 1 to 7.

Embodiment 9

Figure 21:
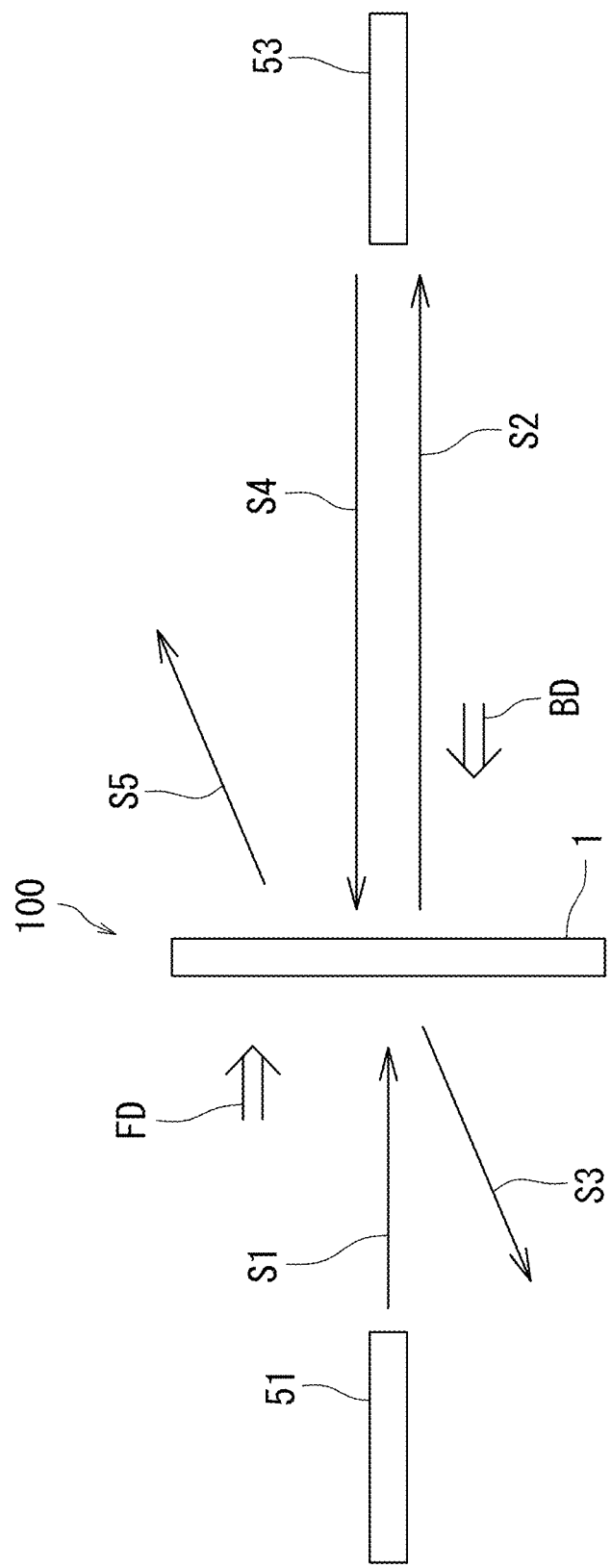
FIG. 21 is a diagram illustrating an optical isolator according to Embodiment 9 of the present invention.

The following describes an optical isolator 100 according to Embodiment 9 of the present invention with reference to FIG. 21. FIG. 21 is a diagram illustrating the optical isolator 100 according to Embodiment 9. As illustrated in FIG. 21, the optical isolator 100 transmits light S1 traveling in a forward direction FD and reflects light S4 traveling in a reverse direction BD that is opposite to the forward direction FD. The forward direction FD is a direction from a light source 51 (for example, a laser) toward a target 53 (for example, an optical fiber).

Specifically, the optical isolator 100 includes the liquid crystal element 1 according to Embodiment 1. The helical structures 7 of the liquid crystal element 1 formed by the liquid crystal molecules 11 are right-handed. The light source 51 emits the light S1 having linear polarization in the forward direction FD to irradiate the liquid crystal element 1 with the light S1. The liquid crystal element 1 reflects the light S3 having right circular polarization out of the light S1. The liquid crystal element 1 transmits light S2 having left circular polarization out of the light S1 and emits the light S2 in the forward direction FD toward the target 53. After being reflected by the target 53, the light S4 having right circular polarization out of the light S2 travels in the reverse direction BD to be incident on the liquid crystal element 1. The liquid crystal element 1 reflects the incoming light S4 as light S5.

Note that the helical structures 7 of the liquid crystal element 1 formed by the liquid crystal molecules 11 may be left-handed. In such a situation, the light S3, the light S4, and the light S5 have left circular polarization, whereas the light S2 has right circular polarization. The optical isolator 100 may include the film according to Embodiment 8 instead of the liquid crystal element 1.

According to Embodiment 9, as described above with reference to FIG. 21, the use of the liquid crystal element 1 according to Embodiment 1 or the film according to Embodiment 8 allows implementation of the optical isolator 100 through a simple configuration.

Embodiments 10 to 12

Figure 22A:
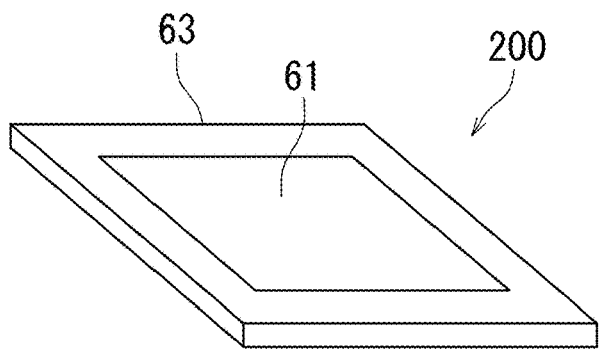
FIG. 22A is a perspective view illustrating a screen according to Embodiment 10 of the present invention.

The following describes a screen 200 according to Embodiment 10 of the present invention with reference to FIG. 22A. FIG. 22A is a perspective view illustrating the screen 200 according to Embodiment 10. The screen 200 includes a film 61 and a glass substrate 63. The film 61 is attached to a surface of the glass substrate 63. The film 61 is the film according to Embodiment 8. The screen 200 is for example usable as a display of a wearable device.

Figure 22B:
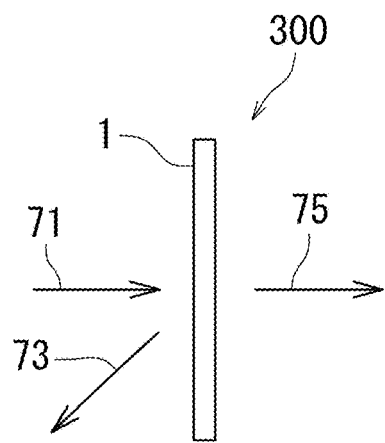
FIG. 22B is a side view illustrating a beam splitter according to Embodiment 11 of the present invention.

The following describes a beam splitter 300 according to Embodiment 11 of the present invention with reference to FIG. 22B. FIG. 22B is a side view illustrating the beam splitter 300 according to Embodiment 11. The beam splitter 300 includes the liquid crystal element 1. The liquid crystal element 1 is the liquid crystal element 1 according to Embodiment 1. The helical structures 7 of the liquid crystal element 1 formed by the liquid crystal molecules 11 are right-handed. The liquid crystal element 1 reflects light 73 having right circular polarization out of incident light 71 having linear polarization and transmits and emits light 75 having left circular polarization out of the incident light 71. Note that the helical structures 7 of the liquid crystal element 1 formed by the liquid crystal molecules 11 may be left-handed. In such a situation, the light 73 has left circular polarization, whereas the light 75 has right circular polarization. The beam splitter 300 is for example usable as a polarization separation element.

Figure 22C:
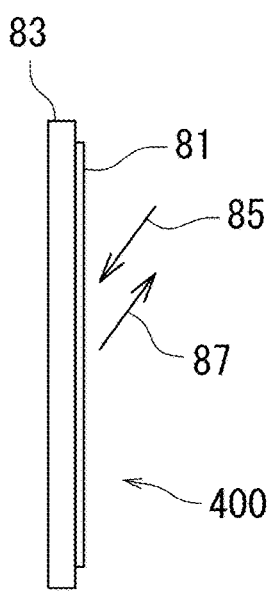
FIG. 22C is a side view illustrating a glass plate according to Embodiment 12 of the present invention.

The following describes a glass plate 400 according to Embodiment 12 of the present invention with reference to FIG. 22C. FIG. 22C is a side view illustrating the glass plate 400 according to Embodiment 12. The glass plate 400 includes a film 81 and glass 83. The film 81 is attached to the glass 83. The film 81 is the film according to Embodiment 8. A portion of incident light 85 is reflected by the film 81 as reflected light 87. In such a situation, the film 81 reflects the reflected light 87 in a direction substantially opposite to an incidence direction of the incident light 85. Alternatively, the film 81 reflects a portion of the incident light 85 as the reflected light 87 without depending on an incidence angle of the incident light 85.

The glass plate 400 is for example usable as a window of an automobile or a building. In such a situation, exposure of people to the reflected light 87 can be prevented by controlling a reflection direction of the reflected light 87 being heat rays when the incident light 85 being heat rays comes in. Alternatively, the reflected light 87 being heat rays can be concentrated in a specific direction so as to prevent exposure of people to the reflected light 87. For another example, the glass plate 400 is usable as a transparent projector screen of transmission allowing high viewing angle characteristics.

Embodiment 13

Figure 23:
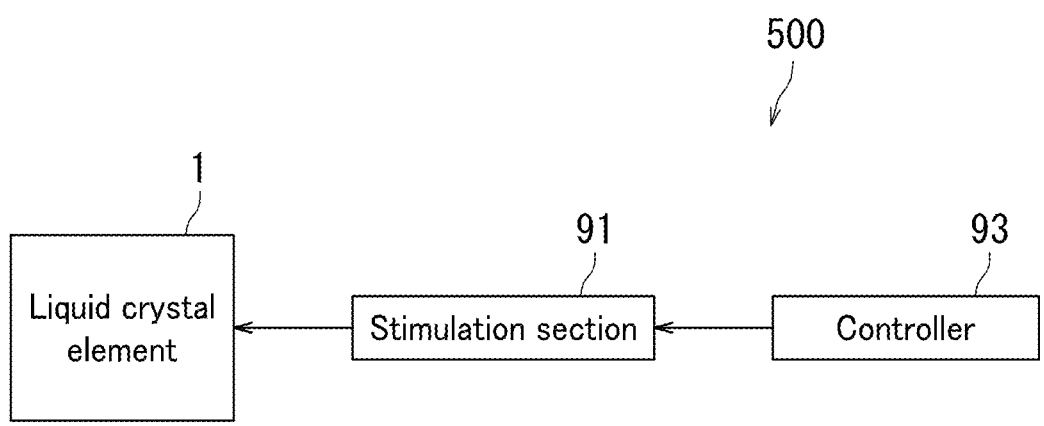
FIG. 23 is a block diagram illustrating a device according to Embodiment 13 of the present invention.

The following describes a device 500 according to Embodiment 13 of the present invention with reference to FIG. 23. The device 500 includes the liquid crystal element 1, a stimulation section 91, and a controller 93. The liquid crystal element 1 is any of the liquid crystal elements 1 according to Embodiments 1 to 7. The device 500 may include the film according to Embodiment 8 instead of the liquid crystal element 1.

The controller 93 controls the stimulation section 91. The controller 93 is for example a computer. The stimulation section 91 is for example controlled by the controller 93 to give an electrical stimulus (for example, to apply voltage or current) to the liquid crystal element 1. The liquid crystal element 1 responds to the electrical stimulus, and thus the directions of orientation or the phases of the helical structures 7 change. For example, the stimulation section 91 is controlled by the controller 93 to give a light stimulus (for example, to irradiate light) to the liquid crystal element 1. The liquid crystal element 1 responds to the light stimulus, and thus the directions of orientation or the phases of the helical structures 7 change. For example, the stimulation section 91 is controlled by the controller 93 to give a mechanical stimulus (for example, to apply stress) to the liquid crystal element 1. The liquid crystal element 1 responds to the mechanical stimulus, and thus the directions of orientation or the phases of the helical structures 7 change. For example, the stimulation section 91 is controlled by the controller 93 to give a chemical stimulus (for example, to induce a chemical reaction) to the liquid crystal element 1. The liquid crystal element 1 responds to the chemical stimulus, and thus the directions of orientation or the phases of the helical structures 7 change.

According to Embodiment 13, as described above with reference to FIG. 23, it is possible to actively control the characteristics of the liquid crystal element 1 or the film by stimulation. Note that the phases of the helical structures 7 may be controlled to change from the same phase to different phases, may be controlled to change from different phases to the same phase, or may be controlled to change from different phases to other different phases by stimulation.

Embodiment 14

Figure 24:
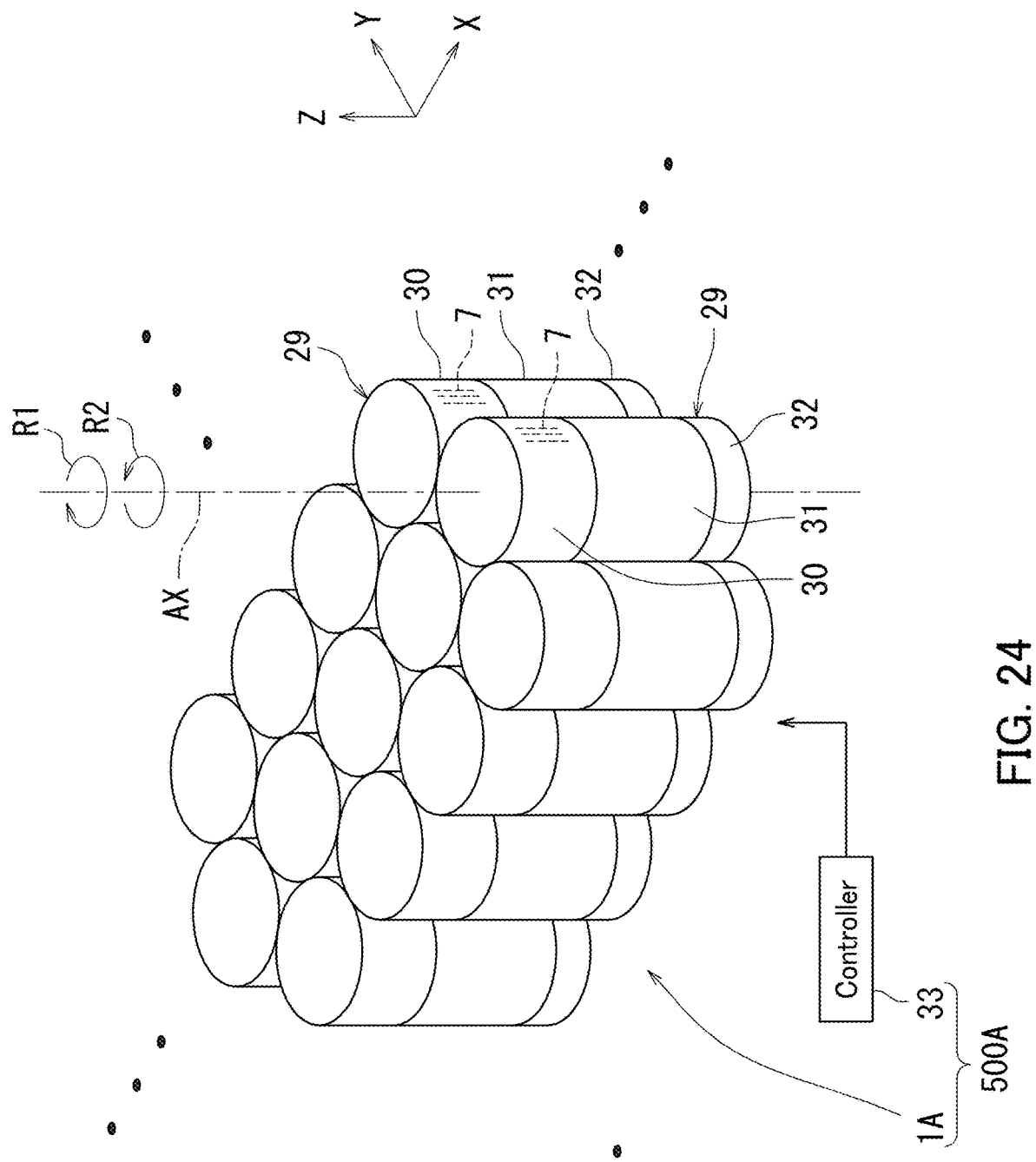
FIG. 24 is a diagram illustrating a device according to Embodiment 14 of the present invention.

The following describes a device 500A according to Embodiment 14 of the present invention with reference to FIG. 24. The device 500A includes a liquid crystal element 1A, which is a reflective structure, and a controller 33. The liquid crystal element 1A includes a plurality of units 29. The units 29 are tightly arranged. Each of the units 29 is substantially cylindrical. Each of the units 29 includes a substantially cylindrical helical structure unit 30, a substantially cylindrical support member 31, and a substantially cylindrical rotary member 32. The diameter of a bottom surface of the helical structure unit 30 and the diameter of a top surface of the support member 31 are substantially equal. The diameter of a bottom surface of the support member 31 and the diameter of a top surface of the rotary member 32 are substantially equal. In the units 29, the helical structure units 30 have substantially the same distance between the bottom and top surfaces thereof, the support members 31 have substantially the same distance between the bottom and top surfaces thereof, and the rotary members 32 have substantially the same distance between the bottom and top surfaces thereof.

Each of the helical structure units 30 includes the helical structures 7. That is, the helical structures 7 compose each helical structure unit 30. In each of the helical structure units 30, the helical structures 7 form the liquid crystal layer 3. The helical structures 7 have the same configuration as the helical structures 7 according to Embodiment 1. The following describes Embodiment 14 using the reference signs used in the description of Embodiment 1. However, FIG. 24 does not show some of elements of configuration of the liquid crystal element 1A as appropriate in order to simplify the drawings.

Each of the helical structure units 30 includes the substrate 5U and the substrate 5L. Each of the helical structure units 30 has a fine light incidence surface and a fine light exit surface. The fine light incidence surface is substantially parallel to the substrate 5U, and the fine light exit surface is substantially parallel to the substrate 5L. A plurality of the fine light incidence surfaces form the light incidence surface 13, and a plurality of the fine light exit surfaces form the light exit surface 15. The liquid crystal element 1A also has at least one reflective surface 17. The reflective surface 17 is located between the light incidence surface 13 and the light exit surface 15.

Each of the helical structure units 30 has at least one fine reflective surface. The reflective surface 17 includes the at least one fine reflective surface included in each of the helical structure units 30. The directions of orientation of the liquid crystal molecules 11 on the reflective surface 17 are identical among the helical structure units 30. In other words, the directions of the directors at the reflective surface 17 are identical among the helical structure units 30.

In each of the helical structure units 30, the helical structures 7 have the same phase. Furthermore, at least two of the helical structure units 30 have different phases. As a result, the reflective surface 17 is non-parallel to the light incidence surface 13. The phase of each helical structure unit 30 is the phase of the helical structures 7 therein.

The support members 31 are disposed in one-to-one correspondence with the helical structure units 30. Each of the support members 31 supports the corresponding helical structure unit 30. That is, the bottom surface of each helical structure unit 30 is fixed to the top surface of the corresponding support member 31.

The rotary members 32 are disposed in one-to-one correspondence with the support members 31. Each of the rotary members 32 rotates the corresponding support member 31. Specifically, each rotary member 32 is rotatable in a rotation direction R1 and a rotation direction R2 about an axis AX of the rotary member 32. As each rotary member 32 rotates in the rotation direction R1, the corresponding support member 31 and the corresponding helical structure unit 30 rotate in the rotation direction R1. As each rotary member 32 rotates in the rotation direction R2, the corresponding support member 31 and the corresponding helical structure unit 30 rotate in the rotation direction R2. The rotary members 32 are rotatable independently from one another.

The rotary members 32 are for example micromotors. The micromotors are for example formed as microelectromechanical systems (MEMS).

The controller 33 drives each of the rotary members 32 to rotate. The controller 33 is for example a computer. The controller 33 is capable of individual control of the rotary members 32. Accordingly, the controller 33 performs individual control of rotation angles of the rotary members 32.

The following describes phase control for the helical structure units 30 with reference to FIG. 24. The helical structure units 30 in an initial state have the same phase.

The controller 33 controls a rotation angle of each helical structure unit 30 via the corresponding support member 31 by controlling the corresponding rotary member 32. The controller 33 then stops each helical structure unit 30 at a rotation angle determined for the helical structure unit 30 (referred to below as an "individual rotation angle"). Thus, the phase of each helical structure unit 30 is set to a phase corresponding to the individual rotation angle. That is, the controller 33 is capable of individual control of the phases of the helical structure units 30.

According to Embodiment 14, as described above with reference to FIG. 24, each rotary member 32 rotates the corresponding support member 31 to rotate the corresponding helical structure unit 30. Thus, the controller 33 can perform individual control of the phases of the helical structure units 30, control of angle or orientation of the reflective surface 17 with respect to the light incidence surface 13, and control of the shape of the reflective surface 17 through control of the rotary members 32. That is, according to Embodiment 14, the phases of the helical structure units 30 and the reflective surface 17 are changeable. As a result, different refractive characteristics of the reflective surface 17 can be achieved by the single liquid crystal element 1A, allowing the application range of the liquid crystal element 1A to be further extended. In other words, the wavefront of light that is reflected by the reflective surface 17 can be actively controlled.

The helical structure units 30 may be controlled such that the helical structure units 30 have the same phase or such that at least two of the helical structure units 30 have different phases. As a result of at least two of the helical structure units 30 having different phases, the reflective surface 17 is non-parallel to the light incidence surface 13.

Furthermore, each of the helical structure units 30 does not need to include the substrate 5U or the substrate 5L. Each of the helical structure units 30 may include a film. The film is formed in the same manner as in formation of the film according to Embodiment 8.

Furthermore, each of the helical structure units 30 may include a single helical structure 7. That is, the single helical structure 7 may compose the helical structure unit 30. The reflective surface 17 includes at least one of the first ends E1 included in each of the helical structures 7. Accordingly, the directions of orientation of the liquid crystal molecules 11 on the reflective surface 17 or each of the reflective surfaces 17 are identical among the plurality of helical structures 7. In other words, the directions of the directors on the reflective surface 17 or each of the reflective surfaces 17 are identical among the plurality of helical structures 7.

The helical structure units 30, the support members 31, and the rotary members 32 are not limited to a cylindrical shape but may have any shape. The liquid crystal element 1A may be used as the liquid crystal element 1 according to Embodiment 13 (FIG. 23).

Embodiment 15

Figure 25:
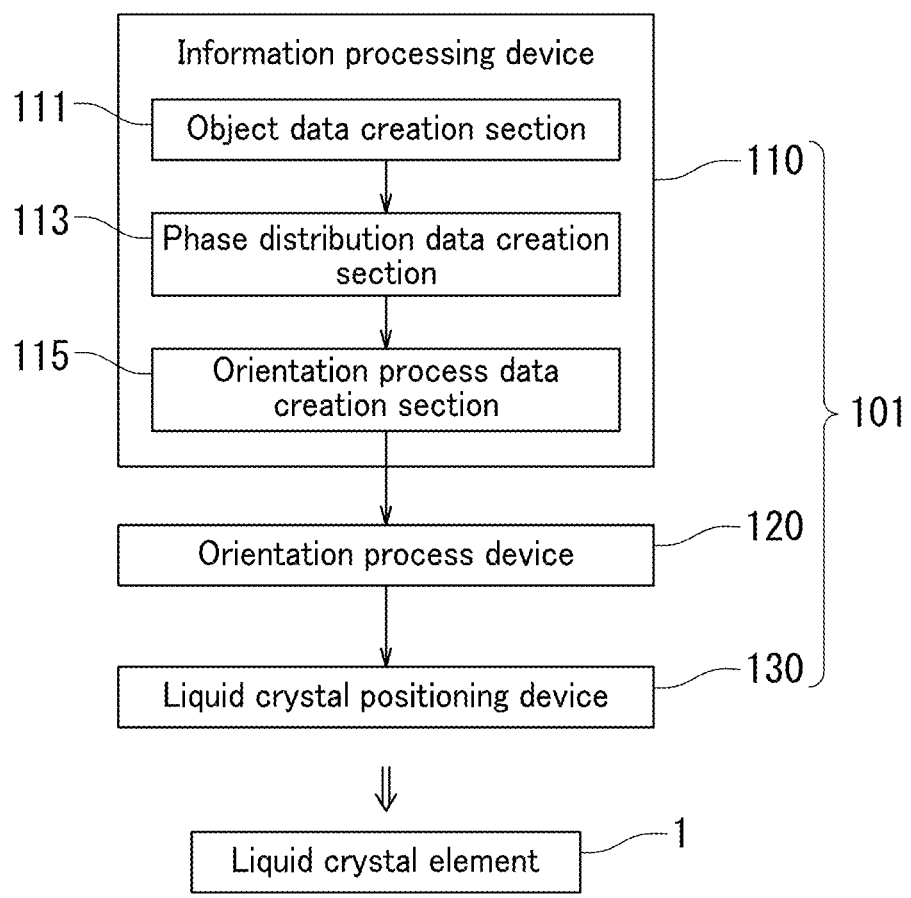
FIG. 25 is a block diagram illustrating a liquid crystal element production apparatus according to Embodiment 15 of the present invention.
Figure 26:
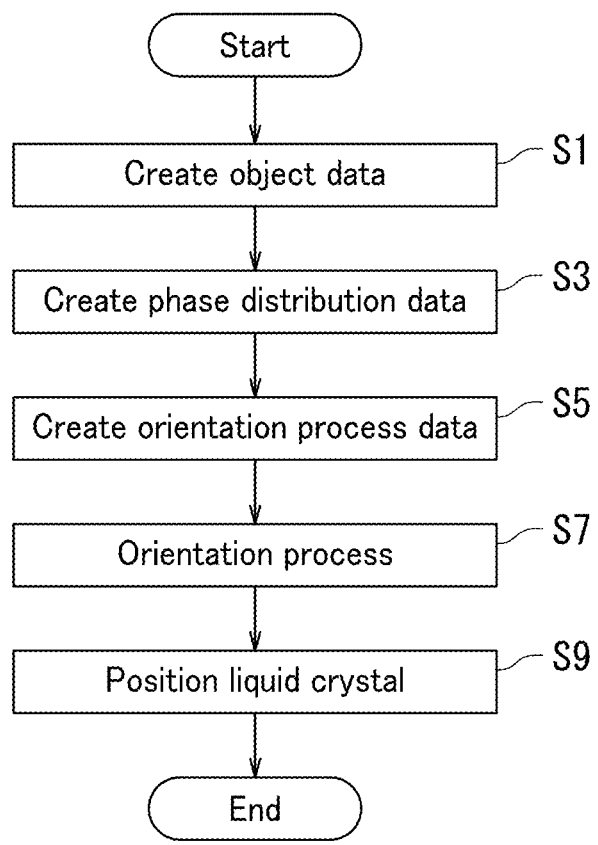
FIG. 26 is a flowchart illustrating the liquid crystal element production method that is implemented by the production apparatus according to Embodiment 15 of the present invention.

The following describes the liquid crystal element 1, a production apparatus, and a production method according to Embodiment 15 of the present invention with reference to FIGS. 25 and 26. The liquid crystal element 1 according to Embodiment 15 is different from the liquid crystal element 1 according to Embodiment 1 in that the liquid crystal element 1 according to Embodiment 15 functions as a holographic element. Specifically, the shape of reflective surfaces and phases of helical structures according to Embodiment 15 are different from the shape of the reflective surfaces 17 and the phases of the helical structures 7 according to Embodiment 1. The helical structures according to Embodiment 15 have the same structure as the helical structures 7 according to Embodiment 1. Like the reflective surfaces 17 according to Embodiment 1, the reflective surfaces according to Embodiment 15 are non-parallel to a light incidence surface. The following mainly describes differences between Embodiment 15 and Embodiment 1. The following describes Embodiment 14 using the reference signs used in the description of Embodiment 1 in order to facilitate understanding.

First, a configuration of a production apparatus 101 of the liquid crystal element 1 according to Embodiment 15 will be described with reference to FIG. 25. FIG. 25 is a block diagram illustrating the production apparatus 101. As illustrated in FIG. 25, the production apparatus 101 produces the liquid crystal element 1, which is a reflective structure. The reflective surfaces 17 of the liquid crystal element 1 reflect light coming through the light incidence surface 13 to form an image of a virtual object corresponding to the light. Specifically, the reflective surfaces 17 reflect the light L1 coming through the light incidence surface 13 and selectively reflect the light L3 out of the light L1 to form an image of a virtual object corresponding to the light L3. The virtual object is an example of an object. The virtual object is an object positioned in virtual space created by a computer. The virtual object may be three-dimensional or two-dimensional.

The production apparatus 101 includes an information processing device 110, an orientation process device 120, and a liquid crystal positioning device 130. The information processing device 110 includes an object data creation section 111, a phase distribution data creation section 113, and orientation process data creation section 115. Specifically, the information processing device 110 is a computer and has a processor and a storage device. The processor functions as the object data creation section 111, the phase distribution data creation section 113, and the orientation process data creation section 115 through execution of computer programs stored in the storage device. The storage device for example includes memory such as semiconductor memory and may include a hard disk drive.

The following describes operation of the production apparatus 101 with reference to FIGS. 25 and 26. FIG. 26 is a flowchart illustrating a production method of the liquid crystal element 1 that is implemented by the production apparatus 101. As illustrated in FIG. 26, the production method includes Steps S1, S3, S5, S7, and S9.

As illustrated in FIGS. 25 and 26, the object data creation section 111 creates object data representing a virtual object in Step S1. Specifically, the object data represents form of the virtual object. The form of the virtual object indicates shape, pattern, or color of the virtual object, or a combination of some or all of them. The pattern includes characters and graphics. The characters include letters, numbers, and depictions.

In Step S3, the phase distribution data creation section 113 calculates phases of the helical structures 7 and creates phase distribution data (first orientation data) based on the object data. The phase distribution data indicates distribution of the phases of the helical structures 7.

Specifically, the phase distribution data creation section 113 calculates a direction of orientation of the liquid crystal molecule 11 (element) at the one end e1 of the two ends of each of the helical structures 7 and creates the phase distribution data based on the object data. Accordingly, the phase distribution data indicates distribution of the directions of orientation of the liquid crystal molecules 11 on the respective one ends e1.

For example, the phase distribution data creation section 113 creates the phase distribution data based on the object data such that some of the liquid crystal molecules 11 on the respective ends e1 each have a different direction of orientation. In a situation in which some of the liquid crystal molecules 11 at the respective ends e1 each have a different direction of orientation, the helical structures 7 each have a different phase. Thus, the reflective surfaces 17 are non-parallel to the light incidence surface 13.

The phase distribution data for example shows the directions of orientation of the liquid crystal molecules 11 on the ends e1, that is, the phases of the helical structures 7 within a first angular range. The first angular range is for example from 0 radians to $2\pi$ radians. Note that, for example, the direction of orientation of each liquid crystal molecule 11 is represented by the rotation angle of the liquid crystal molecule 11, and the phase of each helical structure 7 is represented by the rotation angle of the liquid crystal molecule 11.

In Step S5, the orientation process data creation section 115 creates orientation process data (second orientation data) based on the phase distribution data. The orientation process data is created according to an orientation method that is implemented by the orientation process device 120. The orientation process device 120 uses the orientation process data. The orientation process data indicates an orientation pattern corresponding to the phase distribution indicated by the phase distribution data. Specifically, the orientation process data specifies either or both of a surface structure and surface properties of alignment layers such that the directions of orientation of the liquid crystal molecules 11 at the respective ends e1 exhibit the directions of orientation indicated by the phase distribution data. The alignment layers are respectively formed on the substrates 5U and 5L. The alignment layers are in contact with the liquid crystal molecules 11 to orient the liquid crystal molecules 11. The alignment layers are for example alignment films or structures (specifically, microstructures) respectively formed on the substrates 5U and 5L. The surface properties of the alignment layers for example include anchoring direction of the alignment layers for the liquid crystals.

For example, the orientation process data shows the orientation pattern indicating the directions of orientation of the liquid crystal molecules 11 within a second angular range. The second angular range is half of the first angular range. This is because the phase of the light L3 varies by $2\pi$ radians when the directions of orientation of the liquid crystal molecules 11 vary by $\pi$ radians from a certain value. The second angular range is for example from $-\pi/2$ to $\pi/2$.

The orientation process data creation section 115 for example creates the orientation process data according to the orientation method based on the phase distribution data. In a situation in which the orientation method is a photo-alignment method, for example, the liquid crystal molecules 11 are oriented parallel to or perpendicular to illuminating polarized light. Thus, the orientation process data is created reflecting the orientation method and properties of the liquid crystal material.

In Step S7, the orientation process device 120 processes the alignment layers according to the orientation process data. As a result, either or both of the surface structure and the surface properties of the alignment layers change such that the directions of orientation of the liquid crystal molecules 11 in contact with the alignment layers exhibit the directions of orientation indicated by the phase distribution data. Note that processing of the alignment layers according to the orientation process data may be referred to as an orientation process.

The orientation process device 120 may for example adopt a photo-alignment method, a micro-rubbing method, an oblique vapor deposition method, or a structure orientation method as the orientation method.

The photo-alignment method involves irradiating a photosensitive alignment film formed on a substrate with polarized light, and thus controlling directions of orientation of liquid crystal molecules in contact with the alignment film. Depending on a combination of the alignment film and the liquid crystal material, the liquid crystal molecules 11 are oriented parallel to or perpendicular to the illuminating polarized light.

The micro-rubbing method involves rubbing an alignment film (for example, a polyimide alignment film) formed on a substrate with cloth, and thus encouraging orientation of liquid crystal molecules. Depending on the properties of the alignment film, the liquid crystal molecules are oriented parallel to or perpendicular to a rubbing direction.

The oblique vapor deposition method involves forming an alignment film (for example, a silicon dioxide film) obliquely to a substrate, and thus encouraging orientation of liquid crystal molecules in contact with the alignment film. The film is formed through vapor deposition of a material on the substrate. The direction of orientation of the liquid crystal molecules varies depending on the angle of vapor deposition.

The structure orientation method involves forming microstructures as an alignment layer on a substrate, and thus encouraging orientation of liquid crystal molecules in contact with the alignment layer. For example, rod-like liquid crystal molecules are oriented along fine groove structures formed in the substrate. Processing of the alignment layer includes forming the microstructures as the alignment layer on the substrate.

For example, in Step S7, two substrates having alignment layers formed thereon are stacked on top of another to prepare an empty element. Thereafter, the orientation process device 120 performs the orientation process on the alignment layers of the empty element.

For example, in Step S7, two substrates having alignment layers formed thereon are prepared. Subsequently, the orientation process device 120 performs the orientation process on the alignment layer of each substrate. After the orientation process, the two substrates are stacked on top of another to prepare an empty element. According to this example, the orientation pattern with respect to the alignment layer on one substrate can differ from the orientation pattern with respect to the alignment layer of the other substrate. Specifically, either or both of the surface structure and the surface properties of the alignment layer of the one substrate can differ from either or both of the surface structure and the surface properties of the alignment layer of the other substrate.

In Step S9, the liquid crystal positioning device 130 positions a liquid crystal such that the liquid crystal is in contact with the alignment layers. Since the orientation process has been performed on the alignment layers, the liquid crystal molecules 11 of the liquid crystal are oriented to form the liquid crystal layer 3. As a result, the liquid crystal element 1 is produced. For example, the liquid crystal positioning device 130 causes the empty element having the alignment layers subjected to the orientation process to confine the liquid crystal such that the liquid crystal is in contact with the alignment layers.

Note that the order of Step S7 and Step S9 may be reversed, and Step S9 may be performed before Step S7. For example, in Step S9, the liquid crystal positioning device 130 positions the liquid crystal such that the liquid crystal is in contact with the alignment layers before the orientation process. For example, the liquid crystal positioning device 130 causes the empty element having the alignment layers before the orientation process to confine the liquid crystal such that the liquid crystal is in contact with the alignment layers. Next, in Step S7, the orientation process device 120 processes the orientation layers according to the orientation process data. Thus, the liquid crystal molecules 11 of the liquid crystal are oriented to form the liquid crystal layer 3. As a result, the liquid crystal element 1 is produced.

According to Embodiment 15, as described with reference to FIGS. 25 and 26, it is possible to produce the liquid crystal element 1 that functions as a holographic element.

That is, the production apparatus 101 creates the phase distribution data based on the object data representing the virtual object and creates the orientation process data based on the phase distribution data. Accordingly, the image of the virtual object is recorded as the phases of the helical structures on the liquid crystal layer 3. In other words, the image of the virtual object is recorded as the shape of the reflective surfaces 17 on the liquid crystal layer 3. The recorded image of the virtual object is reproduced through the reflective surfaces 17 being irradiated with light and the reflective surfaces 17 reflecting the light. That is, the liquid crystal element 1 functions as a holographic element. According to Embodiment 15, as described above, it is possible to produce the liquid crystal element 1 that functions as a holographic element.

Furthermore, according to Embodiment 15, the liquid crystal molecules 11 are oriented through the orientation process, and the image of the virtual object is recorded as the phases of the helical structures. It is therefore possible to readily produce the liquid crystal element 1 that functions as a holographic element compared to production of common holographic elements. Common holographic elements are for example required to involve finely processing a master using an electron beam writer for semiconductor manufacturing for recording.

Furthermore, according to Embodiment 15, it is possible to select any virtual object and create object data thereof. It is therefore possible to easily record an image of a desired virtual object on the liquid crystal element 1.

Furthermore, according to Embodiment 15, the liquid crystal element 1 reflects light coming through the light incidence surface 13 to form an image of a virtual object corresponding to the light. That is, the liquid crystal element 1 is capable of recording and reproducing the image of the virtual object, functioning as a holographic element. As a result, the application range of the liquid crystal element 1 can be further extended. For example, the liquid crystal element 1 can function as a security element. For example, the liquid crystal element 1 functioning as a security element varies an image (for example, a motif) being reproduced depending on incoming polarized light. In such a situation, the liquid crystal element 1 is effective particularly in authenticity determination. For example, the liquid crystal element 1 functioning as a security element reproduces an image (for example, a motif) only when the liquid crystal element 1 receives light having specific polarization. Also in such a situation, the liquid crystal element 1 is effective particularly in authenticity determination. In Embodiment 15, circular polarization selectivity of the liquid crystal layer 3 can be effectively utilized. For example, the liquid crystal element 1 may function as a transparent security element. Specifically, the helical pitch p is determined so as to reflect light in the non-visible wavelength range (for example, the near-infrared range). Accordingly, the liquid crystal element 1 is transparent when the liquid crystal element 1 receives light in the visible wavelength range. On the other hand, the image of the virtual object is formed when the liquid crystal element 1 is irradiated with light in the non-visible wavelength range (for example, the near-infrared range).

Note that the liquid crystal element 1 may not include the substrates 5U and 5L. Specifically, the liquid crystal layer 3 may form a film as a reflective structure. The film is formed in the same manner as in formation of the film according to Embodiment 8. Like the liquid crystal element 1, the film can for example function as a security element or security sticker. Note that the liquid crystal element 1 according to Embodiment 15 can be used as the liquid crystal element 1 according to Embodiment 13 (FIG. 23).

The following describes the present invention in detail based on Examples. However, the present invention is not limited to the following Examples.

EXAMPLES

Example 1

Figure 27A:
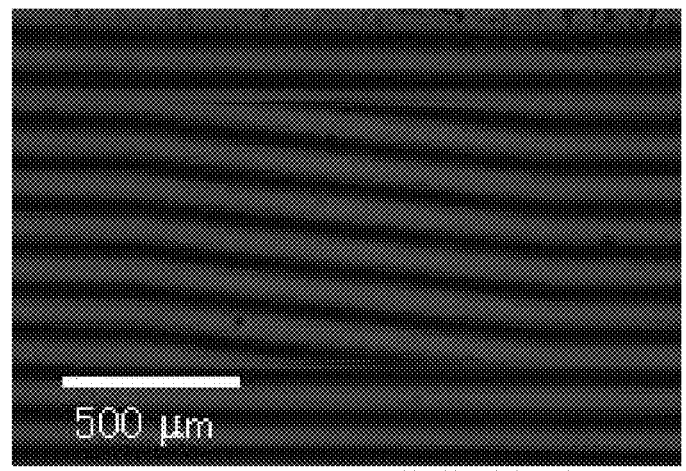
FIG. 27A is a diagram showing interference fringes representing a structure of a liquid crystal element according to Example 1 of the present invention.

The following describes the liquid crystal element 1 according to Example 1 of the present invention with reference to FIGS. 1 and 27A. As the liquid crystal element 1, the liquid crystal element 1 according to Embodiment 1 was used. The liquid crystal element 1 was irradiated with light, and the reflected light L3 was observed using a Michelson interferometer.

FIG. 27A is a diagram showing interference fringes representing a structure of the liquid crystal element 1 according to Example 1. As shown in FIG. 27A, interference fringes inclined in accordance with the reflective surfaces 17 (i.e., the wavefront F3) were observed.

Example 2

Figure 27B:
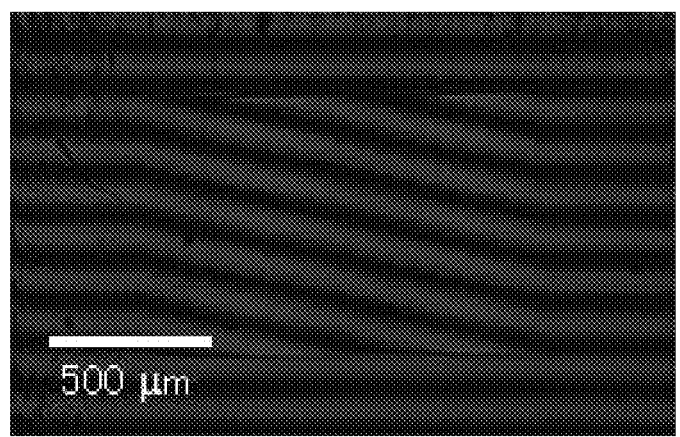
FIG. 27B is a diagram showing interference fringes representing a structure of a liquid crystal element according to Example 2 of the present invention.

The following describes the liquid crystal element 1 according to Example 2 of the present invention with reference to FIGS. 5 and 27B. As the liquid crystal element 1, the liquid crystal element 1 according to the variation of Embodiment 1 was used. The liquid crystal element 1 was irradiated with light, and the reflected light L3 was observed using a Michelson interferometer.

FIG. 27B is a diagram showing interference fringes representing a structure of the liquid crystal element 1 according to Example 2. As shown in FIG. 27B, interference fringes inclined in accordance with the reflective surfaces 17 (i.e., the wavefront F3) were observed.

As shown in FIGS. 27A and 27B, it was observed that inclination of the interference fringes of the liquid crystal element 1 according to Example 2 was greater than inclination of the interference fringes of the liquid crystal element 1 according to Example 1. It was confirmed that the inclination angle θ2 of the reflective surfaces 17 of the liquid crystal element 1 according to Example 2 (i.e., the inclination angle θ4 of the wavefront F3 of the light L3) was greater than the inclination angle θ1 of the reflective surfaces 17 of the liquid crystal element 1 according to Example 1 (i.e., the inclination angle θ3 of the wavefront F3 of the light L3).

Example 3

Figure 28:
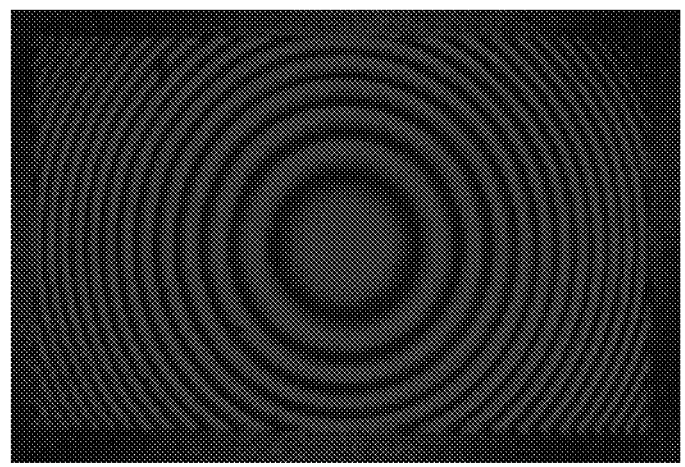
FIG. 28 is a diagram showing an interference image representing a structure of a liquid crystal element according to Example 3 of the present invention.

The following describes the liquid crystal element 1 according to Example 3 of the present invention with reference to FIG. 28. As the liquid crystal element 1, the liquid crystal element 1 according to Embodiment 2 described with reference to FIG. 7 was used.

The liquid crystal element 1 was irradiated with light, and the reflected light L3 was observed using a Michelson interferometer. FIG. 28 is a diagram showing an interference image representing a structure of the liquid crystal element 1 according to Example 3. As shown in FIG. 28, a phase distribution similar to the phase distribution shown in FIG. 9A was observed.

Figure 29A:
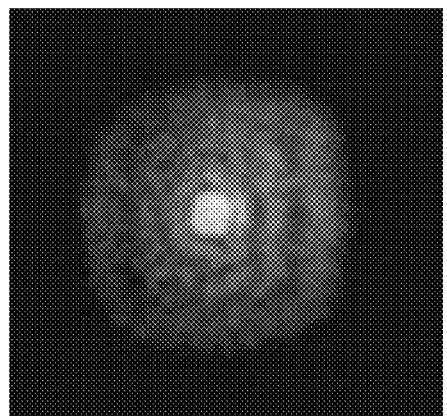
FIG. 29A is a diagram showing light reflected by the liquid crystal element according to Example 3 of the present invention.
Figure 29B:
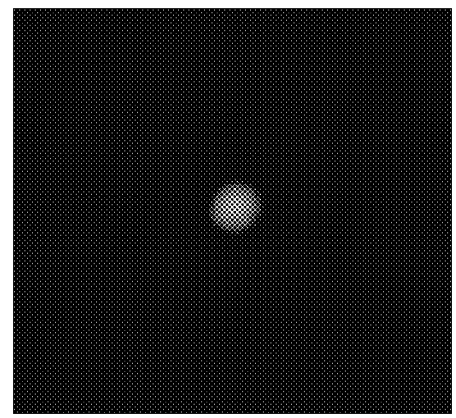
FIG. 29B is a diagram showing light reflected by a liquid crystal element according to Comparative Example.

The liquid crystal element 1 was also irradiated with laser light, and the reflected light L3 was observed. FIG. 29A is a diagram showing the light L3 reflected by the liquid crystal element 1 according to Example 3. FIG. 29B is a diagram showing light reflected by a liquid crystal element according to Comparative Example. The liquid crystal element according to Comparative Example had a plurality of reflective surfaces substantially parallel to a light incidence surface thereof. As shown in FIGS. 29A and 29B, it was observed that the reflected light L3 spread more in Example 3 than in Comparative Example.

Example 4

Figure 30:
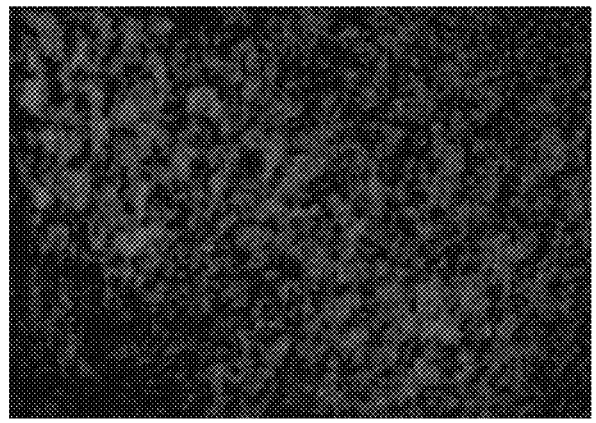
FIG. 30 is a diagram showing an interference image representing a structure of a liquid crystal element according to Example 4 of the present invention.

The following describes the liquid crystal element 1 according to Example 4 of the present invention with reference to FIG. 30. As the liquid crystal element 1, the liquid crystal element 1 according to Embodiment 3 described with reference to FIG. 10 was used. The liquid crystal element 1 was irradiated with light, and the reflected light L3 was observed using a Michelson interferometer.

FIG. 30 is a diagram showing an interference image representing a structure of the liquid crystal element 1 according to Example 4. As shown in FIG. 30, a phase distribution similar to the phase distribution shown in FIG. 12 was observed.

Example 5

Figure 31:
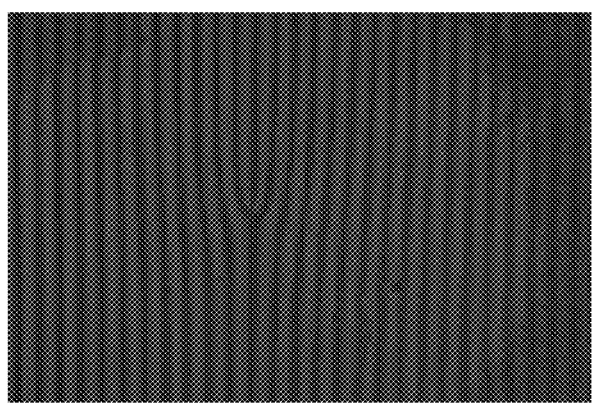
FIG. 31 is a diagram showing interference fringes representing a structure of a liquid crystal element according to Example 5 of the present invention.

The following describes the liquid crystal element 1 according to Example 5 of the present invention with reference to FIG. 31. As the liquid crystal element 1, the liquid crystal element 1 according to Embodiment 4 described with reference to FIG. 13 was used. The liquid crystal element 1 was irradiated with light, and the reflected light L3 was observed using a Michelson interferometer.

FIG. 31 is a diagram showing an interference image representing a structure of the liquid crystal element 1 according to Example 5. As shown in FIG. 31, an interference image similar to a holographic pattern for generating an optical vortex that is commonly used was observed. The observation result confirmed that the liquid crystal element 1 was able to generate an optical vortex.

Example 6

The following describes the production apparatus 101 for the liquid crystal element 1 according to Example 6 of the present invention with reference to FIGS. 32 to 35. As the production apparatus 101, the production apparatus 101 according to Embodiment 15 described with reference to FIGS. 25 and 26 was used.

Figure 32:
FIG. 32 is a diagram showing object data created by a liquid crystal element production apparatus according to Example 6 of the present invention.

FIG. 32 is a diagram illustrating object data D1 created by the production apparatus 101. The object data creation section 111 created the object data representing a virtual object as illustrated in FIG. 32. The virtual object was two-dimensional and included motifs and a character string.

Figure 33:
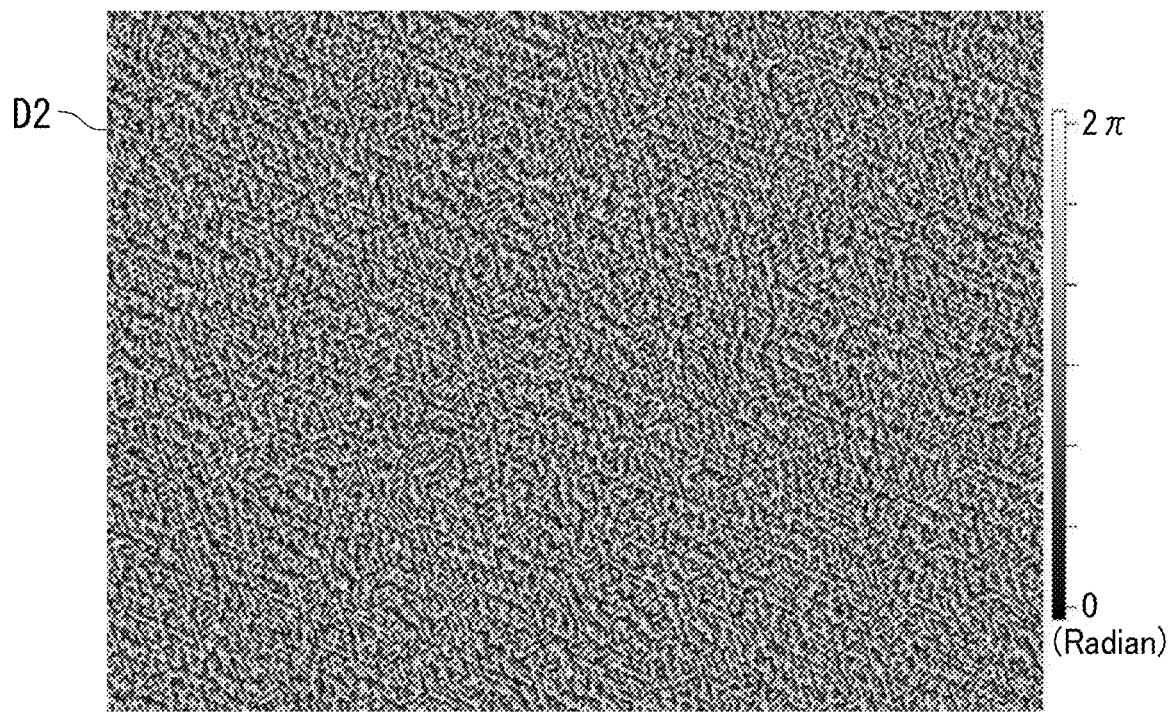
FIG. 33 is a diagram showing phase distribution data created by the liquid crystal element production apparatus according to Example 6 of the present invention.

FIG. 33 is a diagram showing phase distribution data D2 created by the production apparatus 101. The phase distribution data creation section 113 created the phase distribution data D2 based on the object data D1 as shown in FIG. 33. The phase distribution data D2 was shown within the first angular range. The first angular range was from 0 radians to $2\pi$ radians.

Note that a phase of 0 radians is shown in a black color and a phase of $2\pi$ radians is shown in a white color in FIG. 33. Gray colors having different densities are used to show values between 0 radians and $2\pi$ radians. A gray color having a higher density represents a value closer to 0 radians, and a gray color having a lower density represents a value closer to $2\pi$ radians.

Figure 34:
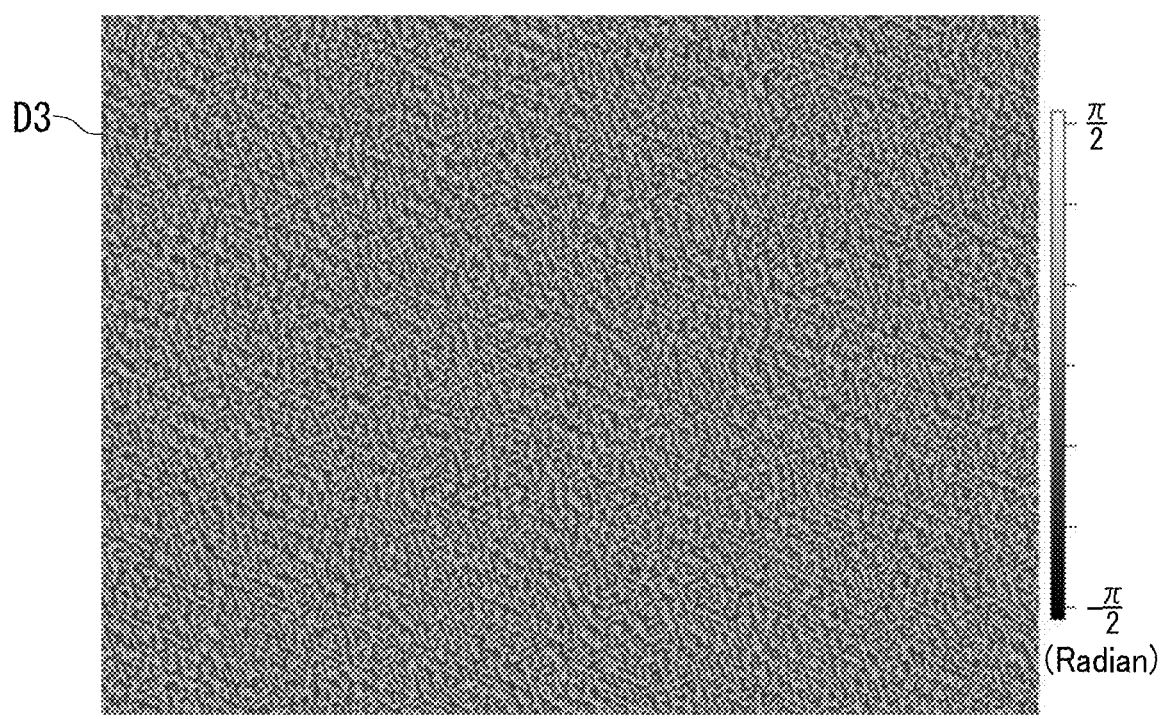
FIG. 34 is a diagram showing orientation process data created by the liquid crystal element production apparatus according to Example 6 of the present invention.

FIG. 34 is a diagram showing orientation process data D3 created by the production apparatus 101. The orientation process data creation section 115 created the orientation process data D3 based on the phase distribution data D2 as shown in FIG. 34. The orientation process data D3 was shown within the second angular range. The second angular range was from $-\pi/2$ radians to $\pi/2$ radians.

Note that a phase of $-\pi/2$ radians is shown in a black color and a phase of $\pi/2$ radians is shown in a white color in FIG. 34. A phase of 0 radians is shown in a gray color having an intermediate density between those of the black color and the white color. Gray colors having different densities are used to show values between $-\pi/2$ radians and $\pi/2$ radians. A gray color having a higher density represents a value closer to $-\pi/2$ radians, and a gray color having a lower density represents a value closer to $\pi/2$ radians.

Next, the orientation process device 120 processed alignment layers according to the orientation process data D3. Specifically, the alignment layers were respectively formed on two substrates, and then the substrates were stacked on top of another to prepare an empty element. Thereafter, the orientation process device 120 performed the orientation process on the alignment layers of the empty element.

Next, the liquid crystal positioning device 130 caused the empty element to confine a liquid crystal such that the liquid crystal was in contact with the alignment layers to form the liquid crystal layer 3. As a result, the liquid crystal element 1 was produced.

Next, the liquid crystal element 1 was irradiated with laser light via a polarizer. The liquid crystal element 1 then reflected the laser light toward a screen. As a result, an image of the virtual object was projected onto the screen and formed on the screen.

Figure 35:
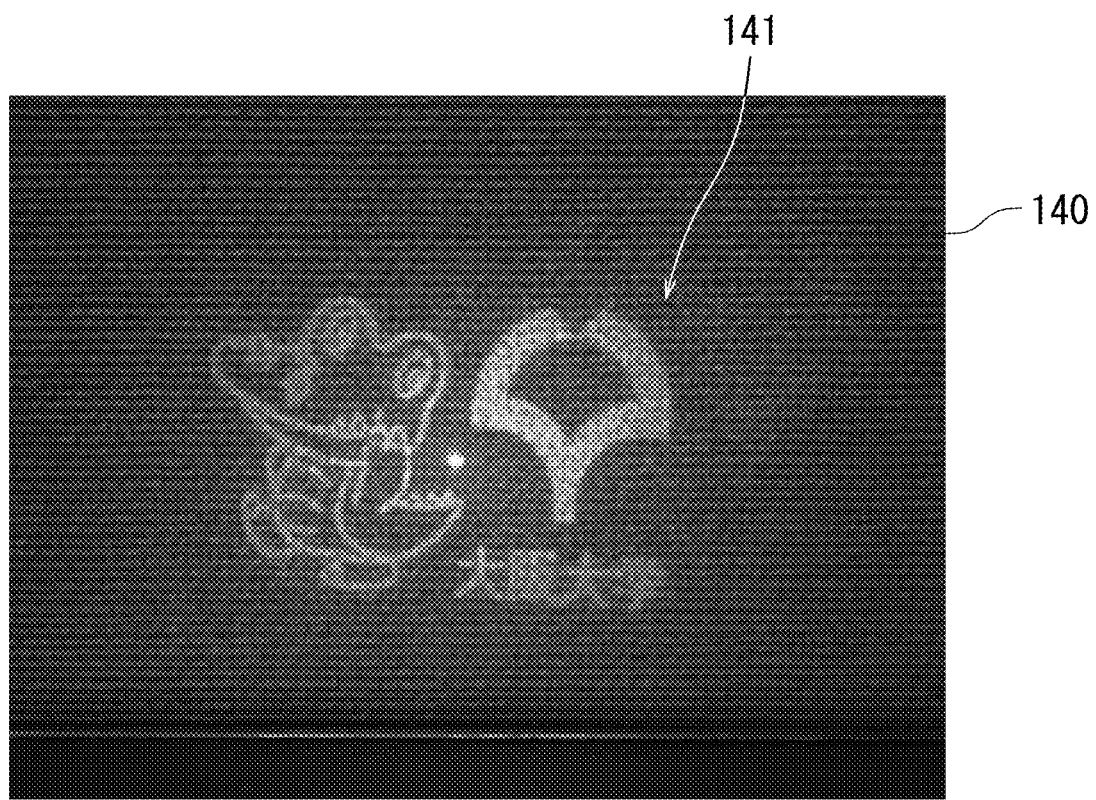
FIG. 35 is a diagram showing an image of a virtual object based on a liquid crystal element produced by the liquid crystal element production apparatus according to Example 6 of the present invention.

FIG. 35 is a diagram showing an image 141 of the virtual object. As shown in FIG. 35, the image 141 of the virtual object was formed on a screen 140. That is, the image 141 of the virtual object was reproduced on the screen 140. The image 141 represented the virtual object represented by the object data D1 (FIG. 32). Specifically, the image 141 included the motifs and the character string shown by the virtual object.

Through the above, embodiments of the present invention have been described with reference to the drawings. However, the present invention is not limited to the above embodiments and Examples, and may be implemented in various different forms that do not deviate from the essence of the present invention (for example, as described below in sections (1)-(14)). Elements of configuration disclosed in the above embodiments can be combined as appropriate to form various inventions. For example, some of the elements of configuration in the embodiments may be omitted. Furthermore, elements of configuration in three different embodiments may be combined as appropriate. The drawings schematically illustrate elements of configuration in order to facilitate understanding and properties of elements of configuration illustrated in the drawings, such as thickness, length, number, and spacing may differ from actual properties thereof in order to facilitate preparation of the drawings. Furthermore, properties of elements of configuration described in the above embodiments, such as material properties, shapes, and dimensions, are merely examples and are not intended as specific limitations. Various alterations may be made so long as there is no substantial deviation from the effects of the present invention.

(1) The liquid crystal element 1 in Embodiment 1 (FIGS. 1 to 3) includes one period (T1), and the liquid crystal element 1 in the variation (FIGS. 4 to 6) of Embodiment 1 includes two periods (2×T2). Alternatively, the liquid crystal element 1 may include three or more periods T. As illustrated in FIG. 2, the helical structures 7 arranged in each row in the third direction A3 have the identical phase in the third direction A3. However, the phase of the helical structures 7 arranged in each row in the second direction A2 may vary in a specific rotation direction (a first rotation direction) from upstream to downstream in the second direction A2, and the phase of the helical structures 7 arranged in each row in the third direction A3 may vary in a specific rotation direction (a second rotation direction) from upstream to downstream in the third direction. In other words, the first ends E1 in the helical structures 7 arranged in each row in the second direction A2 may be arranged in linear lines inclined with respect to the light incidence surface 13, and the first ends E1 in the helical structures 7 arranged in each row in the third direction A3 may be arranged in linear lines inclined with respect to the light incidence surface 13. As a result, inclination of the reflective surfaces 17 with respect to the light incidence surface 13 can be determined as desired. The same is true of Embodiment 5 (FIG. 18). Note that the first rotation direction and the second rotation direction may be the same or may be different.

(2) In Embodiment 2 (FIGS. 7 to 9), any number of reflective surfaces 17a may be formed so long as the number is at least one. Furthermore, no reflective surface 17b may be formed, or any number of reflective surfaces 17b may be formed. It is not necessary for the reflective surfaces 17 to be symmetrical.

Furthermore, in Embodiment 2, the reflective surfaces 17 are curved surfaces projecting toward the light incidence surface 13. Alternatively, the reflective surfaces 17 may be curved surfaces projecting away from the light incidence surface 13. In such a situation, the reflective surfaces 17 reflect the light L3 out of the light L1 such that the light L3 is concentrated. Furthermore, the reflective surfaces 17 have a configuration turned upside down, assuming that a positive direction of the Z axis is an upward direction in FIG. 8. In such a situation, the reflective surfaces 17 form Fresnel lenses. Furthermore, increasing the period T increases the curvature radius of the reflective surfaces 17, and thus increases a focal length of the light L3. Reducing the period T reduces the curvature radius of the reflective surfaces 17, and thus reduces the focal length of the light L3.

Furthermore, in Embodiment 2, the symmetry axis B1 of the reflective surfaces 17 is substantially parallel to the first direction A1. However, the symmetry axis B1 may be inclined with respect to the first direction A1. In such a case, the orientation of the reflective surfaces 17 is changed, and thus the light L3 can be deflected and diffused.

(3) In Embodiment 5 (FIG. 18), the helical pitch p and the helical half pitch hp each increase with increasing distance from the light incidence surface 13. Alternatively, in each of the helical structures 7, the helical pitch p and the helical half pitch hp may each decrease or may each increase and decrease alternately with increasing distance from the light incidence surface 13. Furthermore, the reflective surfaces 17 may be substantially parallel to the light incidence surface 13. Furthermore, only the helical pitch p may vary and the two helical half pitches hp within one helical pitch p may be the same.

Furthermore, in Embodiment 5, the direction of orientation of the liquid crystal molecules 11 arranged in the first direction A1 within one helical half pitch hp varies by a specific rotation angle. Alternatively, the direction of orientation of the liquid crystal molecules 11 arranged in the first direction A1 within one helical half pitch hp may vary by a continuously increasing rotation angle or by a continuously decreasing rotation angle. That is, in each of the helical structures 7, the direction of orientation of the liquid crystal molecules 11 arranged in the first direction A1 from the end e1 to the end e2 may vary by a continuously increasing rotation angle or by a continuously decreasing rotation angle. For example, in each of the helical structures 7, the direction of orientation of the liquid crystal molecules 11 arranged in the first direction A1 is represented by a sine function or a cosine function whose period varies from the end e1 to the end e2 (i.e., a chirped sine wave or cosine wave).

Figure 36:
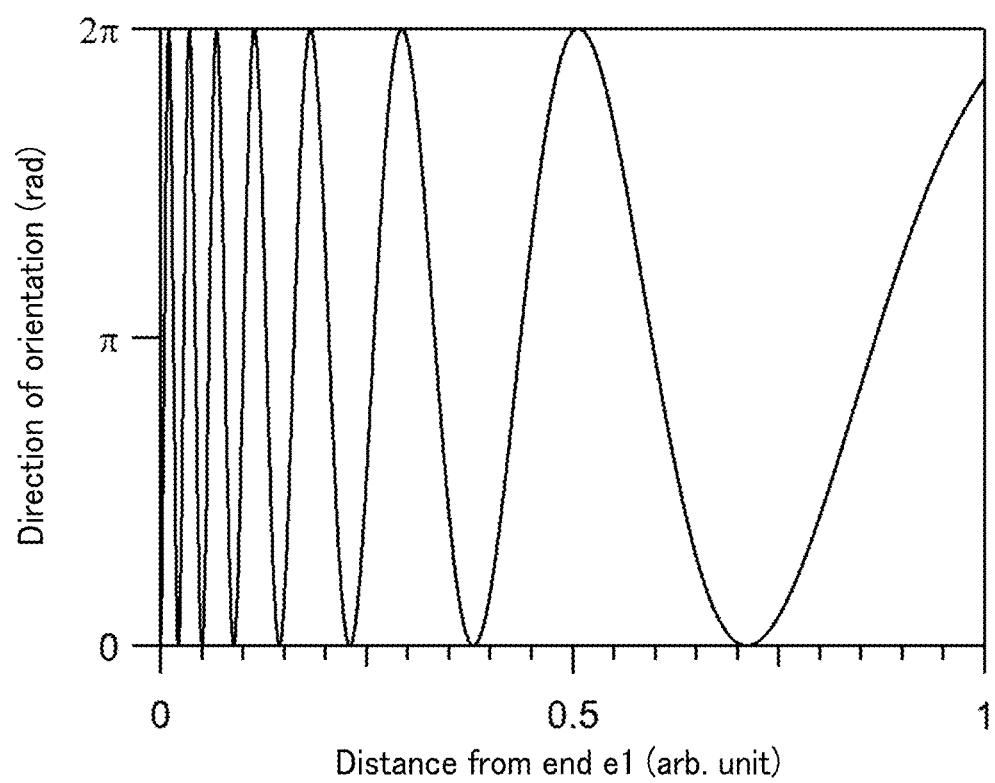
FIG. 36 is a diagram illustrating varying direction of orientation of liquid crystal molecules forming helical structures of a liquid crystal element according to a variation of Embodiment 5 of the present invention.

The following describes an example, as a variation of Embodiment 5, in which the direction of orientation of the liquid crystal molecules 11 arranged in the first direction A1 varies by a continuously increasing rotation angle with reference to FIG. 36. FIG. 36 is a diagram illustrating the varying direction of orientation of the liquid crystal molecules 11 forming one helical structure 7 of the liquid crystal element 1 according to the variation of Embodiment 5. In FIG. 36, the horizontal axis represents distance from the end e1 toward the end e2, "0" on the horizontal axis represents a position of the end e1, and "1" on the horizontal axis represents a position of the end e2. The vertical axis represents direction of orientation of the liquid crystal molecules 11 arranged in the first direction A1 in the one helical structure 7.

As shown in FIG. 36, the direction of orientation of the liquid crystal molecules 11 arranged in the first direction A1 in the one helical structure 7 is represented by a sine function (or a cosine function) whose period increases from the end e1 to the end e2. Likewise, the direction of orientation of the liquid crystal molecules 11 arranged in the first direction A1 in each of the other helical structures 7 arranged in the second direction A2 is represented by a sine function (or a cosine function) whose period increases from the end e1 to the end e2, with the only difference with the first helical structure 7 being the phase. Note that the direction of orientation of the liquid crystal molecules 11 arranged in the first direction A1 in the one helical structure 7 may be represented by a sine function (or a cosine function) whose period decreases from the end e1 to the end e2. Likewise, except different phases, the direction of orientation of the liquid crystal molecules 11 arranged in the first direction A1 in each of the other helical structures 7 arranged in the second direction A2 is represented by a sine function (or a cosine function) whose period decreases from the end e1 to the end e2.

(4) In Embodiments 1 to 8, 14, and 15, the light L1 is incident on the light incidence surface 13 at an incidence angle of approximately 90 degrees with respect to the light incidence surface 13. Alternatively, the light L1 may be incident on the light incidence surface 13 at an acute incidence angle with respect to the light incidence surface 13. The same is true of the light that is incident on the light incidence surface 19 of Embodiment 6.

(5) In each of Embodiments 1 to 8 and 15, a single liquid crystal element 1 or a single film is described. However, a plurality of the liquid crystal elements 1 may be arranged in a row in the first direction A1 such that the liquid crystal elements 1 are in close contact with one another. Likewise, a plurality of films may be arranged in a row in the first direction A1 such that the films are in close contact with one another. Each of the films is produced through polymerization of the liquid crystal layer 3. In such examples, the reflective surfaces 17 in the liquid crystal layers 3 may be the same or different. For example, as the liquid crystal layers 3, the liquid crystal layer 3 according to any of Embodiments 1 to 7 and 15 (including the variation of Embodiment 1) may be used. The twist direction of the helix of the helical structures 7 may be the same or different among the different liquid crystal layers 3.

(6) The following describes the reflective surfaces 17 in Embodiments 1 to 8, 14, and 15 using a relationship with polarization components included in light having circular polarization. In general, a medium exhibits a Bragg reflection with respect to light having circular polarization. The light having circular polarization that is Bragg reflected has a helical spatial distribution. Depending on overlap between the light having circular polarization and the helical structures 7, the refractive index that the light having circular polarization senses varies sinusoidally and continuously from a refractive index in a long axis direction of the liquid crystal molecules 11 to a refractive index in a short axis direction of the liquid crystal molecules 11.

Figure 37A:
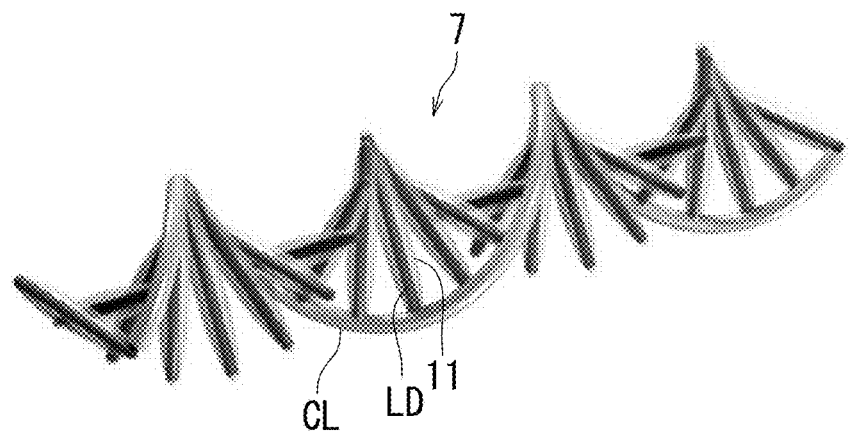
FIGS. 37A to 37C are diagrams illustrating varying refractive index sensed by light having circular polarization that may be incident on a liquid crystal element or a film according to Embodiments 1 to 8, 14, and 15 of the present invention.
Figure 37B:
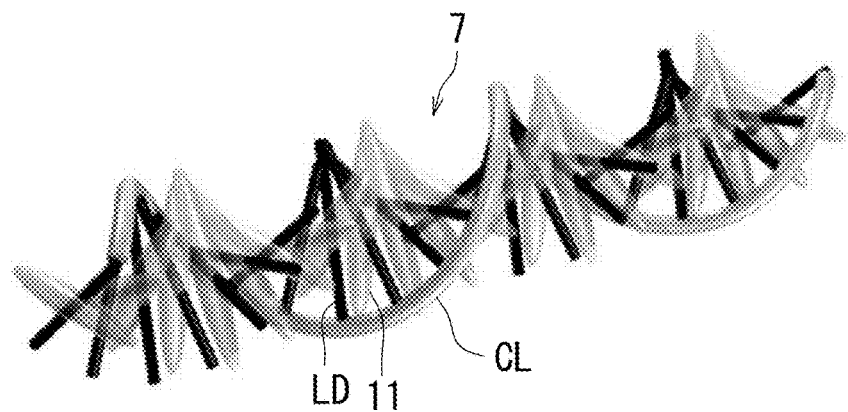
Figure 37C:
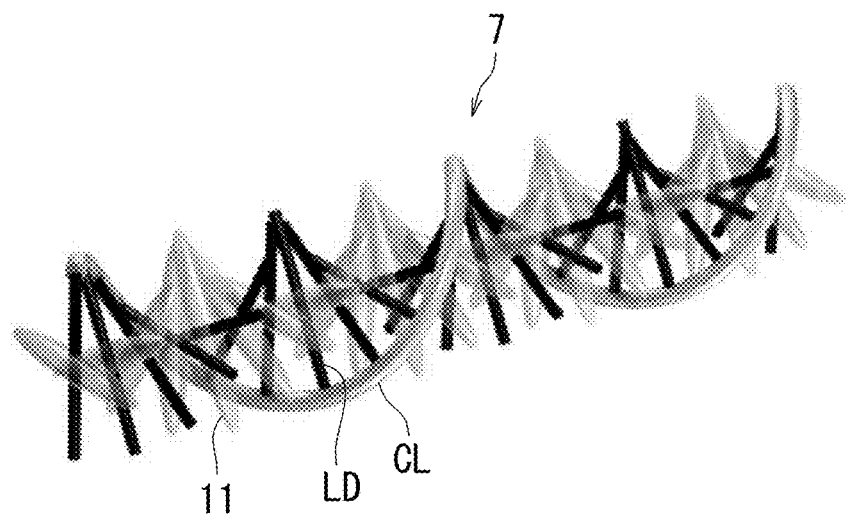

The following describes the varying refractive index that the light having circular polarization senses with reference to FIGS. 37A to 37C. FIGS. 37A to 37C are diagrams illustrating a varying refractive index sensed by light CL having circular polarization that may be incident on the liquid crystal elements 1, the film, or the liquid crystal element 1A according to Embodiments 1 to 8, 14, and 15. As illustrated in FIG. 37A, the light CL having circular polarization senses a refractive index in the long axis direction of the liquid crystal molecules 11 at a certain time. In order to facilitate understanding, the long axis direction is denoted by a rod LD in FIG. 37A. As illustrated in FIG. 37B, the light CL having circular polarization senses a refractive index in an intermediate direction between the long axis direction and the short axis direction of the liquid crystal molecules 11 at a certain time. In order to facilitate understanding, the intermediate direction is denoted by a rod LD in FIG. 37B.

Furthermore, as illustrated in FIG. 37C, the light CL having circular polarization senses a refractive index in the short axis direction of the liquid crystal molecules 11 at a certain time. In order to facilitate understanding, the short axis direction is denoted by a rod LD in FIG. 37C.

The refractive index gradually varies as the light CL having circular polarization travels, and thus a Fresnel reflection gradually takes place. The Fresnel reflection is most intense at a position where the refractive index varies most greatly, that is, at a position where the direction of the electrical field vector of the light CL exhibits a 45-degree shift with respect to the liquid crystal molecules 11 in the helical structures 7 (or a position where the direction of the electrical field vector of the light CL rotates by 90 degrees from the position of the 45-degree shift). In other words, the Fresnel reflection is most intense when the overlap between the light CL and the helical structures 7 is as shown in FIG. 37B. The reflective surfaces 17 are surfaces on which the Fresnel reflection is most intense.

The position where the Fresnel reflection is most intense varies depending on polarization components of the light CL having circular polarization. FIGS. 1, 5, 7, 10, 14, 18 and 19 therefore show the reflective surfaces 17 for a polarization component of the light CL having circular polarization (corresponding to the light L3). The light CL has, as polarization components, light that oscillates in an X axis direction, light that oscillates in a Y axis direction, and light having both X and Y components.

(7) In Embodiments 1 to 8, 14, and 15, the liquid crystal layer 3 may be a chiral liquid crystal phase other than the cholesteric phase. That is, the helical structures 7 may form a chiral liquid crystal phase other than the cholesteric phase. The chiral liquid crystal phase other than the cholesteric phase is for example a chiral smectic C phase, a twist grain boundary phase, or a cholesteric blue phase. The cholesteric phase may for example be a helicoidal cholesteric phase. Furthermore, in Embodiments 14 and 15, the helical structures 7 may form a cholesteric blue phase.

(8) An element or a film can be formed by forming a plurality of flake-like objects and dispersing the same in a fluid (for example, a liquid) or a resin. In such a situation, each of the flake-like objects serving as a reflective structure has the same configuration as the liquid crystal layer 3 according to any of Embodiments 1 to 8, 14, and 15. The element or the film in such a situation may be considered to be a reflective structure.

(9) The application of the present invention is not limited to liquid crystals. For example, in Embodiments 1 to 8, 14, and 15, a chiral structure may be disposed instead of the liquid crystal layer 3. That is, the helical structures 7 may form a chiral structure. The chiral structure is for example a helical inorganic material, a helical metal, or a helical crystal. The substrates 5U and 5L may be disposed or may be omitted.

The helical inorganic material is for example a chiral sculptured film (referred to below as "CSF"). The CSF is an optical thin film which is obtained through vapor deposition of an inorganic substance on a substrate being rotated and which has a helical microstructure. As a result, the CSF exhibits optical characteristics similar to cholesteric liquid crystals.

The helical metal is for example a helix metamaterial (referred to below as "HM"). The HM is a material obtained by processing a metal into a fine helical structure. Like cholesteric liquid crystals, the HM reflects circularly polarized light.

The helical crystal is for example a gyroid photonic crystal (referred to below as "GPC"). The GPC has a three-dimensional helical structure. Some insects and artificial structures include the GPC. Like a cholesteric blue phase, the GPC reflects circularly polarized light.

(10) The liquid crystal element 1 according to Embodiment 15 includes the substrate 5U and the substrate 5L. However, a film that serves as a reflective structure may be formed using the liquid crystal layer 3. For example, as illustrated in FIG. 26, one substrate having an alignment layer formed thereon is prepared in Step S7. Subsequently, the orientation process device 120 performs the orientation process on the alignment layer. Next, in step S9, for example, the liquid crystal positioning device 130 applies a liquid crystal onto a surface of the alignment layer subjected to the orientation process by an application method, such that the liquid crystal is in contact with the alignment layer. As a result, the liquid crystal layer 3 is formed. Subsequently, a film is formed from the liquid crystal layer 3 in the same manner as in formation of the film according to Embodiment 8. That is, a film is produced.

For producing the film, the order of Step S7 and Step S9 may be reversed, and Step S9 may be performed before Step S7. For example, in step S9, the liquid crystal positioning device 130 applies a liquid crystal onto the surface of the alignment layer prior to the orientation process by an application method, such that the liquid crystal is in contact with the alignment layer. Next, in step S7, the orientation process device 120 processes the alignment layer according to the orientation process data. Thus, the liquid crystal molecules 11 of the liquid crystal are oriented to form the liquid crystal layer 3. Subsequently, a film is formed from the liquid crystal layer 3 in the same manner as in formation of the film according to Embodiment 8. That is, a film is produced.

Note that the film may be removed from the substrate or may be left on the substrate.

Furthermore, a plurality of films may be produced, and the films may be layered. In such a situation, for example, the layered films can each form a different virtual object image, further extending the application range.

For example, a first-layer film forms an image of a "stalk" of an apple as a virtual object in a brown color, a second-layer film forms an image of a "leave" of the apple as a virtual object in a green color, and a third-layer film forms an image of a "fruit body" of the apple as a virtual object in a red color. As a result, the "stalk", the "leave", and the "fruit body" form a color image of the apple. In this example, the helical pitch p of the helical structures 7 included in the first-layer film is determined such that the wavelength of light to be reflected by the first-layer film exhibits the brown color. The helical pitch p of the helical structures 7 included in the second-layer film is determined such that the wavelength of light to be reflected by the second-layer film exhibits the green color. The helical pitch p of the helical structures 7 included in the third-layer film is determined such that the wavelength of light to be reflected by the third-layer film exhibits the red color. Then, the layered first-layer to third-layer films are irradiated with white light.

For example, the first-layer film forms an image of a first virtual object when light having certain polarization is irradiated, and the second-layer film forms an image of a second virtual object when light having different polarization is irradiated. According to the present invention, circular polarization selectivity of the liquid crystal layer 3 can be effectively utilized.

(11) The liquid crystal element 1, the film, or the liquid crystal element 1A according to Embodiments 1 to 8, 14, and 15 (referred to below as the "liquid crystal element 1 or the like") can function as a holographic optical element. For example, the liquid crystal element 1 or the like functions as fold mirror, a screen, or a lens through reflecting or diffusing light in a specific direction(s). The holographic optical element may for example be mounted on a wearable display.

The liquid crystal element 1 or the like can for example function as a decorative element or a decorative film. The liquid crystal element 1 or the like for example reflects light having the same color when viewed from any angle. As a result, the liquid crystal element 1 or the like functions as a decorative element or a decorative film of transflective type and with a metallic luster.

(12) The production apparatus 101 and the production method according to Embodiment 15 and the section (10) above are applicable to production of the liquid crystal element 1 according to Embodiments 1 to 7, the film according to Embodiment 8, and the liquid crystal element 1A according to Embodiment 14 (specifically, the helical structure units 30). In such a situation, the object data creation section 111 and step S1 may be omitted. Then, the phase distribution data creation section 113 creates phase distribution data such that the reflective surfaces 17 are formed in the liquid crystal layer 3.

(13) In Embodiments 1 to 8, 14, and 15, the description uses an example in which adjacent helical structures 7 have substantially the same helical pitch p, and adjacent helical structures 7 have substantially the same helical half pitch hp. However, adjacent helical structures 7 may each have a different helical pitch p, and adjacent helical structures 7 may each have a different helical half pitch hp so long as the reflective surfaces 17 are non-parallel to the light incidence surface 13, that is, so long as adjacent helical structures 7 each have a different phase.

(14) In the liquid crystal elements 1 and the film according to Embodiments 1 to 8 and 15, the twist direction of the helix of the helical structures 7 may change depending on environmental conditions (for example, temperature) under which the liquid crystal elements 1 and the film are placed. However, before and/or after the change, the reflective surfaces 17 are non-parallel to the light incidence surface 13, that is, adjacent helical structures each have a different phase.

INDUSTRIAL APPLICABILITY

The present invention provides a reflective structure (for example, an element or a film), a device including the reflective structure, and a production method of the reflective structure, and is industrially applicable thereto.

REFERENCE SIGNS LIST 1, 1A Liquid crystal element (reflective structure)
7 Helical structure
9, 9A Structure unit
11 Liquid crystal molecule (element)
13 Light incidence surface (first light incidence surface)
17 Reflective surface
19 Light incidence surface (second light incidence surface)
30 Helical structure unit
31 Support member
32 Rotary member
91 Stimulation section
93 Controller
500 Device
A1 First direction (specific direction)
B1 Symmetry axis
E1 First end
E2 Second end
p Helical pitch
hp Helical half pitch

The invention claimed is:

1. A reflective structure comprising:
a plurality of helical structures each extending in a specific direction, the specific direction indicating a direction of helix axes of the helical structures;
a first light incidence surface on which light is incident, the first light incidence surface being substantially perpendicular to the specific direction; and
a reflective surface configured to reflect the light coming through the first light incidence surface, the reflective surface intersecting with the specific direction, wherein
the first light incidence surface includes one end of two ends of each of the helical structures,
each of the helical structures includes a plurality of structure units successive in the specific direction,
each of the structure units includes a plurality of elements stacked in a twisted manner to form a helix,
each of the structure units has a first end and a second end,
the second end of one structure unit of structure units, among the plurality of structure units, adjacent to one another in the specific direction serves as the first end of the other structure unit,
directions of orientation of the elements at the first ends included in the helical structures are identical,
the reflective surface includes at least one of the first ends included in each of the helical structures, and
the reflective surface is non-parallel to the first light incidence surface due to the helical structures including two or more helical structures that have spatial phases different from each other.

2. The reflective structure according to claim 1, wherein the reflective surface is inclined with respect to the first light incidence surface in a given direction.

3. The reflective structure according to claim 1, wherein the reflective surface includes a curved surface.

4. The reflective structure according to claim 3, wherein the reflective surface is symmetrical with respect to a symmetry axis.

5. The reflective structure according to claim 1, wherein the reflective surface includes irregularities.

6. The reflective structure according to claim 1, wherein the reflective surface includes a helical surface.

7. The reflective structure according to claim 1, wherein in each of the helical structures, a helical half pitch varies or a helical pitch varies,
the helical half pitch is a distance from the first end to the second end of the structure unit, and
the helical pitch is a distance from the first end of the one structure unit of the structure units adjacent to one another to the second end of the other structure unit.

8. The reflective structure according to claim 1, wherein the helical structures form a cholesteric phase, a cholesteric blue phase, a chiral smectic C phase, a twist grain boundary phase, a helicoidal cholesteric phase, a chiral liquid crystal phase, a helical inorganic material, a helical metal, a helical crystal, or a chiral structure.

9. The reflective structure according to claim 1, comprising
a plurality of the reflective surfaces; and
a second light incidence surface on which light is incident, the second light incidence surface intersecting with the specific direction, wherein
the second light incidence surface includes an opposite end of the two ends of each of the helical structures, among the reflective surfaces, a reflective surface toward the first light incidence surface has a different structure from a reflective surface toward the second light incidence surface, the reflective surface toward the first light incidence surface reflects the light coming through the first light incidence surface, and the reflective surface toward the second light incidence surface reflects the light coming through the second light incidence surface.

10. The reflective structure according to claim 1, wherein among the helical structures, adjacent helical structures are bonded to each other.

11. The reflective structure according to claim 1, wherein the reflective surface reflects the light coming through the first light incidence surface to form an image of an object corresponding to the light.

12. The reflective structure according to claim 1, wherein one, or two or more of the helical structures form a helical structure unit, the reflective structure further comprises:

a plurality of support members disposed one-to-one correspondence with a plurality of the helical structure units; and a plurality of rotary members disposed one-to-one correspondence with the support members, each of the support members supports the corresponding helical structure unit, and each of the rotary members rotates the corresponding support member.

13. A device comprising:

the reflective structure according to claim 1; and a stimulation section configured to give a stimulus to the reflective structure, wherein the stimulus is an electrical stimulus, a light stimulus, a mechanical stimulus, or a chemical stimulus, and the reflective structure responds to the stimulus.

14. The reflective structure according to claim 1, wherein the spatial phases of the helical structures indicate directions of orientation of the elements included in the helical structures on the first incidence surface or directions of orientation of the elements located at the one ends of the respective two ends of the helical structures.

15. The reflective structure according to claim 1, wherein the helical structures does not function as a negative C-plate.

16. The reflective structure according to claim 1, comprising as the reflective surface, a plurality of reflective surfaces, wherein the reflective surfaces are substantially parallel to one another.

17. A production method for producing a reflective structure, the reflective structure comprising:

a plurality of helical structures each extending in a specific direction, the specific direction indicating a direction of helix axes of the helical structures;

a first light incidence surface on which light is incident, the first light incidence surface being substantially perpendicular to the specific direction; and a reflective surface configured to reflect the light coming through the first light incidence surface, the reflective surface intersecting with the specific direction, wherein the first light incidence surface includes one end of two ends of each of the helical structures, each of the helical structures includes a plurality of structure units successive in the specific direction, each of the structure units includes a plurality of elements stacked in a twisted manner to form a helix, each of the structure units has a first end and a second end, the second end of one structure unit of structure units, among the plurality of structure units, adjacent to one another in the specific direction serves as the first end of the other structure unit, directions of orientation of the elements at the first ends included in the helical structures are identical, the reflective surface includes at least one of the first ends included in each of the helical structures, and the reflective surface is non-parallel to the first light incidence surface due to the helical structures including two or more helical structures that have spatial phases different from each other, the production method comprising:

calculating a direction of orientation of an element at the one end of the two ends of each of the helical structures to create first orientation data; and creating second orientation data based on the first orientation data, wherein the first orientation data indicates directions of orientation of the elements at the respective one ends, the second orientation data specifies either or both of a surface structure and a surface property of an alignment layer configured to be in contact with the elements and orient the elements, and the creating the first orientation data includes creating the first orientation data such that some of the elements at the respective one ends each have a different direction of orientation.

18. The reflective structure production method according to claim 17, further comprising creating object data representing an object, wherein the creating the first orientation data includes calculating the direction of orientation of the element at the one end of the two ends of each of the helical structures based on the object data.

* * * * *